(12) United States Patent
Petermann

(10) Patent No.: US 7,085,560 B2
(45) Date of Patent: Aug. 1, 2006

(54) WIRELESS COMMUNICATIONS DEVICE WITH ARTIFICIAL INTELLIGENCE-BASED DISTRIBUTIVE CALL ROUTING

(75) Inventor: Jerry Petermann, Pflugerville, TX (US)

(73) Assignee: Wahoo Communications Corporation, Lorena, TX (US)

( * ) Notice: Subject to any disclaimer, the term of this patent is extended or adjusted under 35 U.S.C. 154(b) by 100 days.

(21) Appl. No.: 10/937,158

(22) Filed: Sep. 23, 2004

(65) Prior Publication Data

US 2005/0096034 A1    May 5, 2005

Related U.S. Application Data

(63) Continuation-in-part of application No. 10/063,283, filed on Apr. 8, 2002, now Pat. No. 6,842,617, which is a continuation-in-part of application No. 09/583,839, filed on May 31, 2000, now Pat. No. 6,374,078.

(60) Provisional application No. 60/610,087, filed on Sep. 15, 2004.

(51) Int. Cl.
*H04Q 7/20* (2006.01)
(52) U.S. Cl. ............... 455/422.1; 455/453; 455/444; 455/554.1; 455/554.2; 455/7; 455/419; 455/555
(58) Field of Classification Search ............ 455/422.1, 455/453, 444, 554.1, 554.2, 7, 419, 555
See application file for complete search history.

(56) References Cited

U.S. PATENT DOCUMENTS

| | | | | |
|---|---|---|---|---|
| 6,141,531 A | * | 10/2000 | Williams et al. | 455/7 |
| 6,374,078 B1 | * | 4/2002 | Williams et al. | 455/7 |
| 6,535,731 B1 | * | 3/2003 | Pillekamp et al. | 455/444 |
| 6,842,617 B1 | * | 1/2005 | Williams et al. | 455/444 |

* cited by examiner

*Primary Examiner*—Erika A. Gary
*Assistant Examiner*—Wayne Cai
(74) *Attorney, Agent, or Firm*—Everest Intellectual Property Law Group; Tin-Chuen Yeung

(57) ABSTRACT

A decentralized asynchronous wireless communication system is disclosed for providing the remote location retrieval of voice and data communication and allowing for flexibility of communication paths for local communication or for communication to external networks. The system makes use of external data communications modules that may communicate in a local mode, an extended mode, or a distant mode. The external data communications modules may also provide a communication path to a Public Switch Telephone Network and other communication medium. The entire system is monitored by a network of personal computers comprising an Artificial Intelligence (AI) Network to manage any catastrophic system failure. The entire system is suitable for operation in rural areas having a low population density and urban areas where hours of peak call loading could otherwise be detrimental to call completions.

134 Claims, 25 Drawing Sheets

| FUNCTION | PREFIX CODE | DESCRIPTION |
|---|---|---|
| Page DW Handset | ##PG | Page a designated DW wireless handset from ComDoc handset. |
| Release Call | #*#* | Release ComDoc from a wireless call (for emergency). |
| CCAP Code | ###* | Activates Contiguous Channel Acquisition Protocol. |
| CCAP+ Code | #### | Activates Contiguous Channel Acquisition Protocol Plus. |
| ComDoc call to DW Handset | #DWC | Call to a DW wireless handset from fixed handsets connected to ComDoc, PSTN in call waiting mode. |
| DW Handset call to ComDoc | #HOM | Call to fixed handset connected to ComDoc from a DW wireless handset, PSTN in standby mode. |
| Join DW Handset to PSTN call | #ASC | Enables a DW Handset to join a PSTN call from fixed handset connected to ComDoc, controlled by fixed handset user. |
| Activate Intercom to fixed handsets | #COM | Activates intercom functions between fixed handsets connected to ComDoc, PSTN in standby mode. |
| Internet Message | #IMS | Enables ComDoc to display Internet communications to URL address assigned to ComDoc. |
| Security | *SEC | Reports a home security system fault to wireless system when PSTN fails. |
| Caller ID | #REP | Enables automatic reporting of stored messages, prerecorded alerts, and caller ID numbers to DW handset or fixed handset. |
| Activate Broadband | #CCP | Activates ComDoc interface to broadband network for Internet and other broadband service. |

FIG. 17

WIRELESS COMMUNICATIONS DEVICE WITH ARTIFICIAL INTELLIGENCE-BASED DISTRIBUTIVE CALL ROUTING

CROSS-REFERENCE TO RELATED APPLICATIONS

This application is a continuation-in-part of U.S. patent application Ser. No. 10/063,283 filed on Apr. 8, 2002, now U.S. Pat No. 6,842,617 which is a continuation-in-part of U.S. patent application Ser. No. 09/583,839, filed on May 31, 2000, now U.S. Pat. No. 6,374,078, and further claims priority to U.S. Provisional Patent Application Ser. No. 60/610,087 filed on Sep. 15, 2004.

FEDERALLY SPONSORED RESEARCH OR DEVELOPMENT

Not Applicable.

BACKGROUND OF THE INVENTION

The invention relates generally to wireless communication systems and, more particularly, to wireless communication system devices that use radio frequencies for transmitting and receiving voice and data signals within an internal communications network and to an external communication networks.

Wireless communication systems continue to grow, particularly in the areas of cellular and digital telephony and in paging systems. Wireless systems are especially popular in remote areas of the world that have limited wired service because of the cost and difficulty of building a wired infrastructure.

Traditional wireless communication systems such as cellular telephones use radio communication between a plurality of subscriber units within the synchronous wireless system and between subscriber units and the Public Switched Telephone Network (PSTN) for calls that are outside of the wireless system. Most of these systems are characterized by wireless mobile telephone units communicating synchronously with base stations that are connected to centralized mobile switching centers (MSC), which are in turn connected to the PSTN. The centralized MSC performs a number of functions, including routing wireless mobile units calls to other mobile units and wired (land-line) users and routing land-line calls to mobile units. At no time do these traditional wireless communications systems allow the handset to interface with the PSTN directly. The very core of the centralized wireless communications theory requires every PSTN interface to be made through an MSC. This is the only interface allowed.

Others' systems use point-to-point radio communication where mobile units may communicate with other mobile units in the local area. They send origin and destination address formation and make use of squelching circuits to direct the wireless transmission to the correct destination address. Most of these systems do not appear to provide a connection to a PSTN to send and receive calls outside the wireless network. This type of system is decentralized, but because of the decentralization, collecting accurate billing information may be a problem.

Another form of wireless system is called a local multi-point distribution service (LDMS). In an LMDS system, a local area or cell that is approximately 4 km in diameter contains fixed base stations, geographically distributed throughout the local area. One or more antennas within the local area receive calls from the fixed base stations and relay the calls to other fixed base stations. In order for the system to work, the fixed base stations must be within the line-of-sight path of at least one of the antenna units. The LDMS does not provide for mobile stations. Calls can only be routed within the local area and not to an external network. The system is essentially a centralized system within a local area. If one station is not within the line of sight of the antenna, it is effectively cut off from communication.

There is a need for decentralized wireless communication system that is capable of handling voice and data communication that allows for a multiplicity of communication paths. It is desirable to have an ability to call on bandwidths as needed, to provide local communication links, and to access links to external networks. Such networks may include public switch telephone networks, high speed-broadband cable, Internet, satellites and radio emergency networks. It is desirable to have a system that does not require a centralized switching center, provides for secure operation, allows for control of the operational state of the internal network, provides for emergency notification and provides a way to collect revenue from the system. It is desirable to have elements within the system that allow for the remote controlled gathering of data, the preprogrammed remote gathering of data, the remote controlling of systems external to the internal network, the remote controlling of the change of state of systems external to the network, alternative paths for the relaying of signal extender signals, alternative paths for the relaying of handset, ComDoc or X-DatCom signals. It is also desirable to provide alternate direct-path communication between wireless handsets and the PSTN, without centralized switching or to provide alternate direct-path communication between remotely placed wireless data collection, reporting and remote control instruments and the PSTN, also without centralized switching. Such interfaces augment the conventional path routing and reduce call loads on any central communications interface. It is also prudent to oversee the entire operational state of the network, its various components and signal routing devices with an Artificial Intelligence-based Distributive Routing System; an artificial learning software based logic manager prepared to assist and/or provide guidance during any unfortunate catastrophic failure of major wireless infrastructure elements or during inevitable wireless set call connection failures due to peak hours call overloading experienced in a mature wireless system.

BRIEF DESCRIPTION OF THE DRAWINGS

These and other features, aspects, and advantages of the present invention will become understood with regard to the following description, appended claims, and accompanying drawings where:

FIG. 17 shows examples of prefix codes for accessing ComDoc functions; and

DETAILED DESCRIPTION OF THE INVENTION

Figure 1:
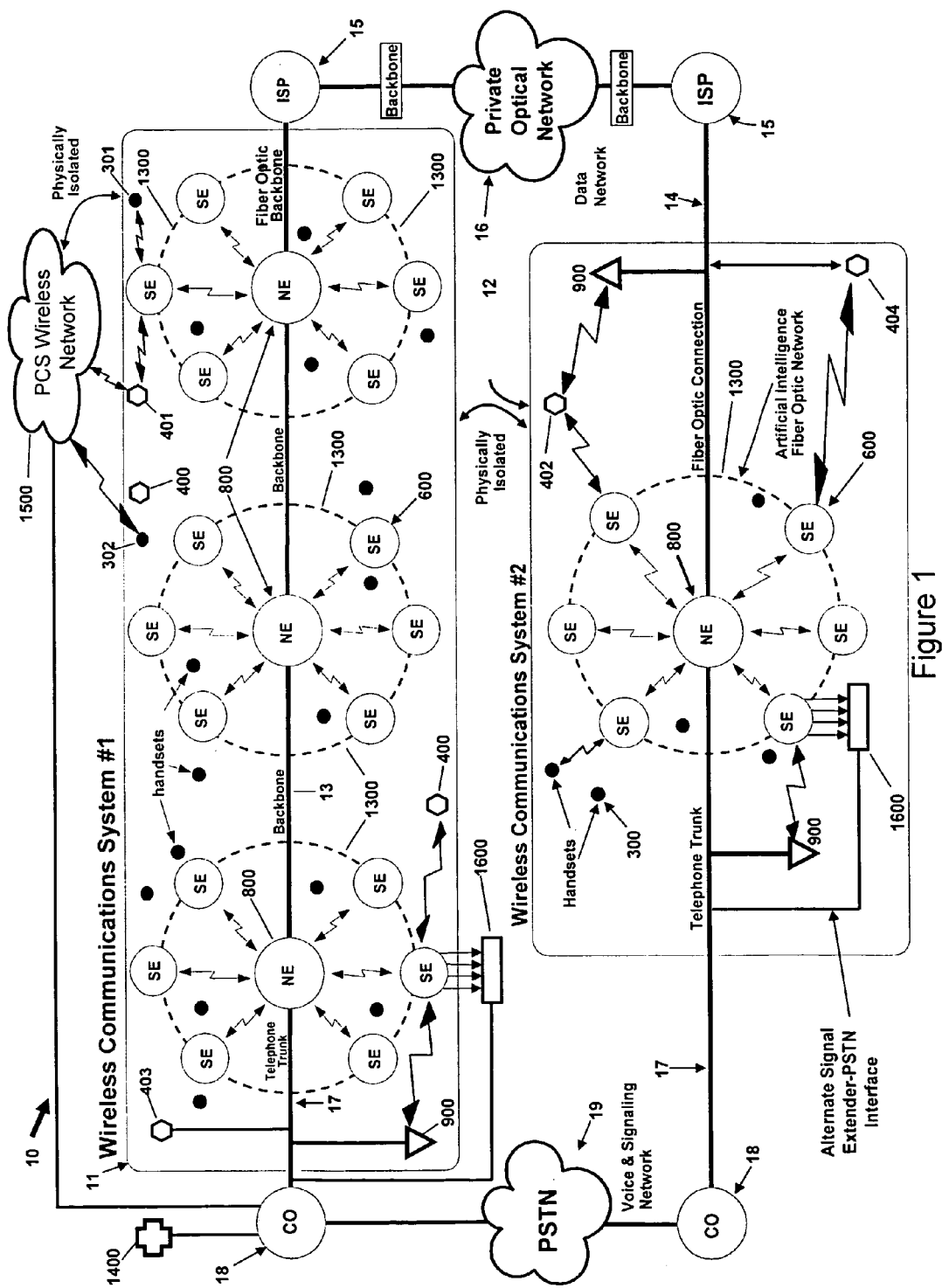
FIG. 1 shows a deployment of two embodiments of the present wireless communication system.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

The present invention is directed to devices and methods that provide a user of a decentralized asynchronous wireless communication system for voice and data communication with the ability to select various communication paths and calling bandwidths as needed. It provides local communication as well as optional links to external networks, and does not require a synchronous centralized switching center. It further provides secure operation, emergency notification and a way to collect revenue from the system, and allows for control of the operational state of the internal network and optional remote control of the operational state of systems external to the network.

The present invention provides for a wireless remote external data communications module (X-DatCom) device that uses radio frequencies for asynchronously and remote transmitting and receiving voice and data signals within an internal network with multiple internal communication paths. It also provides for external communication paths for linking the internal network to external communication networks, including a direct connection to a Public Switched Telephone Network (PSTN) for uploading or downloading digital data and device programming and is capable of operating in isolated remote locations. Additional communications paths defined as ultra short range are also encompassed in the scope of the device to facilitate a communication between the device and other external network devices equipped for ultra short range communication. These include ultra-wide-band, Bluetooth, or infrared spectrum protocols.

The present communication system comprises five primary elements: handsets carried by mobile users, communications docking bays (ComDocs) for providing alternative connections, external data communications modules (X-DatComs) for remotely gathering data or remotely controlling systems external to the device or to the network, signal extenders for relaying handset, ComDoc or X-DatCom signals, and network extenders for interconnecting signals from signal extenders. The signal extenders and network extenders comprise the infrastructure equipment that is located at antenna tower sites while the ComDoc sets are located in a subscriber's home or business and X-DatComs comprise a varied array of remotely placed data gathering or remote control devices. Handsets, ComDocs and X-DatComs are assigned standard telephone numbers and are capable of placing and accepting calls with telephones in the Public Switched Telephone Network (PSTN) through the network extenders. Calls that are placed between handsets, ComDocs or X-DatComs contained within the asynchronous internal network do not require routing through a PSTN. The ComDoc interface device is designed to allow restricted and private access to a wireless handset owner's home or office telephone landline, thus creating a private link to the PSTN without necessity of routing the wireless call through the network extender for an interface to the PSTN. X-DatComs are varied in design to meet application needs but all have the capabilities of being placed in remote locations to gather data or control processes or devices external to their own circuitry or to the network. X-DatComs may facilitate a communication between other external network devices equipped for ultra short range communication. These include ultra-wide-band, Bluetooth, or infrared spectrum protocols. Besides handling regular voice and data, the overall system also supports a wide variety of telephone features such as Internet access, cable modem access, bi-directional data transfer and variable bandwidth wireless calling channels. Direct connection to other external networks include: the PSTN, cable and other wireless protocols via the multi-mode module in the RF section of handsets, ComDocs or X-DatComs. Ultimate control of the X-DatCom will be reserved for signals from within this decentralized asynchronous wireless communication network. The handsets, ComDocs and X-DatComs may have Wireless Fidelity (Wi-Fi) options to establish wireless connectivities to other devices. The communication between the elements can be monitored by a system-resident and decentralized Artificial Intelligence-based Distributive Routing System.

The Artificial Intelligence-based Distributive Routing System may comprise a resident and decentralized network of computers having a computer residing in each signal extender and each computer having an Artificial Intelligence software program to gather information regarding timely calling data, routing and wireless device use histories and to analyze the information for recommending or executing alternative communication paths within the entire system of the signal extenders and the network extender during excessive peak hours loading of the network extender or during a catastrophic failure of any signal extender or the network extender. The Artificial Intelligence System may further report the day's gathered information to each of the other signal extenders for comparative analysis and making logical suggestions to the handsets, communications docking bays and External Data Communications Modules operating within the system. The Artificial Intelligence System may further be programmed to gather relevant data from remotely placed external data communications modules by means of a wireless protocol established for operations of the system. The wireless protocol is established for operations of the system interfaced with a network including but not limited to Public Switch Telephone Network lines, a fiber optic communication link, a coaxial cable, a public TCP/IP network, a directional emergency tower to tower microwave link, a satellite communication link, a communication docking bay routed to other destinations and data collection devices selected by the Artificial Intelligence System.

The external data communications modules (X-DatComs) provide for remote gathering of data or control of systems external to the internal circuitry of the device or external to the network, with additional or alternative connectivity to the PSTN, if required. The X-DatCom is a fixed-base wireless set capable of asynchronously sending and receiving system calls and/or data and providing connection with a PSTN or other such external devices or networks as selected by the user. This device may also provide a redundant path to a PSTN for the uploading or downloading of data collected remotely or for the remote control of external devices within or external to the network or for the remote control of the operational state of devices internal or external to the network. The device is capable of serving as a wireless data interface for personal computers with data rates either flexible or fixed through the use of DWC Contiguous Channel Acquisition Protocols (CCAP)/(CCAP+) or preset wireless channel allocations.

The system is particularly suitable for operation in rural areas where population density is low and wireless coverage is either not currently available or not adequately serviced and where limited remote data gathering or remote control of systems or devices via wireless means is in operation. The system is suitable for operation in the United States using the PCS spectrum (1850 or the Wireless Communications Service (WCS) spectrum at 2320 2360 MHz that are licensed by the Federal Communications Commission (FCC) or any other such frequency as may be determined suitable above 50 megahertz and less than 5 gigahertz. The handset, the ComDoc and the X-DatCom incorporate a modular multi-mode capability to extend the wireless service area with a potential variety of standard wireless formats and bands, such as AMPS, D-AMPS, IS-95, IS-136, and GSM1900. This is an important feature because widespread deployment of a new wireless service takes appreciable time, and there are many other wireless standards from which to choose since these new customers may also venture into standard PCS or cellular markets. Besides the US rural market, other applications for present invention include emerging nations, especially those that presently have limited or no telephone service, and those communities or groups that require a stand alone wireless communication network that can be quickly and cost-effectively deployed. The low cost remote sensing and remote control of other devices and processing through such a versatile wireless device is critical to isolated rural economies and those of developing nations.

An embodiment of the present invention is a method of operating a wireless communication system for voice and data signals, the system comprising one or more macrocells and each macrocell having a plurality of microcells. The method comprises establishing a local communication path for transmitting and receiving signals between a local communications docking bay (ComDoc) and a remotely placed local external data communications module (X-DatCom) within a same microcell via a signal extender, establishing an extended communication path for transmitting and receiving signals between an extended ComDoc and an extended external data communication module located within different microcells positioned within a same macrocell via signal extenders and a network extender, establishing a distant communication path for transmitting and receiving signals between a distant ComDoc and a distant external data communications module located within different microcells positioned within different macrocells via signal extenders and network extenders, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of establishing a local communication path may comprise transmitting signals from the local ComDoc and the local external data communications module to the signal extender, receiving and re-transmitting signals by the signal extender to the local ComDoc and the local external data communications module, and receiving signals from the signal extender by the local ComDoc and the local external data communications module. The step of establishing an extended communication path may comprise transmitting signals from the extended ComDoc and the extended external data communications module to the signal extenders, receiving and re-transmitting signals from the extended ComDoc and the extended external data communications module by the signal extenders to the network extender, receiving and re-transmitting signals from the signal extenders by the network extender to the signal extenders, receiving and retransmitting signals from the network extender by the signal extender to the extended ComDoc and extended external data communications module, and receiving signals from the signal extenders by the extended ComDoc and the extended external data communications module. The step of establishing a distant communication path may comprise transmitting signals from the distant ComDoc and the distant external data communications module to the signal extenders, receiving and re-transmitting signals from the distant ComDoc and the distant external data communications module by the signal extenders to the network extenders, receiving and re-transmitting signals from the signal extenders by a network extender to another network extender, receiving and re-transmitting signals from a network extender by another network extender to signal extenders, receiving and re-transmitting signals from network extenders by signal extenders to the distant ComDoc and the distant external data communications module, and receiving signals from signal extenders by the distant ComDoc and the distant external data communications module. The step of receiving and re-transmitting signals by a network extender to another network extender may be selected from the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link. Half of the signals received by a signal extender in a microcell may be transmitted by handsets, communication docking bays or external data communications modules in the microcell in a low radio frequency band and half of the signals received by the signal extender in a macrocell may be transmitted by a network extender in the macrocell in a low radio frequency band. Half of the signals transmitted by a signal extender in a microcell may be received by the handsets, communications docking bays or external data communications modules in the microcell in a high radio frequency band and half of the signals transmitted by the signal extender in a macrocell may be received a network extender in the macrocell in a high radio frequency band. The transmitting and receiving signals between a handset, a communication docking bay or an external data communications module may be conducted asynchronously with transmitting signals between other handsets, communications docking bays or external data communications modules. The step of establishing a local voice communication path between a handset, a communication docking bay or external data communications module may comprise using two fixed frequencies in a sub-band spectrum for establishing a local voice channel. The step of establishing a local data communication path under a four channel Contiguous Channel Acquisition Protocol between a handset, a communication docking bay or external data communications module may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a handset, a communication docking bay or external data communications module may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a handset, a communication docking bay or external data communications module may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a handset, a communication docking bay or external data communications module may comprise using four fixed frequencies having a bandwidth of twelve times a bandwidth of an extended voice channel by combining twelve contiguous voice channels. The method may further comprise establishing a communication path for transmitting and receiving signals between an external data communications module and an external network via a signal extender and a network extender connected to the external network. The external network may be selected from the group consisting of a Public Switch Telephone Network (PSTN), a fiber optic communication link, a coaxial cable, a public TCP/IP network, and a satellite communication link. The method may further comprise establishing a communication path for transmitting and receiving signals between an external data communications module and an external network via communication docking bay connected to the external network. The external network may be selected from the group consisting of a Public Switch Telephone Network (PSTN), a fiber optic communication link, a coaxial cable, a public TCP/IP network, and a satellite communication link. The method may further comprise establishing a communication path for transmitting and receiving signals between an external data communications module and a local communication network. The local communication network may be selected from the group consisting of wireless handsets associated with communication docking bays, wireless handsets associated with external data communications modules, external data communications modules associated with communication docking bays, external data communications modules associated with other external data communications modules, external data communications modules associated with wireless handsets, local extension telephones connected to a Public Switch Telephone Network via the external data communications module, an infrared link, a Bluetooth link, a wired computer local area network, a wireless local area computer network, a security system and another external data communications module link. The handsets may be communication docking bays or the handsets may be external data communications module.

Another embodiment of the present invention is a method of operating a wireless communication system for voice and data signals, the system comprising one or more macrocells and each macrocell having a plurality of microcells. The method comprises: establishing a local communication path for transmitting and receiving signals between a local ComDoc and a local external data communications module within a same microcell comprising receiving and transmitting signals between the local ComDoc and a signal extender, receiving and transmitting signals between the signal extender, the local ComDocs and the local external data communications module, and receiving and transmitting signals between the local external data communications module and the signal extender; establishing an extended communication path for transmitting and receiving signals between an extended ComDoc and an extended external data communications module within different microcells positioned within a same macrocell comprising transmitting and receiving signals between the extended ComDoc and a first signal extender, transmitting and receiving signals between the first signal extender and a network extender, transmitting and receiving signals between the network extender and a second signal extender, transmitting and receiving signals between the second signal extender and the extended external data communications module, and transmitting and receiving signals between the extended external data communications module and the second signal extender; establishing a distant communication path for transmitting and receiving signals between distant a handset and a distant external data communications module within different microcells positioned within different macrocells comprising transmitting and receiving signals between the distant ComDoc and a first signal extender, transmitting and receiving signals between the first signal extender and a first network extender, transmitting and receiving signals between the first network extender and a second network extender, transmitting and receiving signals between the second network extender and a second signal extenders, transmitting and receiving signals between the second signal extender and the distant external data communications module, transmitting and receiving signals between the distant external data communications module and the second signal extender, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of transmitting signals between the first network extender and the second network extender may be selected from the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link. The steps of transmitting signals from the ComDoc and external data communications module to the signal extenders may be in a low radio frequency band and transmitting signals from the signal extenders to the ComDoc and external data communications module may be in a high radio frequency band, transmitting signals from the signal extenders to the network extenders may be in a high radio frequency band and transmitting signals from the network extenders to the signal extenders may be in the low radio frequency band, and transmitting signals between the network extenders may be on a high data rate system backbone. Half of the signals received by a signal extender in a microcell may be transmitted by handsets, ComDocs or external data communications modules in the microcell in a low radio frequency band and half of the signals received by the signal extender in a microcell may be transmitted by a network extender in the macrocell in a low radio frequency band. Half of the signals transmitted by a signal extender in a microcell may be received by the handsets, ComDocs or external data communications module in the microcell in a high radio frequency band and half of the signals transmitted by the signal extender in a microcell may be received by a network extender in the macrocell in a high radio frequency band. The transmitting and receiving signals between a handset, a ComDoc or an external data communications module may be conducted asynchronously with transmitting signals between other handsets, ComDocs or external data communications modules. The steps of transmitting and receiving signals may comprise using Frequency Division Multiple Access techniques for determining sub-bands in the high and low radio frequency bands. The steps of transmitting and receiving signals may comprise using Gaussian Minimum Shift Keying modulation for producing a radio frequency waveform. The transmitting and receiving signals from handsets, ComDocs or external data communications modules may comprise a primary mode and a secondary mode of operation. The primary mode of operation may comprise a DW wireless frequency protocol. The secondary mode of operation may be selected from the group of wireless protocols consisting of AMPS, D-AMPS, IS-95, IS-136, and GSM1900. The method may further comprise controlling an operational state of the wireless communication system by transmitting an operational state command to a network extender. The step of establishing a local voice communication path between a ComDoc and a external data communications module may comprise using two fixed frequencies in a sub-band spectrum for establishing a local voice channel. The step of establishing a local data communication path under a four channel Contiguous Channel Acquisition Protocol between a ComDoc and an external data communications module may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a ComDoc and an external data communications module may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a ComDoc and another ComDoc may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a ComDoc and a external data communications module may comprise using four fixed frequencies having a bandwidth of twelve times a bandwidth of an extended voice channel by combining twelve contiguous voice channels. The method may further comprise establishing a communication path for transmitting and receiving signals between a ComDoc and an external network via an external data communications module connected to the external network. The external network may be selected from the group consisting of a Public Switch Telephone Network, a fiber optic communication link, a coaxial cable, a public TCP/IP network, and a satellite communication link. The handsets may be communication docking bays. The handsets may also be external data communications modules. The transmitting signals may comprise digitizing, buffering and encoding voice frames and transmitting the voice frames in packets at a date rate that is at least twice that required for real-time decoding, whereby transmitting time requires less than half of real time, and receiving signals may comprise receiving and decoding the voice frame packets at a data rate that is equal to that required for real-time decoding, whereby receiving time requires less than half of real-time. The method may further comprise transmitting and receiving information over a reference channel for providing ComDocs and an external data communications module with time and date information, microcell and macrocell identification code, attention codes, and broadcast text messages. The method may further comprise transmitting and receiving information over a call initiation channel for handling ComDoc and external data communications module initial registration, periodic registration, authorization and short id assignment, call requests, call frequency assignment, call progress prior to voice and data channel use, and acknowledgement. The method may further comprise transmitting and receiving information over a call maintenance channel for call completion, call request, 911 position report, call handoff frequency, call waiting notification, voice message notification, text message notification, and acknowledgement.

In yet another embodiment of the present invention, a wireless communication system for voice and data signals comprises one or more macrocells and each macrocell having a plurality of microcells, a wireless set comprising one or more wireless devices selected from handsets, external data communications modules or communication docking bays; a signal extender located in the microcell; a network extender located in the macrocell; means for establishing a local communication path for transmitting and receiving signals between a local ComDoc and a local external data communications module within a same microcell via a signal extender, means for establishing an extended communication path for transmitting and receiving signals between an extended ComDoc and an extended external data communications module located within different microcells positioned within a same macrocell via signal extenders and a network extender, means for establishing a distant communication path for transmitting and receiving signals between a distant ComDoc and a distant external data communications module located within different microcells positioned within different macrocells via signal extenders and network extenders, means for asynchronously transmitting and receiving half-duplex signals over the communication paths using pairs of assigned communication path frequencies stabilized by a GPS-based frequency reference source; and a system-resident and decentralized Artificial Intelligence-based Distributive Routing System for monitoring and analyzing the transmitted and received signals over the communication paths, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The means for establishing a local communication path for transmitting and receiving signals between a local ComDoc and a local external data communications module within a same microcell via a signal extender may comprise a local ComDoc for encoding voice and data frame packets and transmitting these packets as radio frequency signals in a low radio frequency band, a signal extender for receiving, amplifying, and shifting a frequency of the local ComDoc and external data communications module signals in the low radio frequency band to a high radio frequency band and transmitting the high radio frequency band signals, an external data communications module for receiving signals in the high radio frequency band from the signal extender and decoding the received signals into a voice and data frame packet, the local external data communications module for encoding voice and data frame packets and transmitting these packets as radio frequency signals in a low radio frequency band, and the local handset for receiving signals in the high radio frequency band from the signal extender and decoding the received signals into a voice and data frame packet. The means for establishing an extended communication path for transmitting and receiving signals between an extended ComDoc and an extended external data communications module within different microcells positioned within a same macrocell via signal extenders and a network extender may comprise an extended ComDoc for encoding voice and data frame packets and transmitting these packets as radio frequency signals in a low frequency band, a first signal extender for receiving, amplifying, and shifting a frequency of the extended ComDoc signals in the low radio frequency band to a high radio frequency band and transmitting the high radio frequency band signals from the first signal extender to the network extender, the network extender for receiving, amplifying, and shifting a frequency of signal extender signals in the high radio frequency band to a low radio frequency band and transmitting the low radio frequency band signals from the network extender to selected signal extenders, a second signal extender for receiving, amplifying, and shifting a frequency of the network extender signals in the low frequency band to a high radio frequency band and transmitting the high radio frequency band signals, an extended external data communications module for receiving the second signal extender signals in the high radio frequency band and decoding the received signals into a voice and data frame packet the extended external data communications module for encoding voice and data frame packets and transmitting these packets as radio frequency signals in a low frequency band, the second signal extender for receiving, amplifying, and shifting a frequency of the external data communications module signals in the low radio frequency band to a high radio frequency band and transmitting the high radio frequency band signals from the second signal extender to the network extender, the first signal extender for receiving, amplifying, and shifting a frequency of the network extender signals in the low frequency band to a high radio frequency band and transmitting the high radio frequency band signals, and the extended ComDoc for receiving the first signal extender signals in the high radio frequency band and decoding the received signals into a voice and data frame packet. The means for establishing a distant communication path for transmitting and receiving signals between a distant ComDoc and a distant external data communications module within different microcells positioned within different macrocells via signal extenders and network extenders may further comprise a first network extender for receiving, amplifying the first signal extender signals and transmitting the first signal extender signals to a second network extender over a dedicated communication link, and the second network extender for receiving and shifting a frequency of first signal extender signals in the high radio frequency band to a low radio frequency band and transmitting the low radio frequency band signals from the second network extender to the second signal extender. A microcell may comprise a geographical area containing one or more handsets carried by mobile users, communication docking bays, external data communications modules, and a signal extender, and a macrocell may comprise a geographical area containing between one and twenty one microcells, and a network extender. The external data communications modules may comprise external communication paths for transmitting and receiving signals between the external data communications modules and an external communication network to enable ComDoc and devices associated with the external data communications modules to connect to the external network through the external data communications modules. The external network may be selected form the group consisting of a Public Switch Telephone Network, a fiber optic communication link, a coaxial cable, a public TCP/IP network, and a satellite communication link. The external data communications modules may comprise local communication paths for transmitting and receiving signals between the external data communications modules and a local communication network. The local communication network may be selected from the group consisting of wireless handsets associated with communication docking bays, wireless handsets associated with external data communications modules, communication docking bays associated with other communication docking bays, communication docking bays associated with external data communications modules, external data communications modules associated with other external data communications modules, local extension telephones connected to a Public Switch Telephone Network via the external data communications module, an infrared link, a Bluetooth link, a wired computer local area network, a wireless local area computer network, a security system and another external data communications module link. The external data communications modules may comprise a processor for controlling external data communications module operation comprising a digital signal processor, a controller, and memory, a user interface comprising a display, a keypad, visual indicator, audio annunciator, microphone and speaker, a vocoder connected to a microphone and speaker interface, a power manager, battery and power source, an external data interface, connections for fixed telephone handset extensions, connections to a Public Switch Telephone Network, a primary mode transceiver having a transmitter and two receivers connected to an omni-directional antenna for use with a DW protocol, and a secondary mode transceiver for providing service using a standard protocol. The external data communications modules may include optional interface connections selected from the group consisting of an infrared data interface, an external keyboard interface, an external monitor interface, a video camera interface, a Bluetooth interface, a LAN/cable modem interface, an E-911 position locator interface, a GPS position locator interface, a hard drive interface, a CD/DVD drive interface, a Public Switch Telephone Network modem interface, and an external antenna interface. The handsets, communication docking bays and external data communications modules may transmit voice and data packets half of the time and receive voice and data packets half of the time when in use.

An embodiment of the present invention is a method of operating a wireless communication system for voice and data signals. The system comprises one or more macrocells and each macrocell having a plurality of microcells. The method comprises establishing a local communication path for transmitting and receiving signals between a local handset and a remotely placed local external data communications module within a same microcell via a signal extender, establishing an extended communication path for transmitting and receiving signals between an extended external handset and an extended external data communications module located within different microcells positioned within a same macrocell via signal extenders and a network extender, establishing a distant communication path for transmitting and receiving signals between a distant handset and a distant external data communications module located within different microcells positioned within different macrocells via signal extenders and network extenders, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of establishing a local communication path may comprise transmitting signals from the local handset and the local external data communications module to the signal extender, receiving and re-transmitting signals by the signal extender to the local handset and the external data communications module, and receiving signals from the signal extender by the local handset and the external data communications module. The step of establishing an extended communication path may comprise transmitting signals from the extended handset and the extended external data communications module to the signal extenders, receiving and re-transmitting signals from the extended handset and the extended external data communications module by the signal extenders to the network extender, receiving and re-transmitting signals from the signal extenders by the network extender to the signal extenders, receiving and retransmitting signals from the network extender by the signal extender to the extended handset and extended external data communications module, and receiving signals from the signal extenders by the extended handset and the external data communications module. The step of establishing a distant communication path may comprise transmitting signals from the distant handset and the distant external data communications module to the signal extenders, receiving and re-transmitting signals from the distant handset and the distant external data communications module by the signal extenders to the network extenders, receiving and re-transmitting signals from the signal extenders by a network extender to another network extender, receiving and re-transmitting signals from a network extender by another network extender to signal extenders, receiving and re-transmitting signals from network extenders by signal extenders to the distant handset and the distant external data communications module, and receiving signals from signal extenders by the distant handset and the distant external data communications module. The step of receiving and re-transmitting signals by a network extender to another network extender may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. Half of the signals received by a signal extender in a microcell may be transmitted by handsets, communication docking bays or external data communications modules in the microcell in a low radio frequency band and half of the signals received by the signal extender in a macrocell may be transmitted by a network extender in the macrocell in a low radio frequency band. Half of the signals transmitted by a signal extender in a microcell may be received by the handsets, communications docking bays or external data communications modules in the microcell in a high radio frequency band and half of the signals transmitted by the signal extender in a macrocell may be received a network extender in the macrocell in a high radio frequency band. The transmitting and receiving signals between a handset, a communication docking bay or external data communications module may be conducted asynchronously with transmitting signals between other handsets, communications docking bays or external data communications modules. The step of establishing a local voice communication path between a handset, a communication docking bay or external data communications module may comprise using two fixed frequencies in a sub-band spectrum for establishing a local voice channel. The step of establishing a local data communication path under a four channel Contiguous Channel Acquisition Protocol between a handset, a communication docking bay or external data communications module may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a handset, a communication docking bay or external data communications module may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a handset, a communication docking bay or external data communications module may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a handset, a communication docking bay or external data communications module may comprise using four fixed frequencies having a bandwidth of twelve times a bandwidth of an extended voice channel by combining twelve contiguous voice channels. The method may further comprise establishing a communication path for transmitting and receiving signals between an external data communications module and an external network via a signal extender and a network extender connected to the external network. The external network may be selected from the group consisting of a Public Switch Telephone Network, a fiber optic communication link, a coaxial cable, a public TCP/IP network, and a satellite communication link. The method may further comprise establishing a communication path for transmitting and receiving signals between an external data communications module and an external network via communication docking bay connected to the external network. The external network may be selected from the group consisting of a Public Switch Telephone Network, a fiber optic communication link, a coaxial cable, a public TCP/IP network, and a satellite communication link. The method may further comprise establishing a communication path for transmitting and receiving signals between an external data communications module and a local communication network. The local communication network may be selected from the group consisting of wireless handsets associated with communication docking bays, wireless handsets associated with external data communications modules, external data communications modules associated with communication docking bays, external data communications modules associated with other external data communications modules, external data communications modules associated with wireless handsets, local extension telephones connected to a Public Switch Telephone Network via the external data communications module, an infrared link, a Bluetooth link, a wired computer local area network, a wireless local area computer network, a security system and another external data communications module link. The handsets may be communication docking bays or the handsets may be external data communications module.

Another embodiment of the present invention is a method of operating a wireless communication system for voice and data signals that comprises: establishing a local communication path for transmitting and receiving signals between a local handset and a local external data communications module within a same microcell comprising receiving and transmitting signals between the local handset and a signal extender, receiving and transmitting signals between the signal extender, the local handsets and the local external data communications module, and receiving and transmitting signals between the local external data communications module and the signal extender; establishing an extended communication path for transmitting and receiving signals between an extended handset and an extended external data communications module within different microcells positioned within a same macrocell comprising transmitting and receiving signals between the extended handset and a first signal extender, transmitting and receiving signals between the first signal extender and a network extender, transmitting and receiving signals between the network extender and a second signal extender, transmitting and receiving signals between the second signal extender and the extended external data communications module, and transmitting and receiving signals between the extended external data communications module and the second signal extender; establishing a distant communication path for transmitting and receiving signals between distant a handset and a distant external data communications module within different microcells positioned within different macrocells comprising transmitting and receiving signals between the distant handset and a first signal extender, transmitting and receiving signals between the first signal extender and a first network extender, transmitting and receiving signals between the first network extender and a second network extender, transmitting and receiving signals between the second network extender and a second signal extenders, transmitting and receiving signals between the second signal extender and the distant external data communications module, transmitting and receiving signals between the distant external data communications module and the second signal extender, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of transmitting signals between the first network extender and the second network extender may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. The steps of transmitting signals from the handset and external data communications module to the signal extenders may be in a low radio frequency band and transmitting signals from the signal extenders to the handset and external data communications module may be in a high radio frequency band, transmitting signals from the signal extenders to the network extenders may be in a high radio frequency band and transmitting signals from the network extenders to the signal extenders may be in the low radio frequency band, and transmitting signals between the network extenders may be on a high data rate system backbone. Half of the signals received by a signal extender in a microcell may be transmitted by handsets and external data communications modules in the microcell in a low radio frequency band and half of the signals received by the signal extender in a microcell may be transmitted by a network extender in the macrocell in a low radio frequency band. Half of the signals transmitted by a signal extender in a microcell may be received by the handsets and external data communications module in the microcell in a high radio frequency band and half of the signals transmitted by the signal extender in a microcell may be received by a network extender in the macrocell in a high radio frequency band. The transmitting and receiving signals between a handset and a external data communications module may be conducted asynchronously with transmitting signals between other handsets and external data communications module. The steps of transmitting and receiving signals may comprise using Frequency Division Multiple Access techniques for determining sub-bands in the high and low radio frequency bands. The steps of transmitting and receiving signals may comprise using Gaussian Minimum Shift Keying modulation for producing a radio frequency waveform. The transmitting and receiving signals from handsets and external data communications module may comprise a primary mode and a secondary mode of operation. The primary mode of operation may comprise a DW wireless frequency protocol. The secondary mode of operation may be selected from the group of wireless protocols consisting of AMPS, D-AMPS, IS-95, IS-136, and GSM1900. The method may further comprise controlling an operational state of the wireless communication system by transmitting an operational state command to a network extender. The step of establishing a local voice communication path between a handset and a external data communications module may comprise using two fixed frequencies in a sub-band spectrum for establishing a local voice channel. The step of establishing a local data communication path under a four channel Contiguous Channel Acquisition Protocol between a handset and a external data communications module may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a handset and a external data communications module may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a handset and a communication docking bay may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a handset and a external data communications module may comprise using four fixed frequencies having a bandwidth of twelve times a bandwidth of an extended voice channel by combining twelve contiguous voice channels. The method may further comprise establishing a communication path for transmitting and receiving signals between a handset and an external network via external data communications module connected to the external network. The external network may be selected from the group consisting of a Public Switch Telephone Network, a fiber optic communication link, a coaxial cable, a public TCP/IP network, and a satellite communication link. The handsets may be communication docking bays. The handsets may also be external data communications modules. The transmitting signals may comprise digitizing, buffering and encoding voice frames and transmitting the voice frames in packets at a date rate that is at least twice that required for real-time decoding, whereby transmitting time requires less than half of real time, and receiving signals may comprise receiving and decoding the voice frame packets at a data rate that is equal to that required for real-time decoding, whereby receiving time requires less than half of real-time. The method may further comprise transmitting and receiving information over a reference channel for providing handsets and a external data communications module with time and date information, microcell and macrocell identification code, attention codes, and broadcast text messages. The method may further comprise transmitting and receiving information over a call initiation channel for handling handset and external data communications module initial registration, periodic registration, authorization and short id assignment, call requests, call frequency assignment, call progress prior to voice and data channel use, and acknowledgement. The method may further comprise transmitting and receiving information over a call maintenance channel for call completion, call request, 911 position report, call handoff frequency, call waiting notification, voice message notification, text message notification, and acknowledgement.

In yet another embodiment of the present invention, a wireless communication system for voice and data signals comprises one or more macrocells, each macrocell having a plurality of microcells; a wireless set comprising wireless devices comprising one or more wireless devices selected from handsets, external data communications modules or communication docking bays; a signal extender located in the microcell; a network extender located in the macrocell; means for establishing a local communication path for transmitting and receiving signals between a local handset and a external data communications module within a same microcell via a signal extender, means for establishing an extended communication path for transmitting and receiving signals between an extended handset and an extended external data communications module located within different microcells positioned within a same macrocell via signal extenders and a network extender, means for establishing a distant communication path for transmitting and receiving signals between a distant handset and a distant external data communications module located within different microcells positioned within different macrocells via signal extenders and network extenders, means for asynchronously transmitting and receiving half-duplex signals over the communication paths using pairs of assigned communication path frequencies stabilized by a GPS-based frequency reference source; and a system-resident and decentralized Artificial Intelligence-based Distributive Routing System for monitoring and analyzing the transmitted and received signals over the communication paths, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The means for establishing a local communication path for transmitting and receiving signals between a local handset and a local external data communications module within a same microcell via a signal extender may comprise a local handset for encoding voice and data frame packets and transmitting these packets as radio frequency signals in a low radio frequency band, a signal extender for receiving, amplifying, and shifting a frequency of the local handset and external data communications module signals in the low radio frequency band to a high radio frequency band and transmitting the high radio frequency band signals, a external data communications module for receiving signals in the high radio frequency band from the signal extender and decoding the received signals into a voice and data frame packet, the local external data communications module for encoding voice and data frame packets and transmitting these packets as radio frequency signals in a low radio frequency band, and the local handset for receiving signals in the high radio frequency band from the signal extender and decoding the received signals into a voice and data frame packet. The means for establishing an extended communication path for transmitting and receiving signals between an extended handset and an extended external data communications module within different microcells positioned within a same macrocell via signal extenders and a network extender may comprise an extended handset for encoding voice and data frame packets and transmitting these packets as radio frequency signals in a low frequency band, a first signal extender for receiving, amplifying, and shifting a frequency of the extended handset signals in the low radio frequency band to a high radio frequency band and transmitting the high radio frequency band signals from the first signal extender to the network extender, the network extender for receiving, amplifying, and shifting a frequency of signal extender signals in the high radio frequency band to a low radio frequency band and transmitting the low radio frequency band signals from the network extender to selected signal extenders, a second signal extender for receiving, amplifying, and shifting a frequency of the network extender signals in the low frequency band to a high radio frequency band and transmitting the high radio frequency band signals, an extended external data communications module for receiving the second signal extender signals in the high radio frequency band and decoding the received signals into a voice and data frame packet the extended external data communications module for encoding voice and data frame packets and transmitting these packets as radio frequency signals in a low frequency band, the second signal extender for receiving, amplifying, and shifting a frequency of the external data communications module signals in the low radio frequency band to a high radio frequency band and transmitting the high radio frequency band signals from the second signal extender to the network extender, the first signal extender for receiving, amplifying, and shifting a frequency of the network extender signals in the low frequency band to a high radio frequency band and transmitting the high radio frequency band signals, and the extended handset for receiving the first signal extender signals in the high radio frequency band and decoding the received signals into a voice and data frame packet. The means for establishing a distant communication path for transmitting and receiving signals between a distant handset and a distant external data communications module within different microcells positioned within different macrocells via signal extenders and network extenders may further comprise a first network extender for receiving, amplifying the first signal extender signals and transmitting the first signal extender signals to a second network extender over a dedicated communication link, and the second network extender for receiving and shifting a frequency of first signal extender signals in the high radio frequency band to a low radio frequency band and transmitting the low radio frequency band signals from the second network extender to the second signal extender. A microcell may comprise a geographical area containing one or more handsets carried by mobile users, communication docking bays, external data communications modules, and a signal extender, and a macrocell may comprise a geographical area containing between one and twenty one microcells, and a network extender. The external data communications modules may comprise external communication paths for transmitting and receiving signals between the external data communications modules and an external communication network to enable handsets and devices associated with the external data communications modules to connect to the external network through the external data communications modules. The external network may be selected form the group consisting of a Public Switch Telephone Network, a fiber optic communication link, a coaxial cable, a public TCP/IP network, and a satellite communication link. The external data communications modules may comprise local communication paths for transmitting and receiving signals between the external data communications modules and a local communication network. The local communication network may be selected from the group consisting of wireless handsets associated with communication docking bays, wireless handsets associated with external data communications modules, communication docking bays associated with other communication docking bays, communication docking bays associated with external data communications modules, external data communications modules associated with other external data communications modules, local extension telephones connected to a Public Switch Telephone Network via the external data communications module, an infrared link, a Bluetooth link, a wired computer local area network, a wireless local area computer network, a security system and another external data communications module link. The external data communications modules may comprise a processor for controlling external data communications module operation comprising a digital signal processor, a controller, and memory, a user interface comprising a display, a keypad, visual indicator, audio annunciator, microphone and speaker, a vocoder connected to a microphone and speaker interface, a power manager, battery and power source, an external data interface, connections for fixed telephone handset extensions, connections to a Public Switch Telephone Network, a primary mode transceiver having a transmitter and two receivers connected to an omni-directional antenna for use with a DW protocol, and a secondary mode transceiver for providing service using a standard protocol. The external data communications modules may include optional interface connections selected from the group consisting of an infrared data interface, an external keyboard interface, an external monitor interface, a video camera interface, a Bluetooth interface, a LAN/cable modem interface, an E-911 position locator interface, a GPS position locator interface, a hard drive interface, a CD/DVD drive interface, a Public Switch Telephone Network modem interface, and an external antenna interface. The handsets, communication docking bays and external data communications modules may transmit voice and data packets half of the time and receive voice and data packets half of the time when in use.

An embodiment of the present invention is a method of operating a wireless communication system for voice and data signals that comprises establishing a local communication path for transmitting and receiving signals between a local handset and a local communication docking bay within a same microcell via a signal extender, establishing an extended communication path for transmitting and receiving signals between an extended handset and an extended communication docking bay located within different microcells positioned within a same macrocell via signal extenders and a network extender, establishing a distant communication path for transmitting and receiving signals between a distant handset and a distant communication docking bay located within different microcells positioned within different macrocells via signal extenders and network extenders, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of establishing a local communication path may comprise transmitting signals from the local handset and the local communication docking bay to the signal extender, receiving and re-transmitting signals by the signal extender to the local handset and the local communication docking bay, and receiving signals from the signal extender by the local handset and the local communication docking bay. The step of establishing an extended communication path may comprise transmitting signals from the extended handset and the extended communication docking bay to the signal extenders, receiving and re-transmitting signals from the extended handset and the extended communication docking bay by the signal extenders to the network extender, receiving and re-transmitting signals from the signal extenders by the network extender to the signal extenders, receiving and retransmitting signals from the network extender by the signal extender to the extended handset and extended communication docking bay, and receiving signals from the signal extenders by the extended handset and the extended communication docking bay. The step of establishing a distant communication path may comprise transmitting signals from the distant handset and the distant communication docking bay to the signal extenders, receiving and re-transmitting signals from the distant handset and the distant communication docking bay by the signal extenders to the network extenders, receiving and re-transmitting signals from the signal extenders by a network extender to another network extender, receiving and re-transmitting signals from a network extender by another network extender to signal extenders, receiving and re-transmitting signals from network extenders by signal extenders to the distant handset and the distant communication docking bay, and receiving signals from signal extenders by the distant handset and the distant communication docking bay. The step of receiving and re-transmitting signals by a network extender to another network extender may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. Half of the signals received by a signal extender in a microcell may be transmitted by handsets and communication docking bays in the microcell in a low radio frequency band and half of the signals received by the signal extender in a macrocell may be transmitted by a network extender in the macrocell in a low radio frequency band. Half of the signals transmitted by a signal extender in a microcell may be received by the handsets and docking bays in the microcell in a high radio frequency band and half of the signals transmitted by the signal extender in a macrocell may be received a network extender in the macrocell in a high radio frequency band. The transmitting and receiving signals between a handset and a communication docking bay may be conducted asynchronously with transmitting signals between other handsets and docking bays. The step of establishing a local voice communication path between a handset and a communication docking bay may comprise using two fixed frequencies in a sub-band spectrum for establishing a local voice channel. The step of establishing a local data communication path under a four channel Contiguous Channel Acquisition Protocol between a handset and a communication docking bay may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a handset and a communication docking bay may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a handset and a communication docking bay may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a handset and a communication docking bay may comprise using four fixed frequencies having a bandwidth of twelve times a bandwidth of an extended voice channel by combining twelve contiguous voice channels. The method may further comprise establishing a communication path for transmitting and receiving signals between a handset and an external network via a signal extender and a network extender connected to the external network. The external network may be selected from the group consisting of a Public Switch Telephone Network, a fiber optic communication link, a coaxial cable, a public TCP/IP network, and a satellite communication link. The method may further comprise establishing a communication path for transmitting and receiving signals between a handset and an external network via communication docking bay connected to the external network. The external network may be selected from the group consisting of a Public Switch Telephone Network, a fiber optic communication link, a coaxial cable, a public TCP/IP network, and a satellite communication link. The method may further comprise establishing a communication path for transmitting and receiving signals between a communication docking bay and a local communication network. The local communication network may be selected from the group consisting of wireless handsets associated with the communication docking bay, local extension telephones connected to a Public Switch Telephone Network via the communication docking bay, an infrared link, a Bluetooth link, a wired computer local area network, a wireless local area computer network, a security system and another communication docking bay link. The handsets may be communication docking bays.

Another embodiment of the present invention is a method of operating a wireless communication system for voice and data signals that comprises: establishing a local communication path for transmitting and receiving signals between a local handset and a local communication docking bay within a same microcell comprising receiving and transmitting signals between the local handset and a signal extender, receiving and transmitting signals between the signal extender, the local handsets and the local communication docking bay, and receiving and transmitting signals between the local communication docking bay and the signal extender; establishing an extended communication path for transmitting and receiving signals between an extended handset and an extended communication docking bay within different microcells positioned within a same macrocell comprising transmitting and receiving signals between the extended handset and a first signal extender, transmitting and receiving signals between the first signal extender and a network extender, transmitting and receiving signals between the network extender and a second signal extender, transmitting and receiving signals between the second signal extender and the extended communication docking bay, and transmitting and receiving signals between the extended communication docking bay and the second signal extender; establishing a distant communication path for transmitting and receiving signals between distant a handset and a distant communication docking bay within different microcells positioned within different macrocells comprising transmitting and receiving signals between the distant handset and a first signal extender, transmitting and receiving signals between the first signal extender and a first network extender, transmitting and receiving signals between the first network extender and a second network extender, transmitting and receiving signals between the second network extender and a second signal extenders, transmitting and receiving signals between the second signal extender and the distant communication docking bay, transmitting and receiving signals between the distant communication docking bay and the second signal extender, and asynchronously transmitting and receiving half-duplex signals over the communication paths using pairs of assigned communication path frequencies stabilized by a GPS-based frequency reference source. The communication paths can be monitored by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The step of transmitting signals between the first network extender and the second network extender may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. The steps of transmitting signals from the handset and communication docking bay to the signal extenders may be in a low radio frequency band and transmitting signals from the signal extenders to the handset and communication docking bay may be in a high radio frequency band, transmitting signals from the signal extenders to the network extenders may be in a high radio frequency band and transmitting signals from the network extenders to the signal extenders may be in the low radio frequency band, and transmitting signals between the network extenders may be on a high data rate system backbone. Half of the signals received by a signal extender in a microcell may be transmitted by handsets and communication docking bays in the microcell in a low radio frequency band and half of the signals received by the signal extender in a microcell may be transmitted by a network extender in the macrocell in a low radio frequency band. Half of the signals transmitted by a signal extender in a microcell may be received by the handsets and communication docking bays in the microcell in a high radio frequency band and half of the signals transmitted by the signal extender in a microcell may be received by a network extender in the macrocell in a high radio frequency band. The transmitting and receiving signals between a handset and a communication docking bay may be conducted asynchronously with transmitting signals between other handsets and communication docking bays. The steps of transmitting and receiving signals may comprise using Frequency Division Multiple Access techniques for determining sub-bands in the high and low radio frequency bands. The steps of transmitting and receiving signals may comprise using Gaussian Minimum Shift Keying modulation for producing a radio frequency waveform. The transmitting and receiving signals from handsets and communication docking bays may comprise a primary mode and a secondary mode of operation. The primary mode of operation may comprise a DW wireless frequency protocol. The secondary mode of operation may be selected from the group of wireless protocols consisting of AMPS, D-AMPS, IS-95, IS-136, and GSM1900. The method may further comprise controlling an operational state of the wireless communication system by transmitting an operational state command to a network extender. The step of establishing a local voice communication path between a handset and a communication docking bay may comprise using two fixed frequencies in a sub-band spectrum for establishing a local voice channel. The step of establishing a local data communication path under a four channel Contiguous Channel Acquisition Protocol between a handset and a communication docking bay may comprise using two fixed frequencies having a bandwidth of four times a bandwidth of a local voice channel by combining four contiguous voice channels. The step of establishing a local data communication path under a twelve channel Contiguous Channel Acquisition Protocol Plus between a handset and a communication docking bay may comprise using two fixed frequencies having a bandwidth of twelve times a bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between a handset and a communication docking bay may comprise using four fixed frequencies having a bandwidth of four times a bandwidth of an extended voice channel by combining four contiguous voice channels. The step of establishing an extended data communication path under a twelve channel Contiguous Channel Acquisition Protocol Plus between a handset and a communication docking bay may comprise using four fixed frequencies having a bandwidth of twelve times a bandwidth of an extended voice channel by combining twelve contiguous voice channels. The method may further comprise establishing a communication path for transmitting and receiving signals between a handset and an external network via communication docking bay connected to the external network. The external network may be selected from the group consisting of a Public Switch Telephone Network, a fiber optic communication link, a coaxial cable, a public TCP/IP network, and a satellite communication link. The handsets may be communication docking bays. The transmitting signals may comprise digitizing, buffering and encoding voice frames and transmitting the voice frames in packets at a date rate that is at least twice that required for real-time decoding, whereby transmitting time requires less than half of real time, and receiving signals may comprise receiving and decoding the voice frame packets at a data rate that is equal to that required for real-time decoding, whereby receiving time requires less than half of real-time. The method may further comprise transmitting and receiving information over a reference channel for providing handsets and a communication docking bays with time and date information, microcell and macrocell identification code, attention codes, and broadcast text messages. The method may further comprise transmitting and receiving information over a call initiation channel for handling handset and communication docking bay initial registration, periodic registration, authorization and short id assignment, call requests, call frequency assignment, call progress prior to voice and data channel use, and acknowledgement. The method may further comprise transmitting and receiving information over a call maintenance channel for call completion, call request, 911 position report, call handoff frequency, call waiting notification, voice message notification, text message notification, and acknowledgement.

In yet another embodiment of the present invention, a wireless communication system for voice and data signals comprises one or more macrocells, each macrocell having a plurality of microcells; a wireless set comprising wireless devices comprising one or more wireless devices selected from handsets, external data communications modules or communication docking bays; a signal extender located in the microcell; a network extender located in the macrocell; means for establishing a local communication path for transmitting and receiving signals between a local handset and a communication docking bay within a same microcell via a signal extender, means for establishing an extended communication path for transmitting and receiving signals between an extended handset and an extended communication docking bay located within different microcells positioned within a same macrocell via signal extenders and a network extender, means for establishing a distant communication path for transmitting and receiving signals between a distant handset and a distant communication docking bay located within different microcells positioned within different macrocells via signal extenders and network extenders, means for asynchronously transmitting and receiving half-duplex signals over the communication paths using pairs of assigned communication path frequencies stabilized by a GPS-based frequency reference source; and a system-resident and decentralized Artificial Intelligence-based Distributive Routing System for monitoring and analyzing the transmitted and received signals over the communication paths, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The means for establishing a local communication path for transmitting and receiving signals between a local handset and a local communication docking bay within a same microcell via a signal extender may comprise a local handset for encoding voice and data frame packets and transmitting these packets as radio frequency signals in a low radio frequency band, a signal extender for receiving, amplifying, and shifting a frequency of the local handset and communication docking bay signals in the low radio frequency band to a high radio frequency band and transmitting the high radio frequency band signals, a local communication docking bay for receiving signals in the high radio frequency band from the signal extender and decoding the received signals into a voice and data frame packet, the local communication docking bay for encoding voice and data frame packets and transmitting these packets as radio frequency signals in a low radio frequency band, and the local handset for receiving signals in the high radio frequency band from the signal extender and decoding the received signals into a voice and data frame packet. The means for establishing an extended communication path for transmitting and receiving signals between an extended handset and an extended communication docking bay within different microcells positioned within a same macrocell via signal extenders and a network extender may comprise an extended handset for encoding voice and data frame packets and transmitting these packets as radio frequency signals in a low frequency band, a first signal extender for receiving, amplifying, and shifting a frequency of the extended handset signals in the low radio frequency band to a high radio frequency band and transmitting the high radio frequency band signals from the first signal extender to the network extender, the network extender for receiving, amplifying, and shifting a frequency of signal extender signals in the high radio frequency band to a low radio frequency band and transmitting the low radio frequency band signals from the network extender to selected signal extenders, a second signal extender for receiving, amplifying, and shifting a frequency of the network extender signals in the low frequency band to a high radio frequency band and transmitting the high radio frequency band signals, an extended communication docking bay for receiving the second signal extender signals in the high radio frequency band and decoding the received signals into a voice and data frame packet the extended communication docking bay for encoding voice and data frame packets and transmitting these packets as radio frequency signals in a low frequency band, the second signal extender for receiving, amplifying, and shifting a frequency of the extended communication docking bay signals in the low radio frequency band to a high radio frequency band and transmitting the high radio frequency band signals from the second signal extender to the network extender, the first signal extender for receiving, amplifying, and shifting a frequency of the network extender signals in the low frequency band to a high radio frequency band and transmitting the high radio frequency band signals, and the extended handset for receiving the first signal extender signals in the high radio frequency band and decoding the received signals into a voice and data frame packet. The means for establishing a distant communication path for transmitting and receiving signals between a distant handset and a distant communication docking bay within different microcells positioned within different macrocells via signal extenders and network extenders may further comprise a first network extender for receiving, amplifying the first signal extender signals and transmitting the first signal extender signals to a second network extender over a dedicated communication link, and the second network extender for receiving and shifting a frequency of first signal extender signals in the high radio frequency band to a low radio frequency band and transmitting the low radio frequency band signals from the second network extender to the second signal extender. A microcell may comprise a geographical area containing one or more handsets carried by mobile users, communication docking bays, and a signal extender, and a macrocell may comprise a geographical area containing between one and twenty one microcells, and a network extender. The communication docking bays may comprise external communication paths for transmitting and receiving signals between the communication docking bays and an external communication network to enable handsets and devices associated with the docking bays to connect to the external network through the docking bays. The external network may be selected form the group consisting of a Public Switch Telephone Network, a fiber optic communication link, a coaxial cable, a public TCP/IP network, and a satellite communication link. The communication docking bays may comprise local communication paths for transmitting and receiving signals between the communication docking bays and a local communication network. The local communication network may be selected from the group consisting of wireless handsets associated with the communication docking bay, local extension telephones connected to a Public Switch Telephone Network via the communication docking bay, an infrared link, a Bluetooth link, a wired computer local area network, a wireless local area computer network, a security system and another communication docking bay link. The communication docking bays may comprise a processor for controlling communication docking bay operation comprising a digital signal processor, a controller, and memory, a user interface comprising a display, a keypad, visual indicator, audio annunciator, microphone and speaker, a vocoder connected to a microphone and speaker interface, a power manager, mobile handset recharge bays, battery and power source, an external data interface, connections for fixed telephone handset extensions, connections to a Public Switch Telephone Network, a primary mode transceiver having a transmitter and two receivers connected to an omni-directional antenna for use with a DW protocol, and a secondary mode transceiver for providing service using a standard protocol. The communication docking bays may include optional interface connections selected from the group consisting of an infrared data interface, an external keyboard interface, an external monitor interface, a video camera interface, a Bluetooth interface, a LAN/cable modem interface, an E-911 position locator interface, a GPS position locator interface, a hard drive interface, a CD/DVD drive interface, a Public Switch Telephone Network modem interface, and an external antenna interface. The handsets and communication docking bays may transmit voice and data packets half of the time and receive voice and data packets half of the time when in use.

In yet another embodiment of the present invention is a method for operating a wireless communication system for voice and data signals, the system comprising one or more macrocells and each macrocell having a plurality of microcells. The method comprises establishing a local communication path for transmitting and receiving signals between a local communications docking bay (ComDoc) and a remotely placed local external data communications module (X-DatCom) within a same microcell via a signal extender, establishing an extended communication path for transmitting and receiving signals between an extended ComDoc and an extended external data communication module located within different microcells positioned within a same macrocell via signal extenders and a network extender, establishing a distant communication path for transmitting and receiving signals between a distant ComDoc and a distant external data communications module located within different microcells positioned within different macrocells via signal extenders and network extenders, and asynchronously transmitting and receiving half-duplex signals over the communication paths using pairs of assigned communication path frequencies stabilized by a GPS-based frequency reference source. The communication paths can be monitored and analyzed by a system-resident and decentralized Artificial Intelligence-based Distributive Routing System, resulting in re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system. The wireless devices can be a handset, an external communications module, or a docking bay. The wireless devices can also have wireless fidelity (WiFi) options to provide connectivity to other devices within or outside the system.

Turning now to FIG. 1, FIG. 1 shows a deployment 10 of two embodiments 11, 12 of a wireless communication system connected to other communication networks 15, 16, 18, 19, and 1500 in accordance with the present inventive concepts. The wireless communication systems 11, 12 are composed of fundamental elements that include handsets 300, ComDocs 900, X-DatComs 400, signal extenders (SE) 600, and network extenders (NE) 800. The handsets 300 are similar in features and functions to cellular and PCS handsets. They support at least two mobile wireless protocols: a novel Direct Wireless protocol (DW mode) described in the present disclosure, and a secondary standard wireless protocol (roaming mode) selected from a multiple of protocols (AMPS, D-AMPS, IS-95, IS-136, and GSM1900). The present invention includes the DW protocol. The secondary protocol may be selected from several standard alternative protocols. The system infrastructure for the secondary protocol is not addressed in this disclosure. The wireless communication system infrastructure (SEs 600 and NEs 800) and the DW wireless protocol are completely independent of the secondary mode. In a preferred embodiment, there is no formal or actual connection between the signal extender (SE) 600 and the PSTN 19. The connection is accomplished by giving the SE its own ComDocs 900 waiting for the SE to utilize them wirelessly.

The X-DatCom 400 is a communications device utilizing two alternate wireless communications protocols, the DW Protocol for wireless communications over the frequencies also designated for DW wireless handsets, DW wireless ComDocs and an optional secondary wireless protocol (for each) selected from a multiple of protocols (AMPS, D-AMPS, IS-95, IS-136, and GSM1900), and a PSTN 19 landline communications protocol. The X-DatCom 400 is a remotely operated or preprogrammed wireless communications device designed to be remotely placed to gather data, send or receive data, transfer data, and control such other devices as may be attached to its circuitry externally. The device, in its simplest form, is a transmitter with related circuitry that gathers and wireless sends data on a predetermined schedule. In its most complicated form, the X-DatCom 400 is a remotely placed, remotely operated or preprogrammed autonomous ComDoc-like device without handset recharging capabilities; capable of remote control by wireless sets within the asynchronous wireless network or by the Artificial Intelligence-based Distributive Routing System 1300; a resident computer network within the asynchronous wireless network. The X-DatCom 400 may be operated as an alternative communications path for a DW wireless handset or ComDoc 400 to reach the PSTN 19 without accessing a signal path to the PSTN through the conventional signal extender 600 to network extender 800 frequency links, and network extender to PSTN interface. It may also serve as a communications path from available and attached landline telephone sets, through the X-DatCom 400 to a signal extender 600 to a DW wireless handset 300. The X-DatCom 400 can also serve as an alternative communications path for delivery of bi-directional wireless wideband Internet services to a selected computer via a signal extender 600 to network extender 800 to PSTN 19 interface signal path. The signal extender (SE) 600 is a relay that amplifies and translates the frequency of wireless radio frequency (RF) signals between handsets 300 and a Network Extender (NE) 800, between two handsets 300, between a ComDoc 900 and signal extender 600, and between handset 300 to signal extender 600 to ComDoc 900 to PSTN 19, between an X-DatCom 400 and signal extender 600, and between handset 300 to signal extender 600 to X-DatCom 400 to PSTN 19. The X-DatCom 400 can also serve as an alternative communications path for delivering wireless signals to an external PCS network 1500 or for relaying signals from a computer through a ComDoc 900 to a signal extender 600 to the X-DatCom 400 to reach such an external network; PCS 1500.

The ComDoc 900 (Communications Docking Bay) is a communications device utilizing two alternate wireless communications protocols, the DW Protocol for wireless communications over the frequencies also designated for DW wireless handsets 300 and an optional secondary wireless protocol selected from a multiple of protocols (AMPS, D-AMPS, IS-95, IS-136, and GSM1900), and a PSTN 19 landline communications protocol. The ComDoc 900 is an alternative communications path for DW wireless handset 300 to reach the PSTN 19 without accessing a signal path to the PSTN 19 through the conventional signal extender 600 to network extender 800 frequency links, and network extender 800 to PSTN 19 interface. The ComDoc 900 is also an alternative communications path for the X-DatCom 400 to reach the PSTN 19 without accessing a signal path to the PSTN 19 through the conventional signal extender 600 to network extender 800 frequency links, and network extender 800 to PSTN 19 interface.

It also serves as a communications path from the home or office landline telephone sets, through the ComDoc 900 to a signal extender 600 to a DW wireless handset 300. The ComDoc 900 can also serve as an alternative communications path for delivery of bi-directional wireless wide-band Internet services to a home computer via a signal extender 600 to network extender 800 to PSTN interface signal path. The signal extender (SE) 600 is a relay that amplifies and translates the frequency of wireless radio frequency (RF) signals between handsets 300 and a Network Extender (NE) 800, between two handsets 300, between a ComDoc 900 and signal extender 600, and between handset 300 to signal extender 600 to ComDoc 900 to PSTN, between an X-DatCom 400 and signal extender 600, and between handset 300 to signal extender 600 to X-DatCom 400 to PSTN. The ComDoc 900 may be used to route a DW handset 300, via a Bluetooth interface to connect to the PCS network 1500 wirelessly. There are many permutations and combinations of signal paths that are possible in the present system. For example, handsets 300, ComDocs 900 or X-DatComs 400 in the same microcell may communicate with one another via a signal extender 600. Handsets 300, ComDocs 900 or X-DatComs 400 in different microcells but within the same macrocell may communicate with on another via signal extenders 600 and network extenders 800. Since computers and conventional telephones may be connected to a X-DatCom 400, these devices may also communicate with other devices connected to the wireless network 11, 14 or to 1500. Two or more computers may connect to one another via the wireless network, 11, 12 at a minimum data rate of 56 kbps using Contiguous Channel Acquisition Protocol, or up to a maximum data rate of 250 kbps using Contiguous Channel Acquisition Protocol Plus via a single signal extender 600. Similarly, since a laptop computer may be connected to a wireless handset 300, it may also communicate with other devices connected to the wireless network 11, 14 or 1500.

Since a X-DatCom 400 may also be connected to a PSTN 19, cable or other communication network medium, a handset may communicate directly or indirectly via a signal extender 600 to a remotely placed X-DatCom 400 to a PSTN 19 network or cable network. An X-DatCom 400 may communicate via a signal extender 600 and a network extender 800 to a PSTN network 19 or may communicate via a signal extender 600 and a network extender 800 to a PSTN network 19 to an external device 1400 for remote data gathering or extended remote control or the external device 1400.

The antenna pattern between the SE 600 and handsets 300, DatCom 400 or ComDocs 900 is generally omni-directional, since the handsets 300 are typically mobile throughout the surrounding area of the SE 600 or the DatCom 400 or ComDocs 900 may be moved or placed in different locations at the discretion of the subscriber. The antenna pattern of a handset 300, a ComDoc 900 or an X-DatCom 400, operating in the in the secondary mode, are also omni-directional. In contrast, the antenna pattern between the SE 600 and NE 800 can be a narrow beam since the SE 600 and NE 800 sites are both at fixed locations. The SE 600 is analogous to a simplified "base transceiver station" or BTS in a cellular or PCS system. A key point to simplification is that the SE 600 does not switch, process, or demodulate individual channels or calls unless otherwise instructed by the Artificial Intelligence Computer Network 1300 to make such connections during a catastrophic failure of the NE 800. It is generally limited in function to relaying blocks of RF spectrum. The NE 800 is a central hub and primary switch for interconnecting calls both within the system and to external networks such as the PSTN 19. The NE 800 assists handsets 300 in establishing calls, assists in interconnecting ComDocs 900 and handsets 300, X-DatCom 400 and handsets 300, or X-DatComs 400 and ComDocs 900 within the DW Protocol service area, assists ComDoc 900 to ComDoc 900 data links within the DW Protocol service area, manages the voice/data and signaling channels, and effectively connects calls for SEs 600 that are connected to the NE 800. Since the NE 800 must be in radio line-of-sight with the SEs 600 that it services, its location site may be critical in system deployment. An alternative fiber-optic SE 600-NE 800 catastrophic failure network is also an option. A hardware connection between the SE 600 and the NE 800 may substitute for difficult line-of-site deployments. The NE 800 is analogous to a simplified "mobile switching center" or MSC in a cellular or PCS system. While an MSC may be compared to a telephone CO (central office) or TO (toll office) 18, the NE 800 more closely compares to a PBX (Private Branch Exchange), which connects to a CO 18 or TO. The NE 800 enables the wireless communication systems 11, 12 to function independently of an external network; with the AI Network 1300, serving as a catastrophic failure backup routing system.

The wireless communication systems 11, 12 are deployed as networks as shown in FIG. 1. The networks 11, 12 each consists of one or more fixed NE 800 sites and a number of fixed SE 600 sites associated with each NE 800. The networks 11, 12 are essentially the infrastructure required to service mobile handsets 300, ComDocs 900 and X-DatComs 400 in a given geographical area. A network that includes multiple NEs 800 must support the exchange of digital voice, signaling, and data between NEs 800 in the network. The networks 11, 12 shown in FIG. 1, are isolated unless one or more NEs 800 or SEs 600 are connected to a PSTN 19, the Internet (for internet services or voice-over-IP) or to a dedicated fiber optic network 16. With PSTN 19 access, the networks 11, 12 can support calls between isolated networks 11, 12, as well as incoming and outgoing calls with other phones in the PSTN 19. Internet access via internet service providers (ISPs) 15 enable remote system monitoring, data entry, sharing of system databases and voice-over IP, while connection to a dedicated fiber optic cable 14 provides a dedicated fiber optic network 14 between NE's 800, an alternate dedicated fiber optic network 14 signal route between SEs 600 and NEs, or an alternate dedicated fiber optic network 14 signal route between SE 600 and SE 600. In a preferred embodiment, there is no formal or actual connection between the signal extender (SE) 600 and the PSTN 19. The connection is accomplished by giving the SE its own ComDocs 900 waiting for the SE to utilize them wirelessly.

In FIG. 1, the wireless communication system #1, 11 comprises three macrocells, where each macrocell includes a network extender 800 communicating with a number of signal extenders 600 that communicate with a number of handsets 300, ComDocs 900 and X-DatComs 400. The network extenders 800 and the signal extenders 600 are connected together by communication backbones 13. Network extenders 800 may also connect to a PSTN 19 via a trunk line 17 to a central switching office 18. Network extenders 800 may also connect to the Internet via a connection 14 to an Internet service provider 15. Signal Extenders may also connect to a PSTN 19 via backup trunk lines to a central switching office 18. Signal extenders 800 may also connect to the Internet via a connection 14 to an Internet service provider 15. Signal extenders 800 may alternately connect to the PSTN 19 during a catastrophic failure of the NE 800 as suggested by the AI Network 1300 through PSTN-SE Interface 1600. In a preferred embodiment, there is no formal or actual connection between the signal extender (SE) 600 and the PSTN 19. The connection is accomplished by giving the SE its own ComDocs 900 waiting for the SE to utilize them wirelessly.

Therefore, as shown in FIG. 1, wireless communication systems 11, 12 may be interconnected through the Internet 16, PSTN 19 connections, a ComDoc-to-PSTN interface, ComDoc-to-PSTN-Internet interface, an X-DatCom 400-to-PSTN interface, an X-DatCom 400-to-PCS network 1500 interface, an X-DatCom 400-to-ComDoc interface, a Handset 300-to-X-DatCom 400 interface, a PSTN 19-to-X-DatCom 400 interface, an X-DatCom 400-to-PSTN-to-External Device 1400 interface or an X-DatComs 400-to-PSTN-Internet interface. Numerous other permutations of routing and connections are also possible but not shown specifically.

The Artificial Intelligence (AI) Computer Network 1300 is part of the Artificial Intelligence-based Distributive Routing System which is resident but decentralized in the system. The system comprises a network of computers having a computer residing in each signal extender and each computer having an Artificial Intelligence software program to gather information regarding timely calling data, routing and wireless device use histories and to analyze the information for recommending or executing alternative communication paths within the entire system of the signal extenders and the network extender during excessive peak hours loading of the network extender or during a catastrophic failure of any signal extender or the network extender. For example, the AI system learns by constantly polling all wireless devices for usage, polls the ComDocs several times a day and night to ask if the landline connected to it is in use and constantly watches the NE to determine call loading and signs of failure. A limit may also be set on the number of calls that the NE is handling that in turn triggers the AI system to recommend to the system wireless sets with ComDocs use them or to SEs with dedicated ComDocs and PSTN lines to take the load off the NE. In a preferred embodiment, the limit is 95% capacity at the NE. The information obtained by the AI system can also be used to re-direct the communication paths to optimize call loads of the signal extenders and network extenders in the system, or to bypass any failed signal extenders or network extenders in the system.

The AI system may further report the day's gathered information to each of the other signal extenders for comparative analysis and making logical suggestions to the handsets, communications docking bays and External Data Communications Modules operating within the system. The Artificial Intelligence System may further be programmed to gather relevant data from remotely placed external data communications modules by means of a wireless protocol established for operations of the system. The wireless protocol is established for operations of the system interfaced with a network including but not limited to four Public Switch Telephone Network lines, a fiber optic communication link, a coaxial cable, a public TCP/IP network, a directional emergency tower to tower microwave link, a satellite communication link, a communication docking bay routed to other destinations and data collection devices selected by the Artificial Intelligence System.

Figure 2:
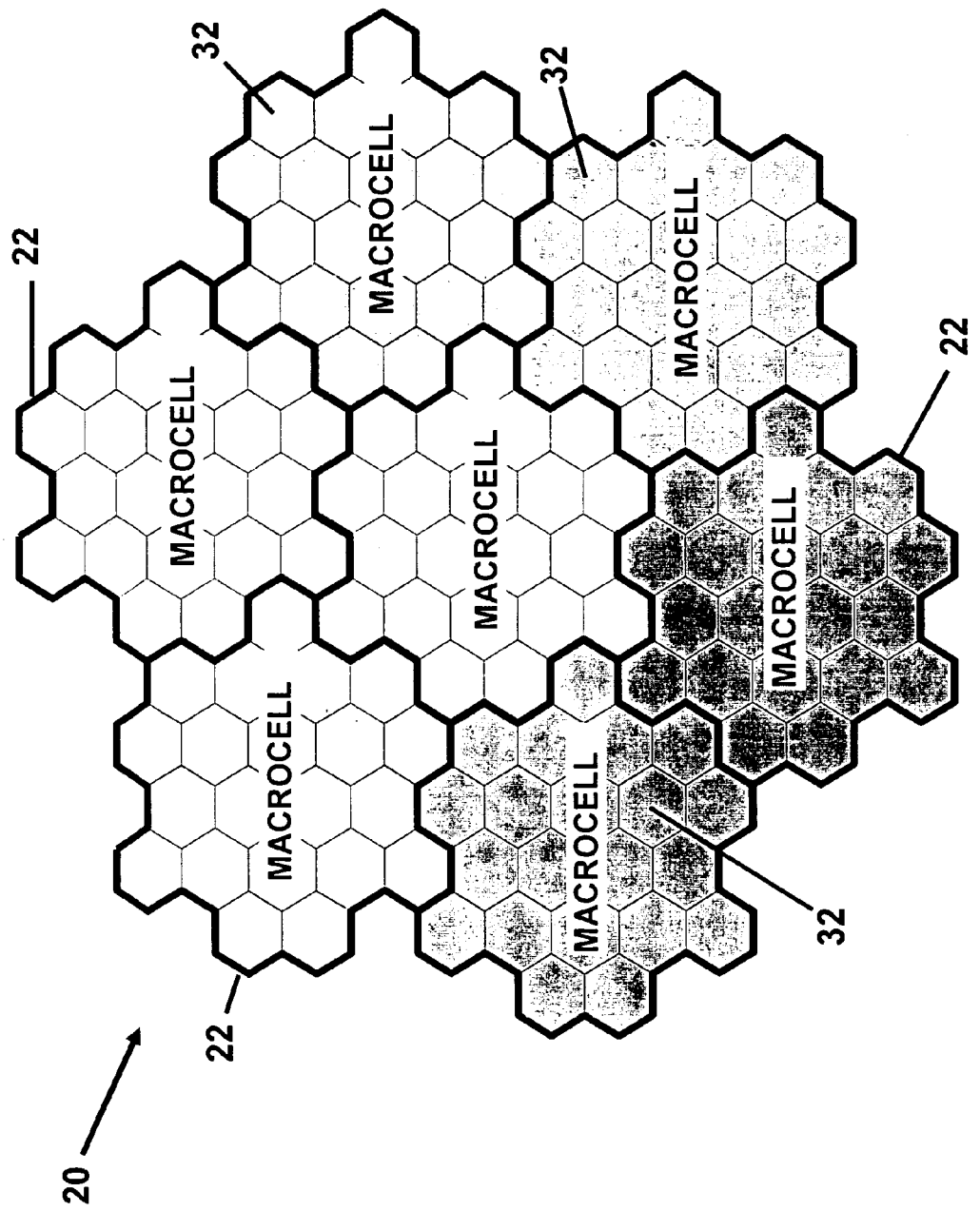
FIG. 2 shows a relationship between adjacent macrocells in a cellular topology.

Turning now to FIG. 2, FIG. 2 shows a relationship between adjacent macrocells 22 in a cellular topology 20. The fixed NE 800 and SE 600 sites of a wireless communication system are organized in a cellular topology 20 similar to the tower arrangement in a cellular or PCS system. The cellular topology 20 promotes frequency reuse and is effective in installation planning. In the present invention, two cell types are defined: microcells 32 and macrocells 22 containing multiple microcells 32. The microcell 32 is the basic building block, and the macrocell 22 is typically a group of 21 microcells 32 as shown in FIG. 2.

Figure 3:
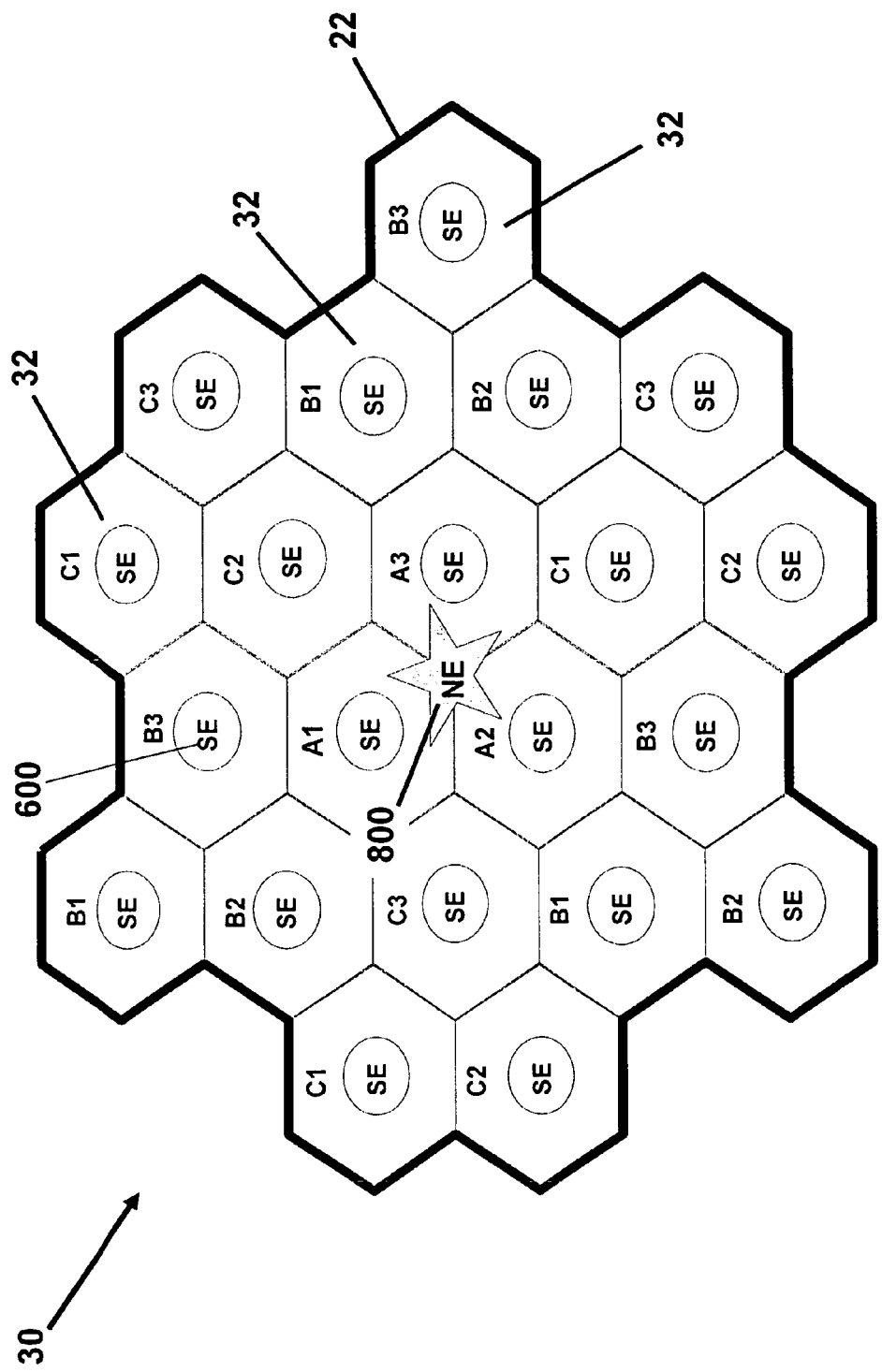
FIG. 3 shows a relationship between adjacent microcells in a macrocell topology.

Turning now to FIG. 3, FIG. 3 shows a relationship between adjacent microcells 32 in a macrocell topology 30. A SE 600 is central to each microcell 32, while an NE 800 is central to each macrocell 22. Nine different microcell types are defined, designated A1–3, B1–3, and C1–3, for the purpose of frequency division multiple access (FDMA). Each microcell type uses a common subset of frequencies. No two microcells 32 of the same type are ever adjacent, even when macrocells 32 are adjacent.

Figure 4:
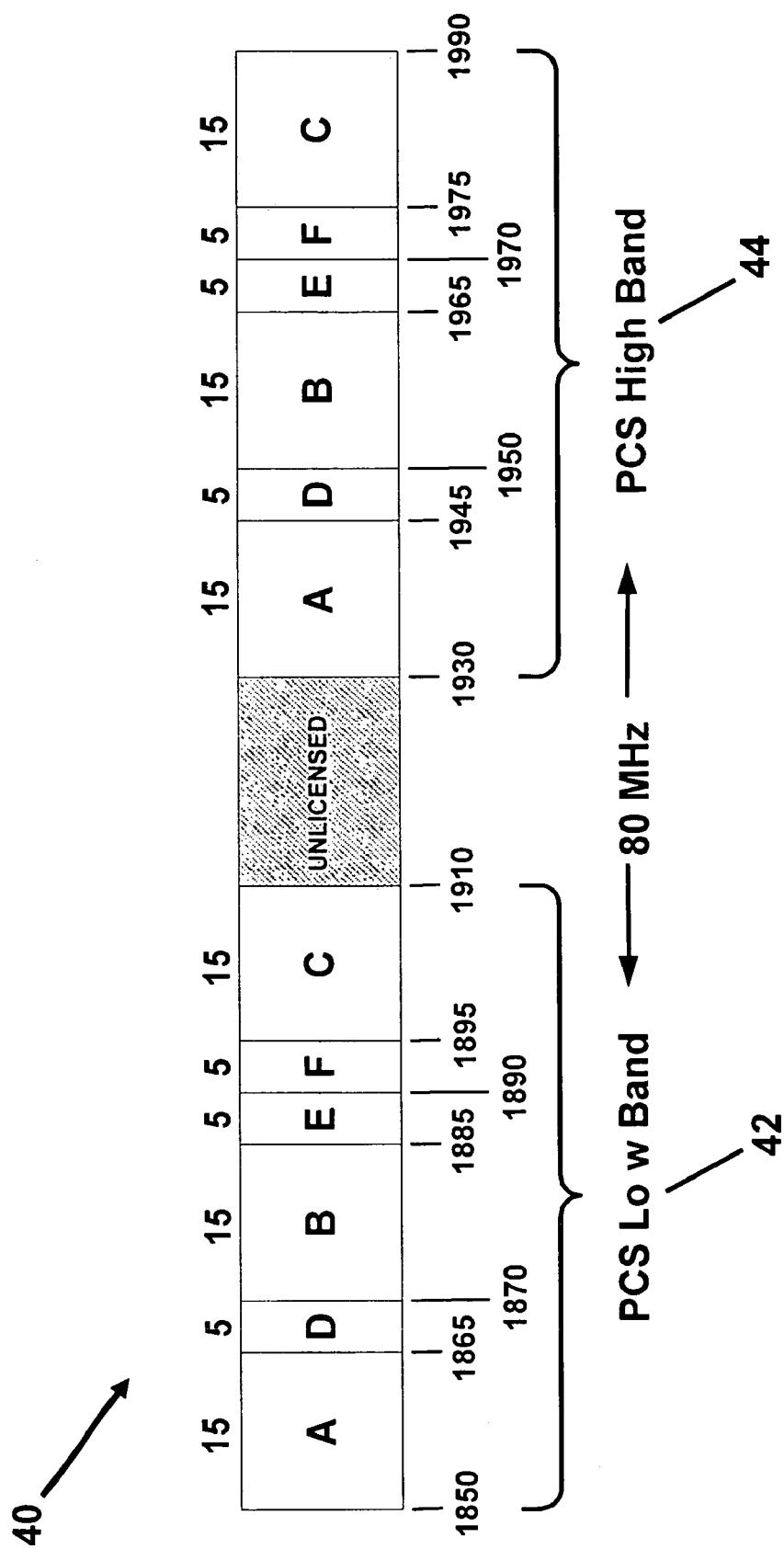
FIG. 4 shows the radio frequency spectrum used by the present wireless communication system.

Turning now to FIG. 4, FIG. 4 shows the radio frequency spectrum 40 used by the present wireless communication system. The present wireless communication system utilizes the Broadband PCS radio frequency spectrum, licensed in the United States by the FCC (Federal Communications Commission). The frequency range that it covers is between 1850 megahertz and 1990 megahertz, and includes PCS low band 42 and PCS high band 44. Licenses must be acquired for one or more PCS blocks, A through F, shown in FIG. 4.

Figure 5:
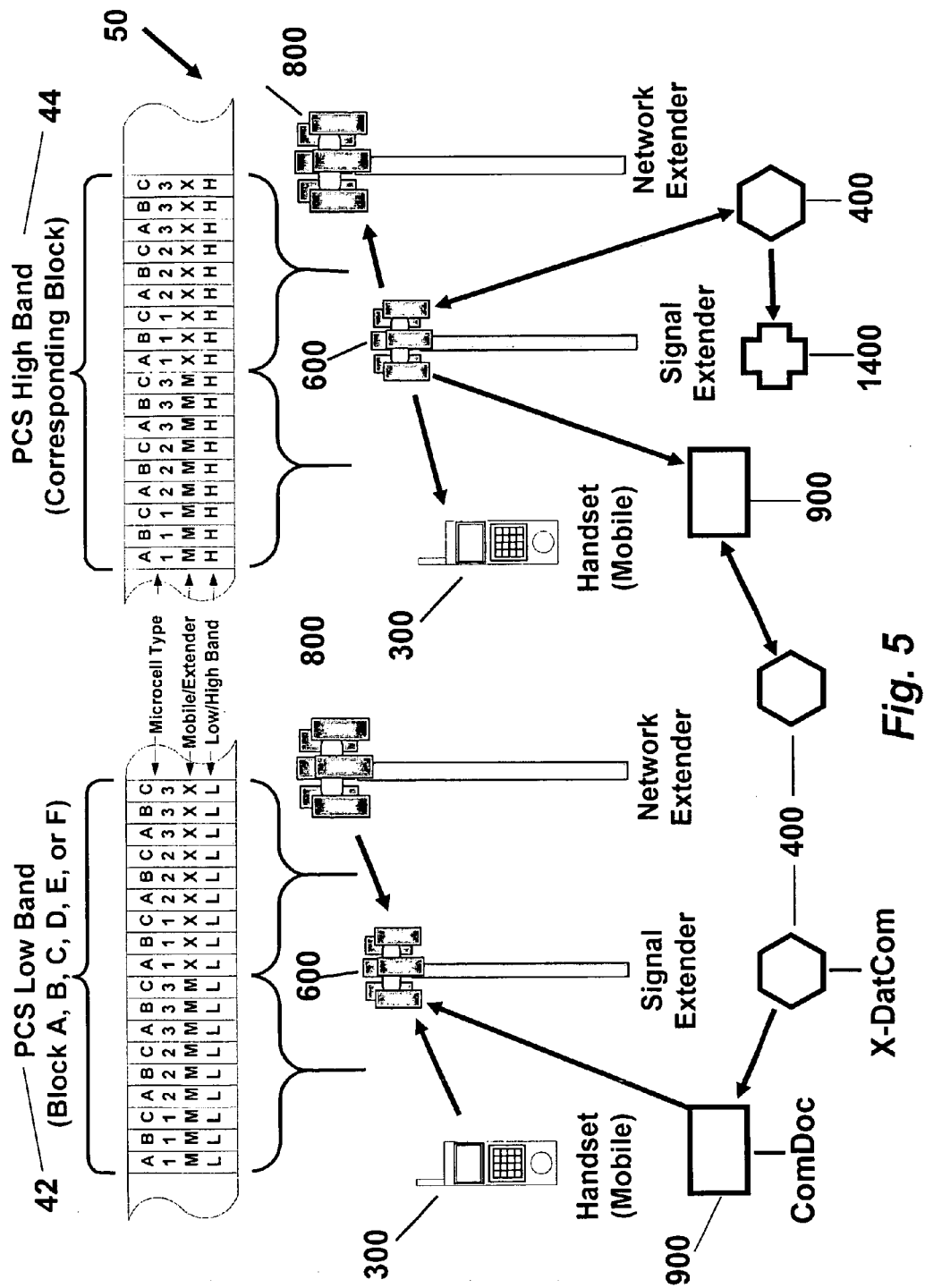
FIG. 5 shows the radio frequency protocol used by the present wireless communication system.

Turning now to FIG. 5, FIG. 5 shows the DW radio frequency protocol 50 used by the present wireless communication system. The DW protocol 50 utilizes the PCS spectrum as illustrated in FIG. 5. The PCS low band 42 is reserved for SE 600 receive frequencies, and the high band 44 for SE 600 transmit frequencies. Half of each band is reserved for signals between the SEs 600 and the handsets 300, between SE's 600 and ComDocs 900, or between SE's 600 and X-DatComs 400 with the other half for signals between the SEs 600 and the NE 800. Regarding the wireless communications system depicted in FIG. 5, a ComDoc 900 communicates with a SE 600 in the same manner that a handset 300 communicates with a SE 600 and an X-DatCom 400 also communicates with a SE 600 in the same manner that a handset 300 communicates with a SE 600. With duplex filtering and 80-MHz separation between the low band 42 and high band 44, the SE 600 can simultaneously receive and transmit signals without compromising receiver sensitivity. This frequency plan allows calls to take place asynchronously, which simplifies the design. Although many possible timing architectures may be used in the present wireless communication system, an asynchronous system architecture was selected to provide the best fit to the key requirements of cost, range, user density and human limitations to perceptibility of delayed audio signals within the DW Protocol network. Asynchronous operation of the present wireless communication system allows greater flexibility in system geographic layout, simpler digital protocol, and channel separation structure. Conventional digital cellular and PCS systems are designed such that synchronous operation is a necessity. CDMA cellular/PCS systems require synchronous operation to insure demodulation and precise coordination of power control and TDMA cellular/PCS systems require synchronous operation to prevent time slot interference. Synchronous operation allows the system design to make very efficient use of the assigned spectrum (high user density) for a given size geographic area for a trade-offs in system complexity, cost, flexibility and limits on relaying signals within a cell site's control. The present wireless communication system has lower density requirements (rural environment), so the advantages of asynchronous operation became very beneficial to the required cost effectiveness of the present system design. Human physiology is unable to detect delays in an audio signal of up to 80 milliseconds. Advantages of this asynchronous operation becomes very beneficial when sending signals from SE 600 to SE 600 over great distances that approach this 80 millisecond human threshold of detectability. Estimates by wireless engineers are in excess of 1,000 miles for the relaying of voice signals within this asynchronous system before the user becomes aware of a delay in the audio. No synchronous PCS system can even approach distances as great as 27 miles when relaying/repeating audio signals within a given cell tower's control; restricted by the speed of light and the absolute requirement to stay synchronized with the tower from which the audio signal derived and in which the handset is registered operationally. FIG. 5 also shows how the PCS bands are further divided into sub-bands dedicated for each of the 9 microcell types. Each microcell (see 32, FIG. 3) uses the sub-bands assigned for its particular type (alpha-numeric designator A1, A2, A3, B1, B2, B3, C1, C2, or C3) in order to preclude interference with adjacent microcells (since adjacent microcells are never of the same type). The microcell sub-bands are 825 kHz wide for PCS blocks ABC, and 275 kHz wide for blocks DEF. The definition of 9 microcell types provides two additional non-adjacent types beyond the minimum 7 that are required for a hexagonal cell layout with FDMA shown in FIG. 3. For a microcell 32 in the cell pattern illustrated in FIG. 3, the additional two non-adjacent types are the other two alpha designators with the same numeric designator. For example, the sub-bands for microcell types A2 and C2 are not used in the microcells adjacent to microcell B2. Sub-bands A1ML, A2ML, A3ML, B1ML, B2ML, B3ML, C1ML, C2ML and C3ML are assigned to communication from a handset 300, a ComDoc 900 or an X-DatCom 400 to a signal extender 600. Sub-bands A1MH, A2MH, A3MH, B1MH, B2MH, B3MH, C1MH, C2MH and C3MH are assigned to communication from a signal extender 600 to a handset 300, a ComDoc 900 or an X-DatCom 400. Sub-bands A1XL, A2XL, A3XL, B1XL, B2XL, B3XL, C1XL, C2XL and C3XL are assigned to communication from a network extender 800 to a signal extender 600. Sub-bands A1XH, A2XH, A3XH, B1XH, B2XH, B3XH, C1XH, C2XH and C3XH are assigned to communication from a signal extender 600 to a network extender 800.

Figure 6:
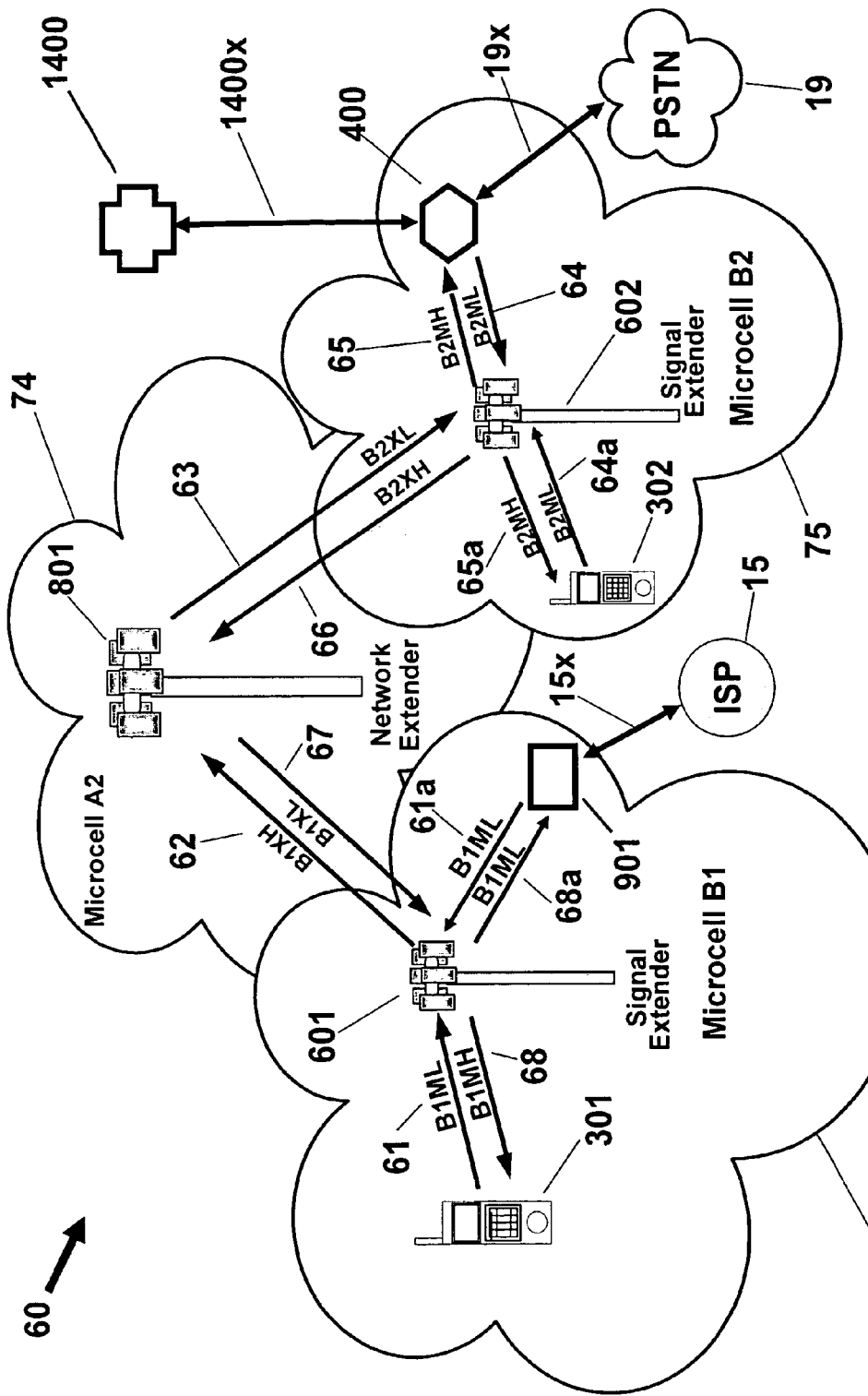
FIG. 6 shows a signal flow diagram of communication paths between a handset in one Microcell and a ComDoc in another Microcell.

Turning now to FIG. 6, FIG. 6 shows examples of signal flow in diagram 60 of communication paths 61, 62, 63, 64, 65, 66, 67, 68, 61a, 64a, 65a, 68a, 15x, 1400x and 19x. These paths illustrate signal flow between a handset 302, a ComDoc 901, located in two different microcells B1, 73 and B2, 75, respectively. These paths also illustrate a path of signal flow between a handset 301 and an X-DatCom 400; further connecting to a remote device 1400 via a dedicated connection 1400x; with handset 301 and X-DatCom 400 located in two different microcells B1, 73 and B2, 75, respectively. These paths further illustrate a path of signal flow between a handset 301, a signal extender 601, a network extender 801, a signal extender 602, a remotely placed X-DatCom 400, the PSTN 19, on to some designated landline number; with handset 301 and X-DatCom 400 located in two different microcells B1, 73 and B2, 75, respectively. Diagram 60 provides illustration of additional paths of signal flow between an X-DatCom 400, a signal extender, a network extender 800 and an Internet ISP. It also shows an example of a signal flow between handset 301, a signal extender 601, a ComDoc 901, located in the same microcell B1; interconnecting to an ISP 15, externally via a Cable 15x. Additional paths are further illustrated through the signal flow between a handset 302, a signal extender 602, an X-DatCom 400 and the PSTN 19; indicative of a path chosen to signal an X-DatCom 400, via the handset 302, to download data collected by the X-DatCom 400, to a remote location attached to the PSTN, 19 but not shown.

The signal flow diagram 60 illustrates an example of frequency usage in the system.

In FIG. 6, an extended path call is shown between the handset 302 and the ComDoc 901 in two different microcells 73, 75 that are switched at a NE 801 in a macrocell A2, 74. The communication from the handset 302 to the signal extender 602 in microcell B2, 75 is omni-directional and is carried on sub-band B2ML 64a. The communication from the signal extender 602 to the handset 302 in microcell B2, 75 is omni-directional and is carried on sub-band B2MH 65a. The communication from the signal extender 602 in microcell B2, 75 to the network extender 801 in macrocell A2, 74 is highly directional and is carried on sub-band B2XH 66. The communication from the network extender 801 in macrocell A2, 74 to the signal extender 602 in microcell B2, 75 is highly directional and is carried on sub-band B2XL 63. The communication from the network extender 801 in macrocell A2, 74 to the signal extender 601 in microcell B1, 73 is highly directional and is carried on sub-band B1XL 67. The communication from the signal extender 601 in microcell B1, 73 to the network extender 801 in macrocell A2, 74 is highly directional and is carried on sub-band B1XH 62. The communication from the signal extender 601 in microcell B1, 73 to the ComDoc 901 in microcell B1, 73 is omni-directional and is carried on sub-band B1MH 68a. The communication from the ComDoc 901 in microcell B1, 73 to the signal extender 601 in microcell B1, 73 is omni-directional and is carried on sub-band B1ML 61a.

A second extended path call is shown between the handset 301 and an X-DatCom 400 in two different microcells 73, 75 that are switched at a NE 801 in a macrocell A2, 74. The communication from the handset 301 to the signal extender 601 in microcell B1, 73 is omni-directional and is carried on sub-band B1ML 61. The communication from the signal extender 601 to the handset 301 in microcell B1, 73 is omni-directional and is carried on sub-band B1MH 68. The communication from the signal extender 601 in microcell B1, 73 to the network extender 801 in macrocell A2, 74 is highly directional and is carried on sub-band B1XH 62. The communication from the network extender 801 in macrocell A2, 74 to the signal extender 601 in microcell B1, 73 is highly directional and is carried on sub-band B1XL 67. The communication from the network extender 801 in macrocell A2, 74 to the signal extender 602 in microcell B2, 75 is highly directional and is carried on sub-band B2XL 63. The communication from the signal extender 602 in microcell B2, 75 to the network extender 801 in macrocell A2, 74 is highly directional and is carried on sub-band B2XH 66. The communication from the signal extender 602 in microcell B2, 75 to the X-DatCom 400 in microcell B2, 75 is omni-directional and is carried on sub-band B2MH 65. The communication from the X-DatCom 400 in microcell B2, 75 to the signal extender 602 in microcell B2, 75 is omni-directional and is carried on sub-band B2ML 64. The path to and from the remote device 1400, is hardwired to the X-DatCom 400. An alternate path at the X-DatCom 400 may route the signal from the remote device 1400, subsequently to an external PSTN landline telephone located outside this diagram. The active signal to make such a signal divert within the X-DatCom 400 from one destination to another may be sent by the origination handset 301 via the same path previously designated between the handset 301 and the X-DatCom 400; via a proprietary control code.

A third extended path call is shown between an X-DatCom 400 and an Internet ISP in two different microcells 73, 75 that are switched at a NE 801 in a macrocell A2, 74. The communication from the X-DatCom 400 to the signal extender 602 in microcell B2, 75 is omni-directional and is carried on sub-band B2ML 64. The communication from the signal extender 602 to the X-DatCom 400 in microcell B2, 75 is omni-directional and is carried on sub-band B2MH 65. The communication from the signal extender 602 in microcell B2, 75 to the network extender 801 in macrocell A2, 74 is highly directional and is carried on sub-band B2XH 66. The communication from the network extender 801 in macrocell A2, 74 to the signal extender 602 in microcell B2, 75 is highly directional and is carried on sub-band B2XL 63. The communication from the network extender 801 in macrocell A2, 74 to the signal extender 601 in microcell B1, 73 is highly directional and is carried on sub-band B1XL 67. The communication from the signal extender 601 in microcell B1, 73 to the network extender 801 in macrocell A2, 74 is highly directional and is carried on sub-band B1XH 62. The communication from the signal extender 601 in microcell B1, 73 to the ComDoc 901 in microcell B1, 73 is omni-directional and is carried on sub-band B1MH 68a. The communication from the ComDoc 901 in microcell B1, 73 to the signal extender 601 in microcell B1, 73 is omni-directional and is carried on sub-band B1ML 61a. The path to and from the ISP 15, from the ComDoc 901, is achieved via a cable provided by the ISP service provider.

In FIG. 6, a local path call is shown between the handset 301, a signal extender 601 and the ComDoc 901 in the same microcell 73. The communication from the handset 301 to the signal extender 601 in microcell B1, 73 is omni-directional and is carried on sub-band B1ML 61. The communication from the signal extender 601 to the handset 301 in microcell B1, 73 is omni-directional and is carried on sub-band B1MH 68. The communication from the signal extender 601 in microcell B1, 73 to the ComDoc 901 in microcell B1, 73 is omni-directional and is carried on sub-band B1MH 68a. The communication from the ComDoc 901 in microcell B1, 73 to the signal extender 601 in microcell B1, 73 is omni-directional and is carried on sub-band B1ML 61a.

An additional a local path call is shown between the handset 302, a signal extender 602, the X-DatCom 400 and an interface with the PSTN in the same microcell 75. The communication from the handset 302 to the signal extender 602 in microcell B2, 75 is omni-directional and is carried on sub-band B2ML 64a. The communication from the signal extender 602 to the handset 302 in microcell B2, 75 is omni-directional and is carried on sub-band B2MH 65a. The communication from the signal extender 602 in microcell B2, 75 to the X-DatCom 400 in microcell B2, 75 is omni-directional and is carried on sub-band B2MH 65. The communication from the X-DatCom in microcell B2, 75 to the signal extender 602 in microcell B2, 75 is omni-directional and is carried on sub-band B2ML 64. The path from the X-DatCom 400 to the PSTN is via a standard telephone line plugged into the X-DatCom 400.

Figure 7:
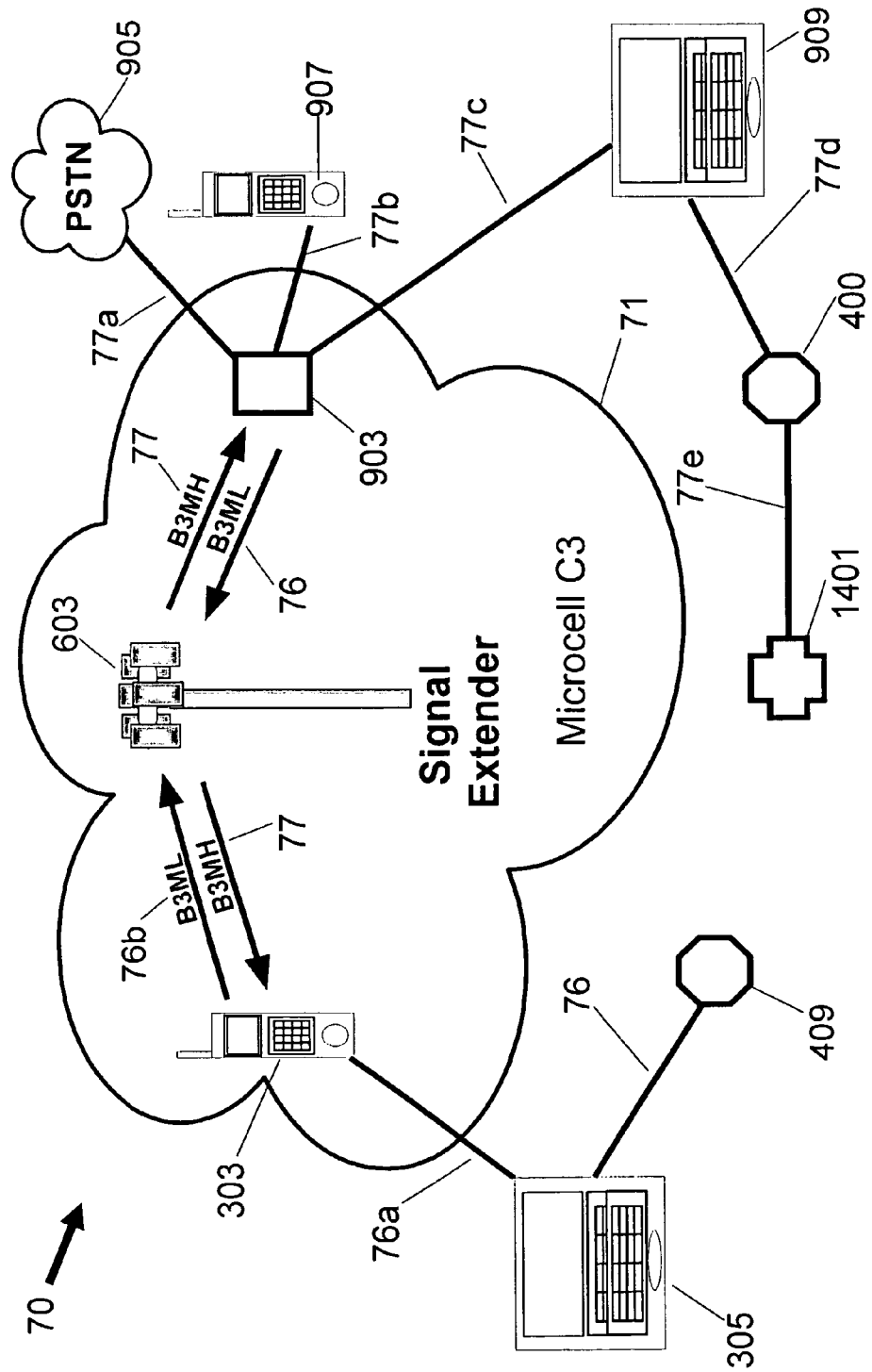
FIG. 7 shows a signal flow diagram of communication paths between a handset and a ComDoc in the same Microcell.

Turning now to FIG. 7, FIG. 7 shows a signal flow diagram 70 of communication paths 76, 76a, 76b, 77, 77a, 77b, 77c, 77d, and 77e between an X-DatCom 409, a computer 305, a handset 303, a signal extender 603, a ComDoc 903, alternately a route to a handset 907, alternately a route to the PSTN, alternately a route to a computer 909, further on from the computer 909 to a X-DatCom 400, further on from the X-DatCom 400 to a remote device 1401; within the same microcell C3, 71. The signal flow diagram 60 illustrates an example of frequency usage in the system. In FIG. 7, a local path call is shown between the handset 303 and the ComDoc 903 in the same microcell C3, 71, in which case no central NE switching is required. Note in FIG. 7 that the sub-band used for the local path calls differs from the microcell type, but is usable because it is one of the two non-adjacent microcell types (i.e., different alpha, but same numeric designator). The communication path from the handset 303 to the signal extender 603 is carried on sub-band B3ML 76, and the communication from the signal extender 603 to the ComDoc 903 is carried on sub-band B3MH 77. The communication path from the ComDoc 903 to the signal extender 603 is carried on sub-band B3ML 76, and the communication from the signal extender 603 to the ComDoc 903 is carried on sub-band B3MH 77. FIG. 7 also shows examples of other communication channels used to connected the X-DatCom 409, path 76, to the handset 303 via path 76a, through the signal extender 603, to the ComDoc 903, alternately to the PSTN 905 via path 77a, alternately to handset 907 via path 77b, alternately to computer 909 via path 77c, further on to X-DatCom 400 via path 77d, further on to remote device 1401 via path 77e. General control and operational state control have also been achieved over X-DatCom 400 by this network link via the computer 909. The connection between ComDoc 903 and computer 909 is achieved via a standard computer data cable.

FIGS. 6 and 7 depict the physical relationships between handset 301, 303, and 907, ComDocs 901, 903, signal extenders 601-603, network extender 801, X-DatCom 400, and 409, remote devices 1400 and 1401, computers 305 and 909; microcells 71, 73, 74, and 75 and a macrocell. A macrocell is able to utilize the full amount of PCS spectrum that is licensed. This is achieved by including at least one microcell of each of the 9 types (A1–3, B1–3, C1–3) in a macrocell, as shown in FIG. 3. In addition, spectrum may be reused within a macrocell among non-adjacent microcells and through the use of directional antennas for the SE-to-NE communication links, which are between fixed sites. Spectrum may also be preserved by utilizing direct fiber optic connections between individual SE's and between SE's and NE's. When all connections between SE's and NE's are by direct fiber optic connection, the spectrum reserved for SE to NE communication can be utilized by wireless devices communicating exclusively with SE's.

The radio frequency (RF) waveform within the DW protocol system is produced using GMSK (Gaussian Minimum Shift Keying) modulation and a data rate of 16 kbps. Baseband filtering limits the 3-dB channel bandwidth to 12.5 kHz. The resultant waveform is a "constant envelope" type, meaning that there is no intended amplitude modulation. The wireless communication system RF coverage and range depend upon the RF parameters of the system (frequency, bandwidth, transmit power, receive sensitivity, antenna gain, etc.), the radio horizon, and the amount of signal occlusion in the line-of-sight between the SE and handset or other such wireless devices found within the DW Protocol system. The RF parameters are specified so that the radio horizon is normally the limiting factor. The radio horizon is a function of the antenna heights and curvature of the earth. As an example, an SE antenna on top of a 100-foot tower can "see" handsets, or other such wireless devices, located out to about 14 miles actual ground distance from the base of the tower. Terrain and man-made structures present the potential for signal occlusions, i.e., non-line-of-sight conditions, which reduce effective coverage and range. Urban propagation models for RF signals show a significant decrease in range compared to clear line-of-sight conditions. For example, the RF conditions that yield 253 miles of range when operated with a clear line-of-sight yield only 4 miles with the urban model.

For systems other than the PCS bands, higher or lower frequencies in the magnetic spectrum yield significantly different characteristics, such as when utilized for DW Protocol transmissions, which is frequency independent.

The deployment of the wireless communication system in rural areas alleviates the potential for urban occlusions, but terrain is still a factor. Microcell/macrocell layout and SE/NE antenna site selection will be required for each installation based on careful planning, consideration, and test of the propagation conditions and physical constraints of the geographical area. The use of the 1.9-GHz PCS spectrum affects the range, amount of multipath, and signal penetration capability compared to other frequency bands such as VHF and UHF, and therefore must be considered in site layout and planning.

The channelization protocol includes elements of control (signaling) and data (voice/data). The available RF spectrum is broken down into voice/data and signaling channels as shown in Table 1, which shows the number of channels per microcell per PCS block.

TABLE 1

| Channel Type | Function | PCS Block (ABC) | PCS Block (DEF) |
| --- | --- | --- | --- |
| Extended Path | Voice/Data | 63 | 19 |
| Local Path | Voice/Data | 63 | 19 |
| Reference | Signaling | 1 | 1 |
| Call Initiation | Signaling | 1 | 1 |
| Call Maintenance | Signaling | 1 | 1 |

Note that the total number of extended plus local channels may not be available for simultaneous use. A minimum total of 96 channels is required. Channels are comprised of a transmit/receive pair of frequencies separated by 80 MHz. The handset uplink (handset to NE) uses two channel halves, one for handset to SE, and one for SE to NE. Similarly, the handset downlink (NE to handset) uses the other halves of the same two channels, one for NE to SE, and one for SE to handset. The SE provides the necessary frequency translation for both the uplink and downlink. The handset and NE channel pairs are different, but 80 MHz separates each pair. The fixed 80-MHz offset is built into the handset and NE transceiver designs to allow for microsecond switching between receive and transmit functions. Local path calls, as shown in FIG. 7, present an exception to the channel concept described in the preceding discussion because these calls do not have an uplink/downlink with the NE. As a result, they use only one channel pair, which is shared between the two handsets. The SE is still required to provide the frequency translation.

Figure 8:
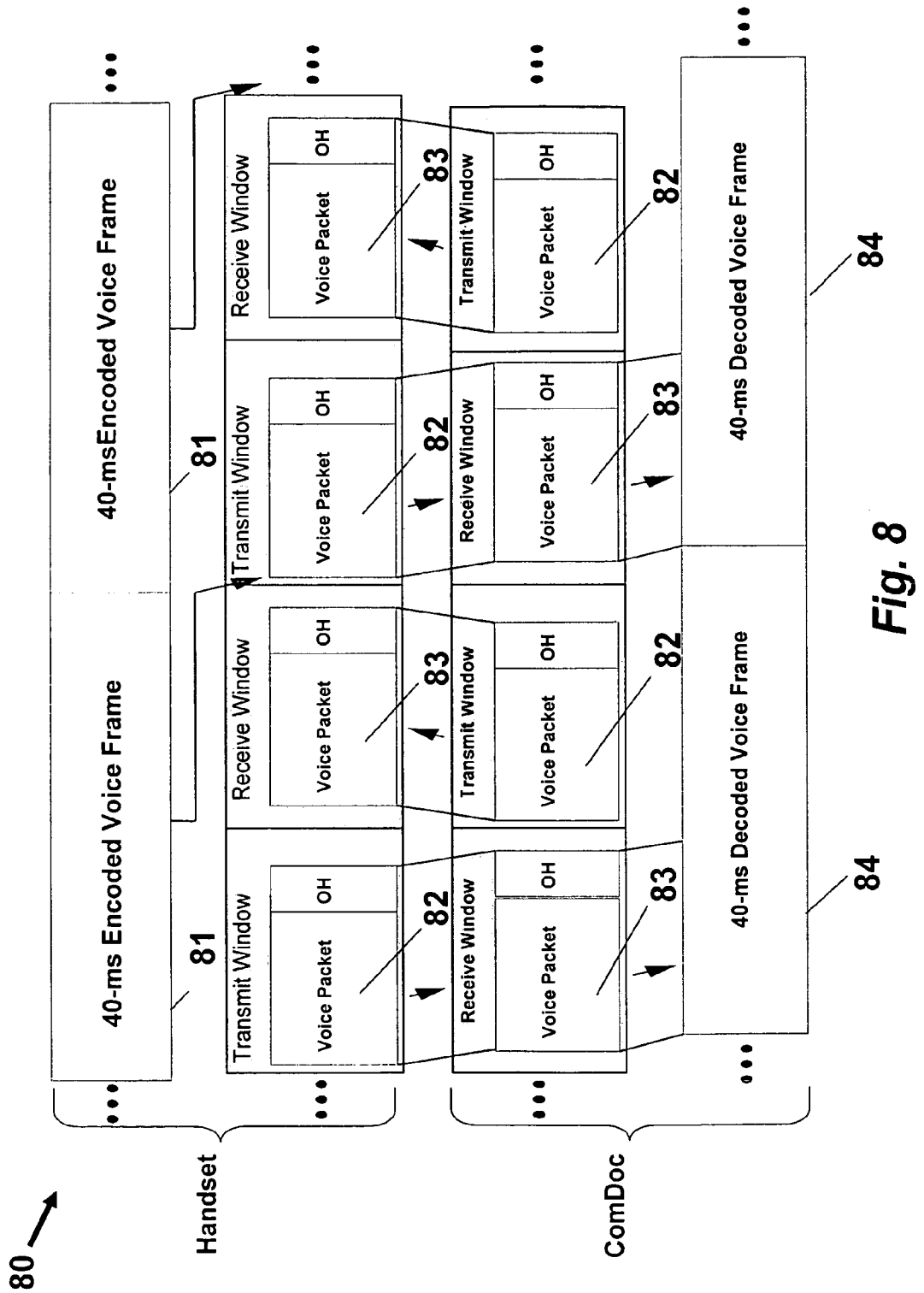
FIGS. 8, 8a, 8b and 8c show single channel voice or data frames and packets between a handset and a ComDoc.

Turning now to FIG. 8, FIG. 8 shows voice or data frames and packets 80 between a handset and a ComDoc. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from handsets to SE, uplink from SE to NE, downlink from NE to SE, and downlink from SE to handsets). In contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from handsets to SE, downlink from SE to handsets) since the NE is not utilized. Local VDCs are contained within the microcell, while extended VDCs are connected through the NE to other microcells, macrocells, and/or the PSTN. Calls between handsets located in the same microcell use local VDCs to increase system capacity by reducing the number of calls switched through the NE. The use of separate sub-band blocks for extended and local path/data channels allows the SE to relay the extended VDCs to the NE, and the local VDCs back within the microcell for receipt by other handsets. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one handset or ComDoc. Local VDCs support two handsets, or a handset and a ComDoc, but still only one call. The advantage of the local VDC is that the handsets share the channel (which saves a VDC), and the complementary channels for the uplink/downlink are not required (which saves two more VDCs). The result is one channel pair required versus four channel pairs for an extended path call. Whenever one of the handsets on a local VDC call leaves the microcell, the call must be handed off to separate extended VDCs for each handset. The VDC protocol is half-duplex on the physical channel, but is effectively full duplex from the user's perspective. This is achieved by buffering and encoding the digitized voice data, and transmitting it in packets at a higher data rate than is required for real-time decoding. As a result, the handset is able to toggle back and forth between its transmit and receive functions at an even rate (50% transmit, 50% receive). This alternating transmit-receive "ping-pong" approach is illustrated in FIG. 8. An advantage of the ping-pong approach is that full-duplex transmit and receive functionality is not required of the handset. Consequently the handset architecture uses a transmit/receive (TR) switch instead of a duplexer, to significantly reduce cost, size, and weight. A 40 ms voice frame (20 ms transmit window, 20 ms receive window) will be utilized as shown in FIG. 8 based on the vocoder (voice encoder/decoder) packet size. The frame length sets the minimum buffering delay since the voice signal must be fully acquired in real-time and packetized before transmission. Delays due to frame lengths much above 40 ms may become perceptible to the user. On the other hand, short frame lengths much less than 40 ms reduce efficiency and are not desired. Some call maintenance actions require that the handset drop a voice frame. This may be perceptible to the user but will be an infrequent occurrence. This approach allows the handset to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is shown on FIG. 8, labeled "OH" for overhead data. As shown in FIG. 8, 40 ms encoded voice frames 81 are compressed into a transmit window voice packet 82 and transmitted from the handset with overhead data OH. The voice and overhead packets are received as a received window voice packets 83 by the ComDoc and decompressed into 40 ms decoded voice frames 84. The reverse of this process is being carried on by the ComDoc compressing and transmitting to the handset where the voice frame is decompressed and decoded by the handset.

Figure 8A:
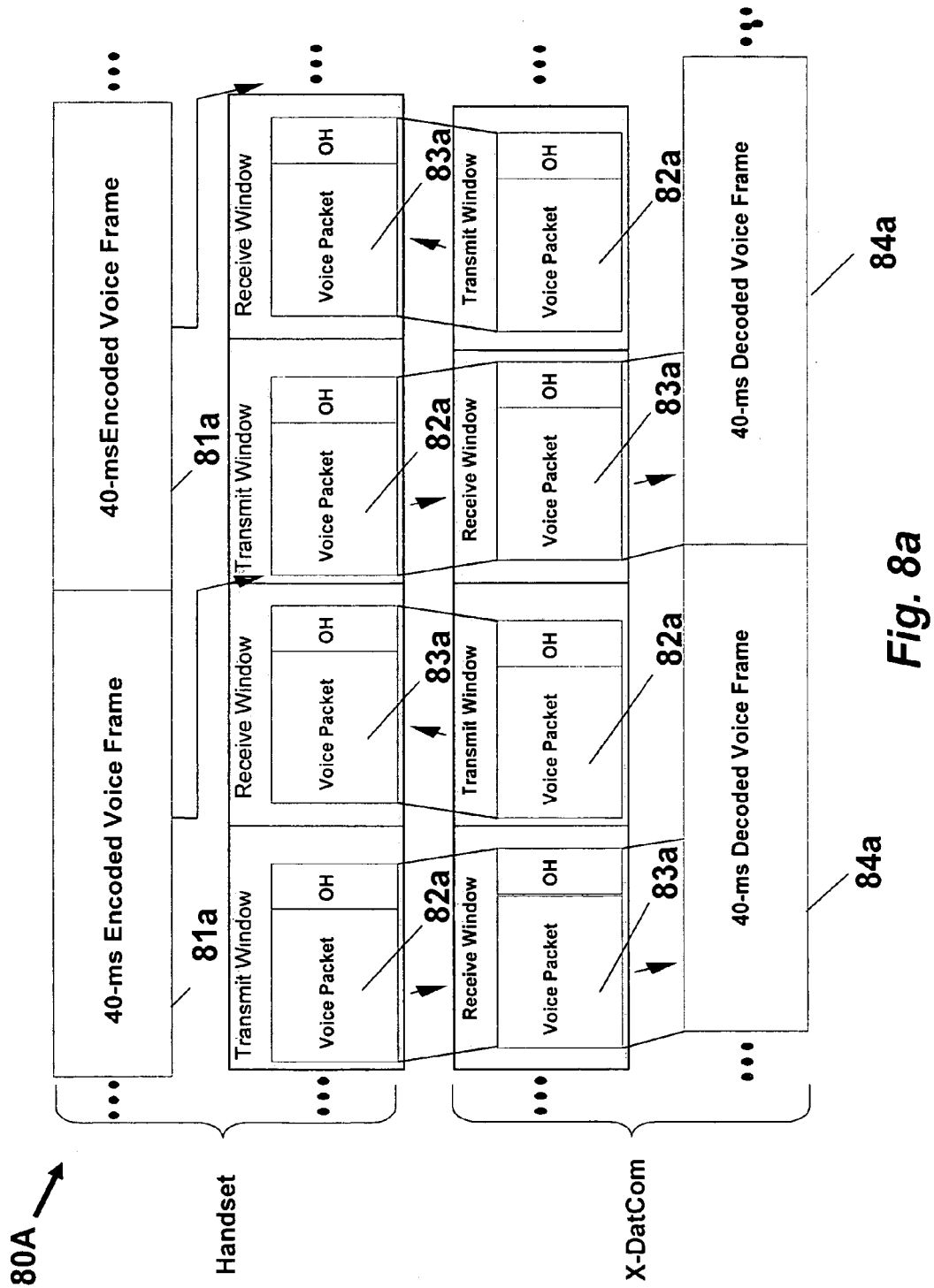

Turning now to FIG. 8a, FIG. 8a shows voice or data frames and packets 80a between a handset and an X-DatCom. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from handsets to SE, uplink from SE to NE, downlink from NE to SE, and downlink from SE to handsets). In contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from handsets to SE, downlink from SE to handsets) since the NE is not utilized. Local VDCs are contained within the microcell, while extended VDCs are connected through the NE to other microcells, macrocells, and/or the PSTN. Calls between handsets located in the same microcell use local VDCs to increase system capacity by reducing the number of calls switched through the NE. The use of separate sub-band blocks for extended and local path/data channels allows the SE to relay the extended VDCs to the NE, and the local VDCs back within the microcell for receipt by other handsets. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one handset or X-DatCom. Local VDCs support two handsets, or a handset and a X-DatCom, but still only one call. The advantage of the local VDC is that the handsets share the channel (which saves a VDC), and the complementary channels for the uplink/downlink are not required (which saves two more VDCs). The result is one channel pair required versus four channel pairs for an extended path call. Whenever one of the handsets on a local VDC call leaves the microcell, the call must be handed off to separate extended VDCs for each handset. The VDC protocol is half-duplex on the physical channel, but is effectively full duplex from the user's perspective. This is achieved by buffering and encoding the digitized voice data, and transmitting it in packets at a higher data rate than is required for real-time decoding. As a result, the handset (or X-DatCom) is able to toggle back and forth between its transmit and receive functions at an even rate (50% transmit, 50% receive). This alternating transmit-receive "ping-pong" approach is illustrated in FIG. 8a. An advantage of the ping-pong approach is that full-duplex transmit and receive functionality is not required of the handset. Consequently the handset architecture uses a transmit/receive (TR) switch instead of a duplexer, to significantly reduce cost, size, and weight. A 40 ms voice frame (20 ms transmit window, 20 ms receive window) will be utilized as shown in FIG. 8a based on the vocoder (voice encoder/decoder) packet size. The frame length sets the minimum buffering delay since the voice signal must be fully acquired in real-time and packetized before transmission. Delays due to frame lengths much above 40 ms may become perceptible to the user. On the other hand, short frame lengths much less than 40 ms reduce efficiency and are not desired. Some call maintenance actions require that the handset drop a voice frame. This may be perceptible to the user but will be an infrequent occurrence. The upper limit in human perceptibility is 80 milliseconds. This approach allows the handset to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is shown on FIG. 8a, labeled "OH" for overhead data. As shown in FIG. 8a, 40 ms encoded voice frames 81a are compressed into a transmit window voice packet 82a and transmitted from the handset with overhead data OH. The voice and overhead packets are received as a received window voice packets 83a by the X-DatCom and decompressed into 40 ms decoded voice frames 84a. The reverse of this process is being carried on by the X-DatCom compressing and transmitting to the handset where the voice frame is decompressed and decoded by the handset.

Figure 8B:
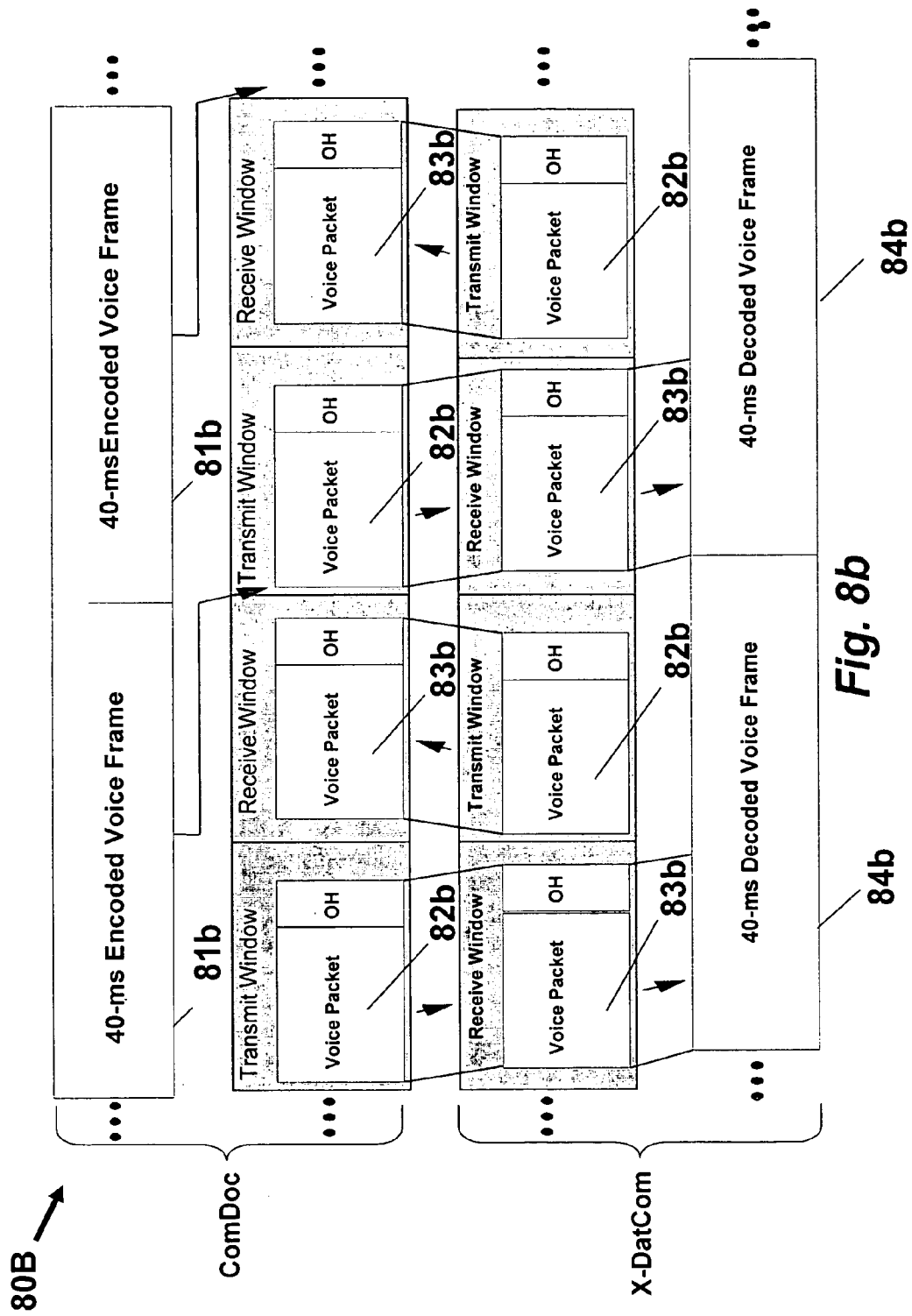

Turning now to FIG. 8b, FIG. 8b shows voice or data frames and packets 80b between a ComDoc and an X-DatCom. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from X-DatComs to SE, uplink from SE to NE, downlink from NE to SE, and downlink from SE to ComDocs). In contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from X-DatComs to SE, downlink from SE to ComDocs) since the NE is not utilized. Local VDCs are contained within the microcell, while extended VDCs are connected through the NE to other microcells, macrocells, and/or the PSTN. Calls between handsets, X-DatComs or ComDocs located in the same microcell use local VDCs to increase system capacity by reducing the number of calls switched through the NE. The use of separate sub-band blocks for extended and local path/data channels allows the SE to relay the extended VDCs to the NE, and the local VDCs back within the microcell for receipt by other DW wireless devices. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one handset or X-DatCom. Local VDCs support two handsets, a handset and an X-DatCom, a ComDoc and an X-DatCom, but still only one call. The advantage of the local VDC is that the DW wireless devices share the channel (which saves a VDC), and the complementary channels for the uplink/downlink are not required (which saves two more VDCs). The result is one channel pair required versus four channel pairs for an extended path call. Whenever one of the handsets on a local VDC call leaves the microcell, the call must be handed off to separate extended VDCs for each handset. The VDC protocol is half-duplex on the physical channel, but is effectively full duplex from the user's perspective. This is achieved by buffering and encoding the digitized voice data, and transmitting it in packets at a higher data rate than is required for real-time decoding. As a result, the handset is able to toggle back and forth between its transmit and receive functions at an even rate (50% transmit, 50% receive). This alternating transmit-receive "ping-pong" approach is illustrated in FIG. 8. An advantage of the ping-pong approach is that full-duplex transmit and receive functionality is not required of the handset (X-DatCom-ComDoc). Consequently the DW wireless device architecture uses a transmit/receive (TR) switch instead of a duplexer, to significantly reduce cost, size, and weight. A 40 ms voice frame (20 ms transmit window, 20 ms receive window) will be utilized as shown in FIG. 8b based on the vocoder (voice encoder/decoder) packet size. The frame length sets the minimum buffering delay since the voice signal must be fully acquired in real-time and packetized before transmission. Delays due to frame lengths much above 40 ms may become perceptible to the user. On the other hand, short frame lengths much less than 40 ms reduce efficiency and are not desired. Some call maintenance actions require that the DW wireless device drop a voice frame. This may be perceptible to the user but will be an infrequent occurrence. This approach allows the handset to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is shown on FIG. 8b, labeled "OH" for overhead data. As shown in FIG. 8b, 40 ms encoded voice frames 81b are compressed into a transmit window voice packet 82b and transmitted from the ComDoc with overhead data OH. The voice and overhead packets are received as a received window voice packets 83b by the X-DatCom and decompressed into 40 ms decoded voice frames 84b. The reverse of this process is being carried on by the X-DatCom compressing and transmitting to the ComDoc where the voice frame is decompressed and decoded by the ComDoc.

Figure 8C:
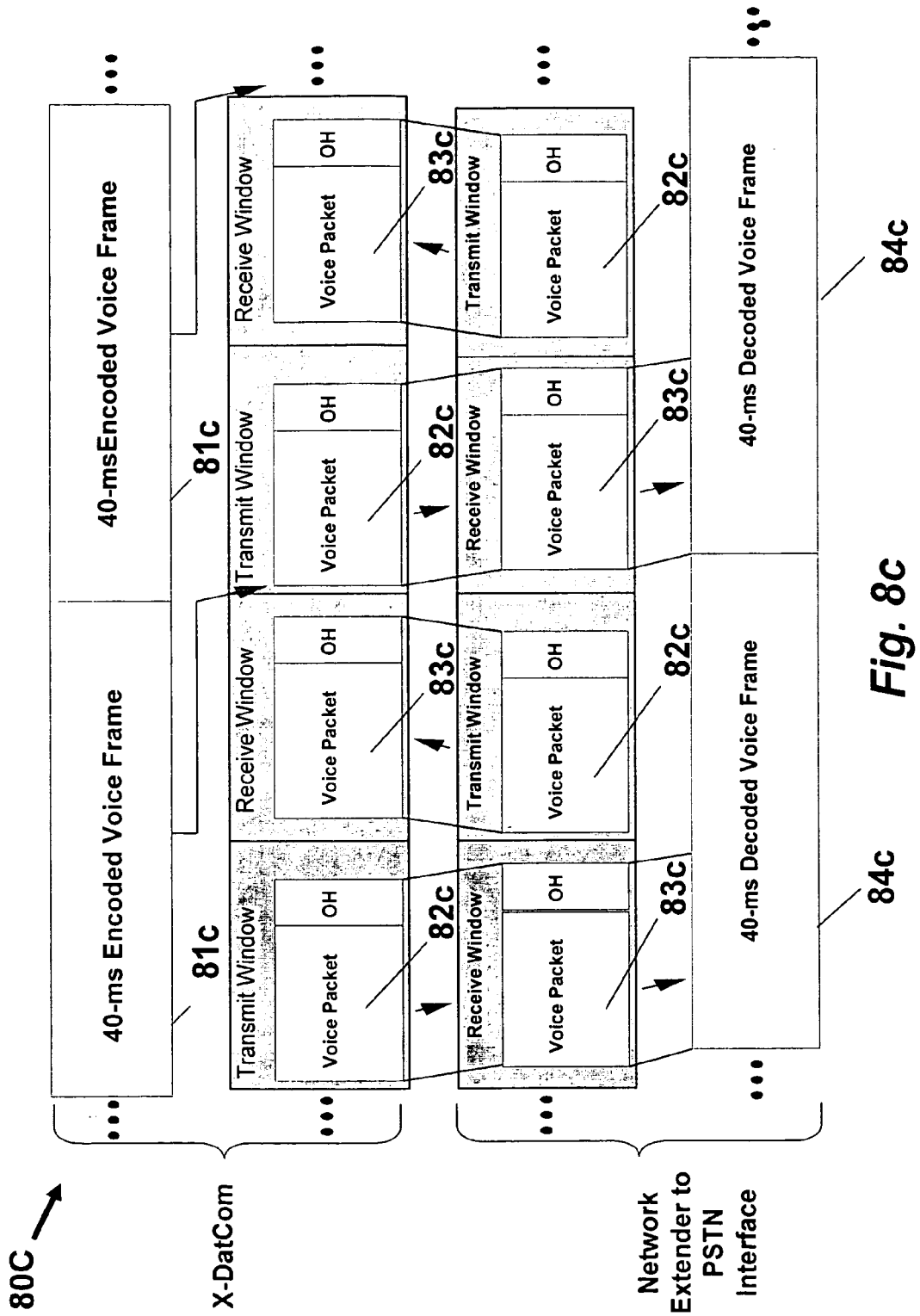

Turning now to FIG. 8c, FIG. 8c shows voice or data frames and packets 80c between a X-DatCom and NE. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from X-DatComs to SE and an uplink from SE to NE. In contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from X-DatComs to SE, downlink from SE to ComDocs) since the NE is not utilized. Local VDCs are contained within the microcell, while extended VDCs are connected through the NE to other microcells, macrocells, and/or the PSTN. Calls between handsets, X-DatComs or ComDocs located in the same microcell use local VDCs to increase system capacity by reducing the number of calls switched through the NE. The use of separate sub-band blocks for extended and local path/data channels allows the SE to relay the extended VDCs to the NE, and the local VDCs back within the microcell for receipt by other DW wireless devices. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one handset or X-DatCom. Local VDCs support two handsets, a handset and an X-DatCom, a ComDoc and an X-DatCom, but still only one call. The advantage of the local VDC is that the DW wireless devices share the channel (which saves a VDC), and the complementary channels for the uplink/downlink are not required (which saves two more VDCs). The result is one channel pair required versus four channel pairs for an extended path call. Whenever one of the handsets on a local VDC call leaves the microcell, the call must be handed off to separate extended VDCs for each handset. The VDC protocol is half-duplex on the physical channel, but is effectively full duplex from the user's perspective. This is achieved by buffering and encoding the digitized voice data, and transmitting it in packets at a higher data rate than is required for real-time decoding. As a result, the handset is able to toggle back and forth between its transmit and receive functions at an even rate (50% transmit, 50% receive). This alternating transmit-receive "ping-pong" approach is illustrated in FIG. 8c. An advantage of the ping-pong approach is that full-duplex transmit and receive functionality is not required of the handset (X-DatCom-ComDoc). Consequently the DW wireless device architecture uses a transmit/receive (TR) switch instead of a duplexer, to significantly reduce cost, size, and weight. A 40 ms voice frame (20 ms transmit window, 20 ms receive window) will be utilized as shown in FIG. 8c based on the vocoder (voice encoder/decoder) packet size. The frame length sets the minimum buffering delay since the voice signal must be fully acquired in real-time and packetized before transmission. Delays due to frame lengths much above 40 ms may become perceptible to the user. On the other hand, short frame lengths much less than 40 ms reduce efficiency and are not desired. Some call maintenance actions require that the DW wireless device drop a voice frame. This may be perceptible to the user but will be an infrequent occurrence. This approach allows the handset to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is shown on FIG. 8c, labeled "OH" for overhead data. As shown in FIG. 8c, 40 ms encoded voice frames 81c are compressed into a transmit window voice packet 82c and transmitted from the X-DatCom with overhead data OH. The voice and overhead packets are received as a received window voice packets 83c by the NE and decompressed into 40 ms decoded voice frames 84c. The reverse of this process is being carried on by the NE compressing and transmitting to the X-DatCom where the voice frame is decompressed and decoded by the X-DatCom.

Figure 9:
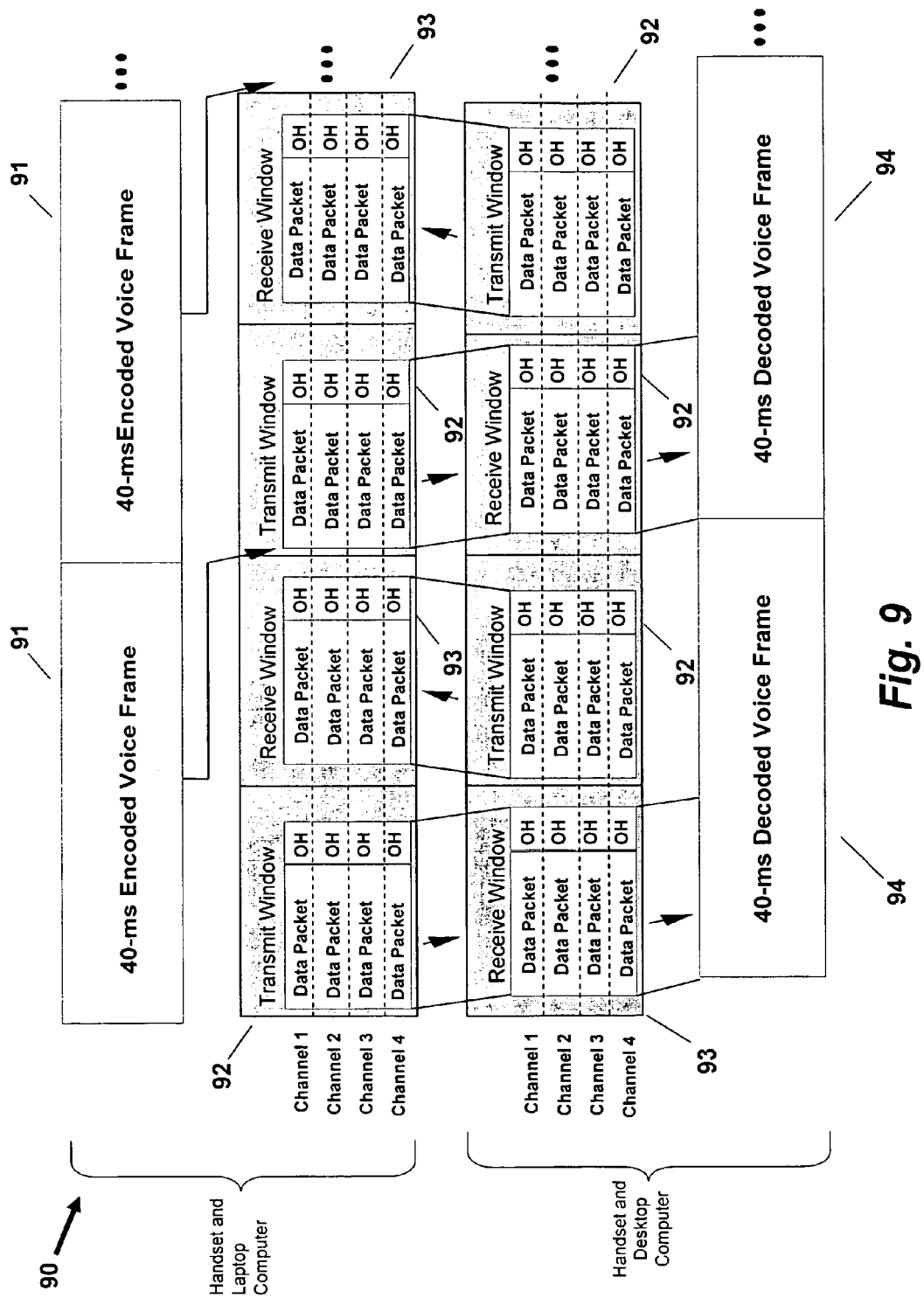
FIGS. 9, 9a and 9b show four channel CCAP data frames and packets between a handset and a ComDoc.

Turning now to FIG. 9, FIG. 9 shows four channel Contiguous Channel Acquisition Protocol (CCAP) data frames and packets transmitting and receiving between a handset linked to Laptop Computer and another handset linked to Laptop Computer. As shown in FIG. 9, 40 ms encoded voice frames 91 are compressed into a transmit window data packet 92, which comprises four contiguous voice channels, and transmitted from the handset with overhead data OH. The data and overhead packets are received as a received window data packets 93 by the second handset-computer and decompressed into 40 ms decoded data frames 94. The reverse of this process is being carried on by the handset-computer compressing and transmitting to the first handset-computer where the data frame is decompressed and decoded by the first handset. By using four contiguous voice channels to transmit data, the channel bandwidth is increased four-fold, or up to approximately 56 kbps. This feature enables a laptop computer connected to a mobile handset to communicate at a 56 kbps rate with a second computer connected to another handset, as shown here in FIG. 9. Other communication paths are also possible, as in FIG. 7 where such a laptop is connected to a mobile handset communicating via a ComDoc and a PSTN to an Internet service provider. If twelve contiguous voice channels were available to transmit data using a CCAP+ protocol, the channel bandwidth may be increased twelve-fold, or up to approximately 250 kbps. The added bandwidths are obtained by adding adjacent channels together to obtain a higher data rate.

Figure 9A:
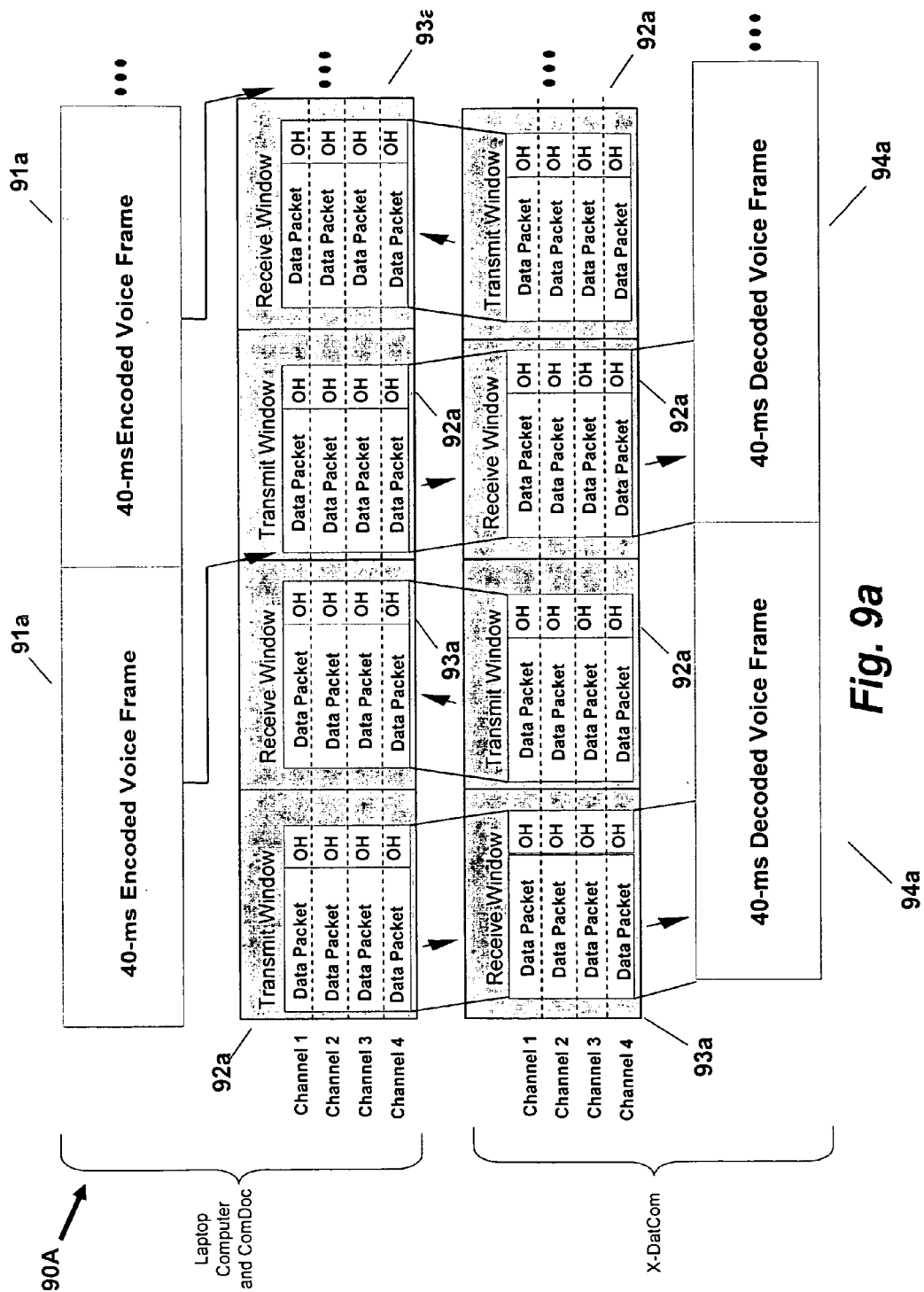

Turning now to FIG. 9a, FIG. 9a shows four channel Contiguous Channel Acquisition Protocol (CCAP) data frames and packets transmitting and receiving between a ComDoc linked to Laptop Computer and X-DatCom. As shown in FIG. 9a, 40 ms encoded voice frames 91a are compressed into a transmit window data packet 92a, which comprises four contiguous voice channels, and transmitted from the ComDoc with overhead data OH. The data and overhead packets are received as a received window data packets 93a by the X-DatCom and decompressed into 40 ms decoded data frames 94a. The reverse of this process is being carried on by the X-DatCom compressing and transmitting to the ComDoc where the data frame is decompressed and decoded by the ComDoc. By using four contiguous voice channels to transmit data, the channel bandwidth is increased four-fold, or up to approximately 56 kbps. This feature enables a laptop computer connected to a mobile handset to communicate at a 56 kbps rate with a second computer connected to another handset, as shown here in FIG. 9a. Other communication paths are also possible, as in FIG. 7 where such a laptop is connected to a mobile handset communicating via a ComDoc and a PSTN to an Internet service provider. If twelve contiguous voice channels were available to transmit data using a CCAP+ protocol, the channel bandwidth may be increased twelve-fold, or up to approximately 250 kbps. The added bandwidths are obtained by adding adjacent channels together to obtain a higher data rate.

Figure 9B:
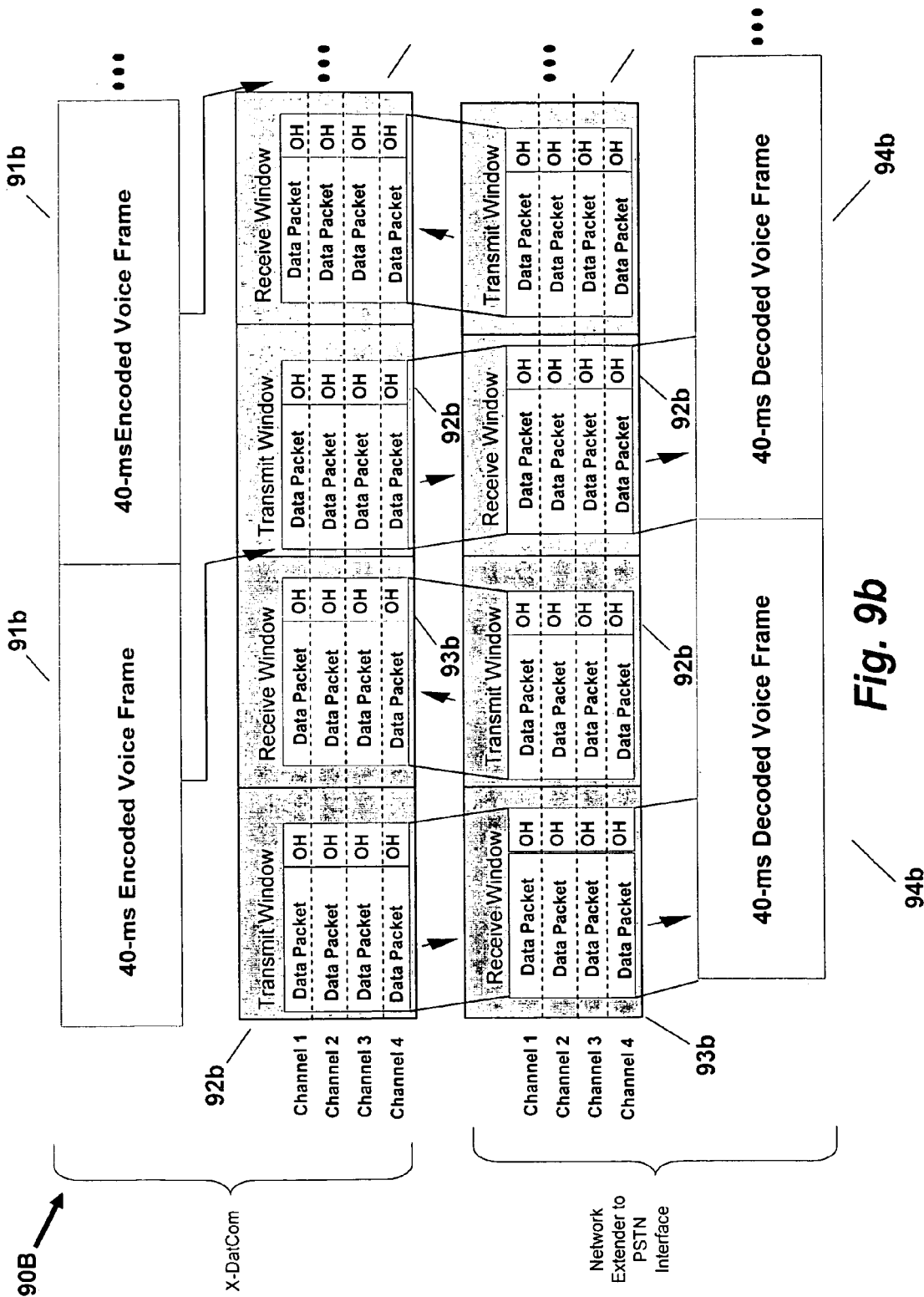

Turning now to FIG. 9b, FIG. 9b shows four channel Contiguous Channel Acquisition Protocol (CCAP) data frames and packets between an X-DatCom and a Network Extender. As shown in FIG. 9b, 40 ms encoded voice frames 91b are compressed into a transmit window data packet 92b, which comprises four contiguous voice channels, and transmitted from the X-DatCom with overhead data OH. The data and overhead packets are received as a received window data packets 93b by the NE and decompressed into 40 ms decoded data frames 94b. The reverse of this process is being carried on by the NE compressing and transmitting to the X-DatCom where the data frame is decompressed and decoded by the X-DatCom. By using four contiguous voice channels to transmit data, the channel bandwidth is increased four-fold, or up to approximately 56 kbps. This feature enables a laptop computer connected to a mobile handset to communicate at a 56 kbps rate with a desktop computer connected to a ComDoc, as shown in FIG. 7. Other communication paths are also possible, such as a laptop connected to a mobile handset communicating via a ComDoc and a PSTN to an Internet service provider. If twelve contiguous voice channels were available to transmit data using a CCAP+ protocol, the channel bandwidth may be increased twelve-fold, or up to approximately 250 kbps. The added bandwidths are obtained by adding adjacent channels together to obtain a higher data rate.

Figure 10:
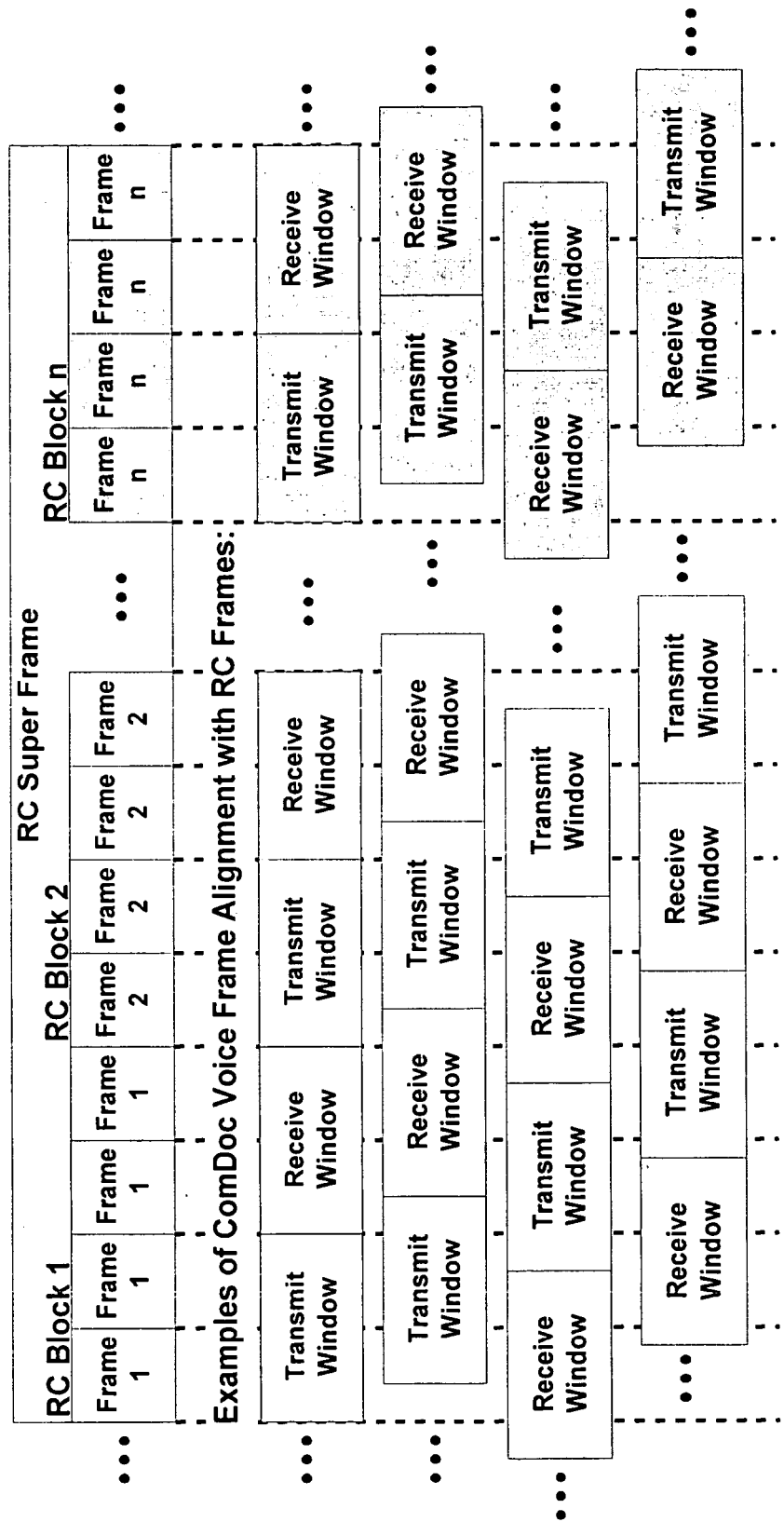
FIG. 10 shows reference channel framing.

Turning now to FIG. 10, FIG. 10 shows reference channel framing 100. A single, shared Reference Channel (RC) is used in each microcell for broadcast to handsets, ComDocs and X-DatComs. Four fixed physical frequencies from the microcell sub-band spectrum are allocated for the RC (i.e., uplink from handsets, ComDocs or X-DatComs to SE, uplink from SE to NE, downlink from NE to SE, and downlink from SE to handsets), although the handset, ComDoc and X-DatCom uplink is not utilized. The handsets, ComDocs and X-DatComs read the RC to identify the presence of service. Without the RC, the handsets, ComDocs and X-DatComs are inoperable. Besides identifying wireless communication system service, the RC is used by the handsets, ComDocs and X-DatComs to adjust its internal frequency reference (typically a voltage-controlled temperature-compensated crystal oscillator or VCTCXO). This adjustment capability allows the handsets, ComDocs and X-DatComs to achieve increased frequency accuracy and stability and thus improved bit-error performance in demodulation of signals. The following information is also provided to the handset on the RC:

Date and Time

Microcell/Macrocell Identification Code

Handset/ComDoc Attention Codes (supports the CMC, described below)

Broadcast Text Messages

The NE also transmits special commands on the RC downlink that are addressed to the SE rather than the handsets, ComDocs and X-DatComs. These commands are used to remotely enable/disable the SE and assign the microcell type (which sets the frequency sub-blocks for use). Remote control of the microcell type provides system frequency agility. The RC uplink, while not used by the handsets, ComDocs and X-DatComs, is used by the SE for command acknowledgement and status reporting to the NE. There are 9 unique RC frequencies in the wireless communication system, one for each microcell type. Handsets, ComDocs and X-DatComs continually scan the RCs in order to identify the handsets, ComDocs and X-DatComs microcell/macrocell location. This is accomplished by monitoring the RC power levels and reading the microcell/macrocell ID codes. Real-time tracking of handsets, ComDocs and X-DatComs microcell location is important for mobile wireless communication because handsets, ComDocs and X-DatComs are required when handsets, ComDocs and X-DatComs move between microcells. In order to facilitate RC scanning while a call is active, the handsets, ComDocs and X-DatComs architecture includes two parallel receivers; one dedicated to the VDC, and the other dedicated to RC scanning. As shown in FIG. 8, the handset/ComDoc receive function is limited to about 50% duty factor when on a call. The length of the handset/ComDoc receive window is 20 ms based on the vocoder packet size. At the system 16 kbps data rate, 20 ms amounts to 320 bits. In order for the handsets, ComDocs and X-DatComs to ensure receipt of a complete RC message, the message length must be less than ½ of the handset/ComDoc receive window, or 10 ms, which amounts to 160 bits. In this case, for design purposes, the RC frame is limited to 150 bits. In order to meet this size limitation, data may be distributed across multiple frames resulting in a superframe. For example, broadcast messages are distributed across a superframe with only a few bytes in each frame. Each RC frame within the superframe is repeated four consecutive times before advancing to the next frame; this is referred to as a block. Each block should be the same length as the 40 ms transmit/receive voice frame. Repeating the RC frame transmission four times ensures that a complete 10-ms RC frame will fall within the 20-ms handset/ComDoc receive window no matter where the receive window begins within the 40-ms block. This process is illustrated in FIGS. 9, 9a, 9b which shows examples of several DW Protocol wireless voice frame alignment with RC frames.

Figure 11:
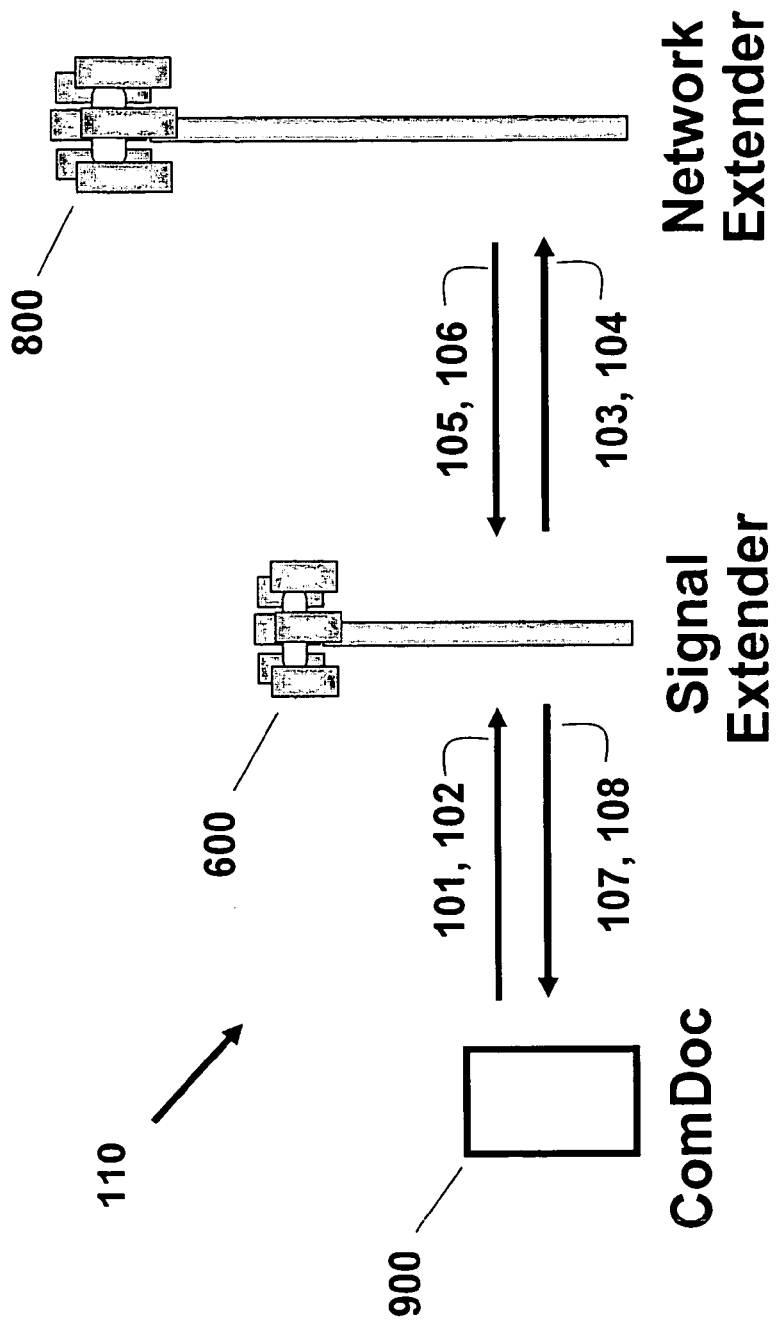
FIGS. 11 and 11a shows a flow diagram for a call initiation channel and a call maintenance channel.
Figure 11A:
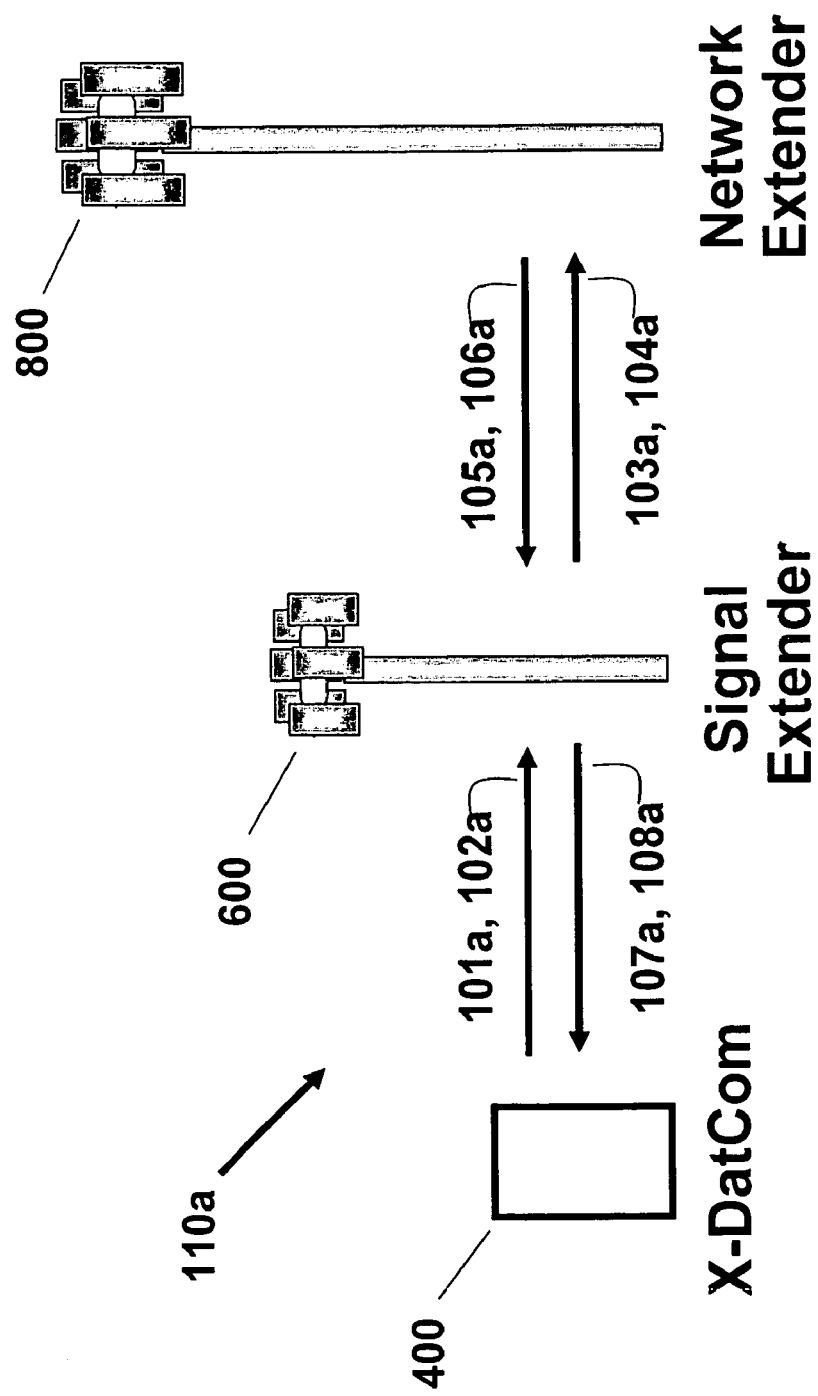

Turning now to FIG. 11, FIG. 11 shows a flow diagram 110 for a call initiation channel (CIC) 101, 103, 105, 107 and a call maintenance channel (CMC) 102, 104, 106, 108. A single, shared CIC 101, 103, 105, 107 is used in each microcell for ComDoc 900 registration and call establishment. Four fixed physical frequencies from the microcell sub-band spectrum are allocated for the CIC 101, 103, 105, 107. These four frequencies include an uplink 101 from ComDocs 900 to SE 600, an uplink 103 from SE 600 to NE 800, a downlink 105 from NE 800 to SE 600, and a downlink 107 from SE 600 to ComDocs 900. The CIC uplink 101 is a random access channel whereby the ComDocs 900 within a microcell compete for its use. The ComDocs 900 listen for activity on the CIC downlink 107 from the NE 800 and transmit a call initiation request when the channel is clear. Request messages include the ComDoc address (identification number) and the request information. Response messages include the ComDoc address along with requested information or simple acknowledgement depending on the request. If a downlink response is not received when expected, then the ComDoc 900 will repeat its request following a randomly determined delay period. The delay period is intended to prevent collisions with transmissions from competing ComDocs 900 and handsets on the shared uplink. The following functions are handled on the CIC:

Turning now to FIG. 11a, FIG. 11a shows a flow diagram 110a for a call initiation channel (CIC) 110a, 103a, 105a, 107a and a call maintenance channel (CMC) 102a, 104a, 106a, 108a. A single, shared CIC 110a, 103a, 105a, 107a is used in each microcell for X-DatCom registration and call establishment. Four fixed physical frequencies from the microcell sub-band spectrum are allocated for the CIC 110a, 103a, 105a, 107a. These four frequencies include an uplink 101a from X-DatCom to SE 600, an uplink 103a from SE 600 to NE 800, a downlink 105a from NE 800 to SE 600, and a downlink 107a from SE 600 to X-DatComs 900. The CIC uplink 101a is a random access channel whereby the X-DatComs 900 within a microcell compete for its use. The X-DatComs 900 listen for activity on the CIC downlink 107a from the NE 800 and transmit a call initiation request when the channel is clear. Request messages include the X-DatCom address (identification number) and the request information. Response messages include the X-DatCom address along with requested information or simple acknowledgement depending on the request. If a downlink response is not received when expected, then the X-DatCom will repeat its request following a randomly determined delay period. The delay period is intended to prevent collisions with transmissions from competing handsets ComDocs and X-DatComs on the shared uplink. The following functions are handled on the CIC:

Handset, ComDoc and X-DatCom initial registration to NE 800

Handset, ComDoc and X-DatCom periodic registration refresh to NE 800

Handset, ComDoc and X-DatCom authorization and short id assignment to Handset 300, ComDoc 800 and X-DatCom 400

Call request to NE 800 or to Handset 300, ComDoc 800 and X-DatCom 400

Call frequency assignment to Handset 300, ComDoc 800 and X-DatCom 400

Call progress prior to voice/data channel use to Handset 300, ComDoc 800 and X-DatCom 400

Acknowledgements to NE 800 or to Handset 300, ComDoc 800 and X-DatCom 400

The Handset 300, ComDoc 800 and X-DatCom 400 ID, either an electronic serial number (ESN) or phone number, is 40 bits. When a Handset 300, ComDoc 800 or X-DatCom 400 initially registers in a new microcell, it will be assigned an 8-bit temporary ID for use while registered with that microcell. The shorter ID significantly reduces message lengths on the RC, CIC, and CMC where Handset 300, ComDoc 800 and X-DatCom 400 addresses are required.

Also shown in FIG. 11, a shared Call Maintenance Channel (CMC) 102, 104, 106, 108 is used in each microcell for out-of-band signaling functions once a call has been established. Four fixed physical frequencies from the microcell sub-band spectrum are allocated for the CMC 102, 104, 106, 108. These include an uplink 102 from ComDocs 900 to SE 600, an uplink 104 from SE 600 to NE 800, a downlink 106 from NE 800 to SE 600, and a downlink 108 from SE 600 to ComDocs 900. The CMC uplink 102 is a random access channel whereby the ComDocs 900 and handsets within a microcell compete for its use, just like the CIC uplink. The following functions are handled on the CMC:

Call completion to NE 800
Call handoff request to NE 800
911 position report to NE 800
Call handoff frequency to ComDoc 900

Call waiting notification to ComDoc 900
Voice message notification to ComDoc 900
Text message notification to ComDoc 900
Acknowledgements to NE 800 or to ComDoc 900

When a CMC message is pending for a ComDoc 900, the NE 800 transmits an attention code for the ComDoc 900 on the RC. Since the RC is periodically monitored by the ComDoc 900, even while it is on a call, the ComDoc 900 is able to identify the attention code and then monitor the CMC downlink 108 for the message. When the ComDoc 900 uses the CMC, it drops a 40-ms voice frame in order to use the channel. Consequently, CMC usage must be infrequent and messages should be sized to fit within a single voice frame. If no response is received to a ComDoc request, the request will be retransmitted on another frame after a random delay. Subsequent frames are selected randomly, but the dropping of back-to-back frames is precluded. The above description also applies to FIG. 11a wherein an X-DatCom has been substituted for the ComDoc.

Figure 12:
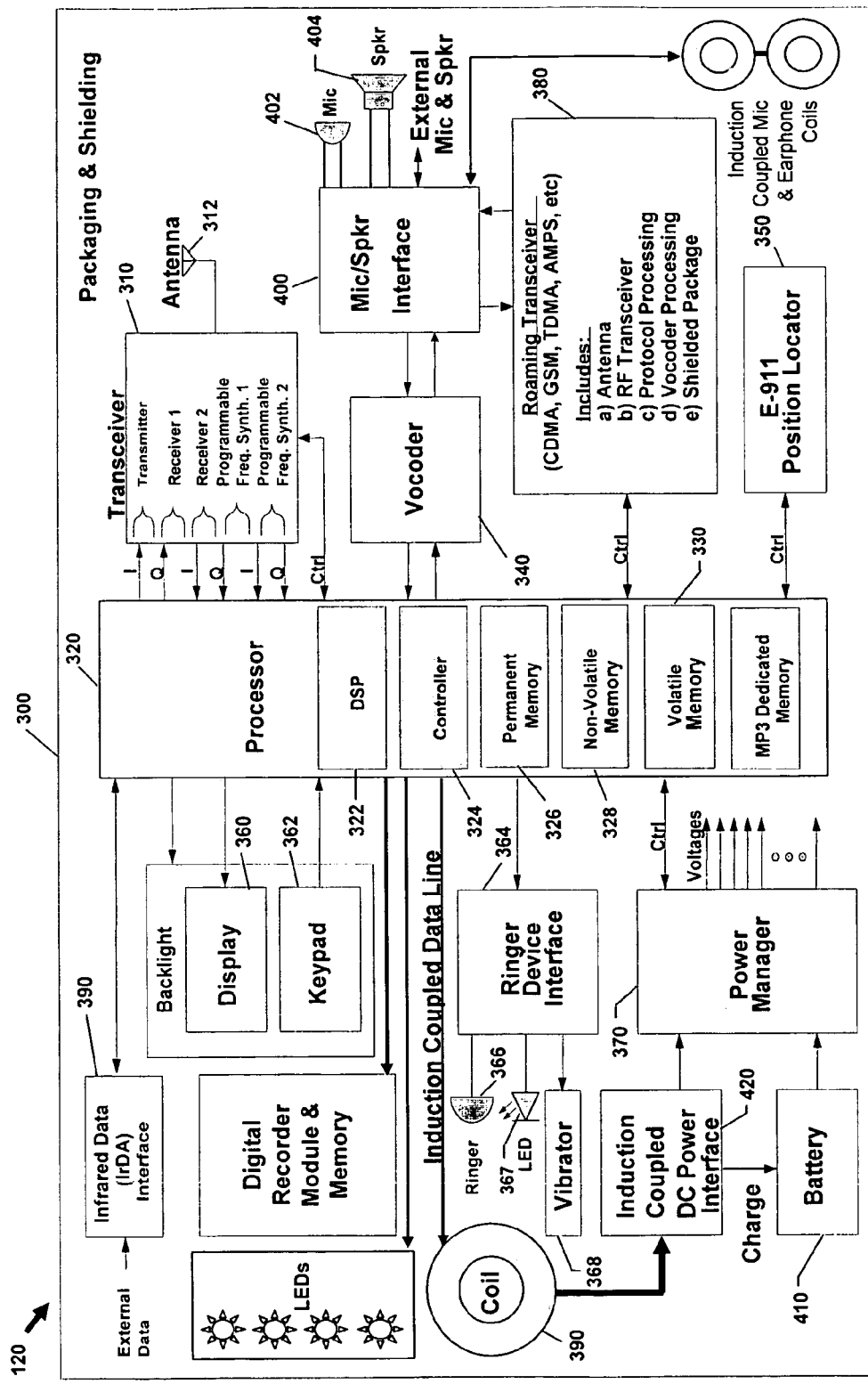
FIG. 12 shows a block diagram of a handset.

Turning now to FIG. 12, FIG. 12 shows a block diagram 120 of a handset 300. The handset 300 includes a transceiver 310 and antenna 312. The transceiver 310 consists of two receivers, one transmitter, and two programmable frequency synthesizers. The antenna 312 may be integrated into the transceiver, or may be a modular type that plugs into the case. The transceiver transmit power is adjustable in 3 dB steps over a 50 dB range relative to the maximum transmit power. The gain of the transceiver antenna 312 is in the range of 0 to 2.5 dB under controlled conditions. The transceiver 310 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 320 provides centralized control to the handset 300 and includes a digital signal processing (DSP) 322 for demodulating signals, a controller 324 for display/keypad servicing, permanent memory 326, non-volatile memory 328, and volatile memory 330. Firmware is embedded in the processor memory to implement protocols, control the user interfaces for the display, keypad, menus, etc., and control the application program interface (API) for the secondary mode (roaming) protocol. The firmware includes a bootstrap loader that is stored in permanent memory 326 to enable download of the main code. The main code is stored in non-volatile memory 328 so that it is not lost in the absence of power, but can be overwritten by subsequent downloads, e.g., firmware updates. In addition to the main code, there also exist a number of configuration variables that are downloaded to activate the handset 300. These configuration variables set the user's phone number and services subscribed, and are also stored in non-volatile memory. The handset firmware also manages non-volatile user memory for storage of phone book names and numbers, received text messages, and the current operating mode selections (ringer volume/type, beep volume, etc.). The Processor 320 shall have peripheral interfaces to the following elements:

Induction Coupled Data Line: This line attaches to the recharger and may import and export data from a handset via inductive coupling through the environmental package (case). The handset environmental package integrity can be preserved when entering data via the induction coil 390 which is also used for the recharging of the internal batteries. The integrity of the environmental package can be maintained via the induction coil 390 through the case of the environmental package without any external metal contact.

Externally Direct LEDs: These LEDs are included to give the handset user external illumination. The LEDs are in effect, a processor controlled-keypad controlled, flashlight with auto-off features.

Earphone and Microphone Induction Coupled Coils: These internal case coils inductive couple earphone and microphone function to a headset wherein the handset case is of the sealed, water tight variety.

Digital Recorder: This device chip enables the processor to activate a fully functional digital recorder within the handset. Processor interface gives the recorder access to call recording, external-to-the-case recording via the handset microphone or remote activation of recorder functions via another DW Protocol wireless device so coded for such action.

Vocoder 340
E-911 position locator 350
Transceiver 310
Keypad 362
Display 360
Power Manager 370
Roaming Transceiver 380
External Data Interface 390
Miscellaneous controls, including ringer 366, LED 367 and vibrator 368

Permanent memory 326 is utilized for the processor bootstrap firmware and electronic serial number. Each handset 300 contains a unique electronic serial number in permanent memory 326. The serial number permits a minimum of 1 billion unique serial numbers. Bootstrap software is also contained in permanent memory 326 to enable download of the operational software through the handset external data port. The nonvolatile read/write memory 328 is used for storing initialization parameters and phone book data so that battery removal or replacement does not require re-initialization initialization. Each handset contains its phone number in non-volatile memory. The operational software is downloadable to change features or otherwise update the code. The operational software is stored in non-volatile memory 328. The operational software is downloadable using capabilities of the bootstrap software, the external data port 390, and external software. The handset is capable of maintaining user data in non-volatile memory 328, such as phone book entries. The handset includes a vocoder (voice coder/decoder) 340 for processing the digitized voice signals. The vocoder 340 compresses and channel code the digitized voice data in order to meet the voice quality requirement and to enable implementation of the RF and communication protocols. The handset 300 includes a microphone/speaker interface 400 for interfacing a microphone 402 and speaker 404 to other handset components. The handset 300 may accept an external microphone input signal and shall provide an external speaker output signal. The handset 300 includes a power manager 370 to assist in extending battery life. The handset 300 includes a rechargeable battery 410, but is also capable of connection to an external 11–16 Vdc power source through an external power interface 420. The handset 300 includes a roaming transceiver 380 to serve as a secondary or alternate mode to the wireless communication system described. The roaming transceiver implements one or more of the following standard wireless protocols:

PCS CDMA (IS-95)
PCS TDMA (IS-136)
GSM 1900
AMPS

The roaming transceiver 380 includes functions for an antenna, RF transceiver, protocol processing, and vocoder processing. The handset 300 also includes provisions for a position locator function to support the enhanced 911 (E911) requirements if needed.

Figure 13:
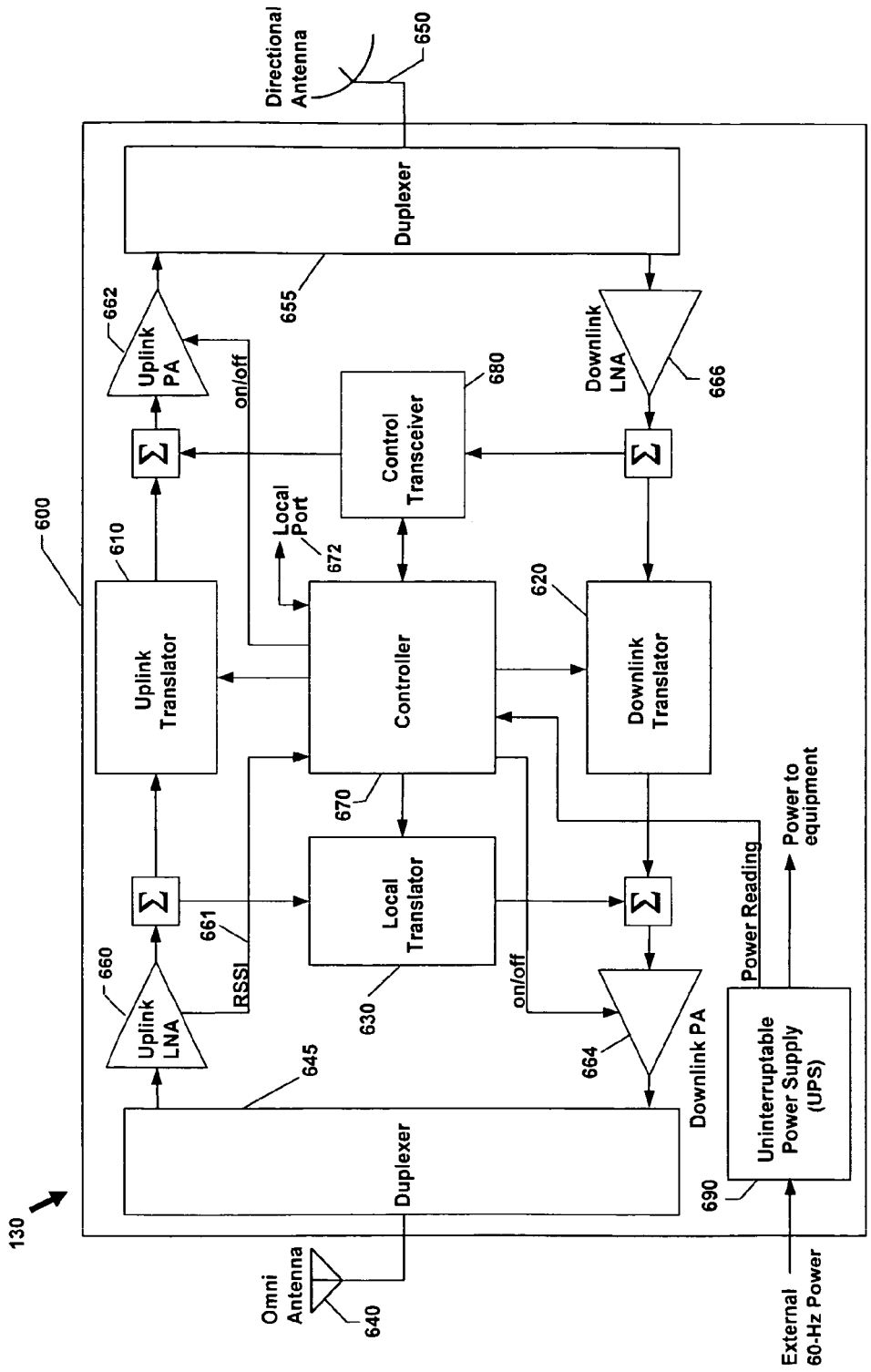
FIG. 13 shows a block diagram of a signal extender.

Turning now to FIG. 13, FIG. 13 shows a block diagram 130 of a signal extender (SE) 600. The SE 600 serves as a signal relay and frequency-translator between handsets 300 and either a NE 800 or other handsets 300. It receives blocks of data in the PCS low band and up-converts them for re-transmission in the PCS high band, as discussed in relation to FIG. 4 through FIG. 7. In this relay process, the SE 600 amplifies the radio frequency signals to increase system range and coverage. The distinguishing feature of the SE 600 is that it does not switch, process, or demodulate individual channels or signals; it is limited in function to relaying blocks of RF spectrum. This functional simplicity is intended to yield low infrastructure cost. The only deviation from this design is to enable access to no more than four PSTN landlines as a routing backup during a Network Extender's catastrophic failure. Even this access is accomplished however, on-site through the wireless connectivity of four ComDocs attached to these landlines. This approach eliminates structural and physical design changes to the signal extenders and keeps costs low. The Artificial Intelligence Distributive Routing Network merely makes suggestions for the SE's to follow: "Route calls through YOUR ComDocs". More landlines and SE ComDocs would raise the cost; however, never would these additions ever approach the expense of altering the SE design. This approach would also yield the cost benefits of modular expansion should the need arise. Frequency translation is the primary function of the SE 600. Three such translator functions shall be provided as follows:

Translator Type Relay Path Uplink Handset to NE Downlink NE to Handset Local Handset to Handset Each translator is defined by the center frequency of the input spectrum block, the bandwidth of the block, and an up-conversion offset. The input center frequency is a programmable parameter based on the licensed PCS block (A–F) and the microcell type (A1–3, B1–3, C1–3). The bandwidth and up-conversion offset depend on the PCS block type (ABC or DEF). The three SE translator functions operate with the same bandwidth specifications. The bandwidth is fixed at 275 kHz for 5-MHz PCS block types (DEF) or at 825 for 15-MHz PCS block types (ABC). Signals more than 50 kHz from the band edges are rejected by at least 20 dB relative to the band centers. Signals more than 250 kHz from the band edges are rejected by at least 40 dB relative to the band centers. The three SE translator functions operate with the same frequency accuracy specifications. The input center frequency is accurate to within 2 kHz and the up-conversation offset is accurate to within 500 Hz. The uplink translator 610 translates a block of handset signals to the NE 800. The programmable up-conversion offset is 82.5 MHz for 5-MHz PCS block types (DEF) or 87.5 MHz for 15-MHz PCS block types (ABC). The programmable input center frequency is determined according to the following expression:

$$F_{edge}+F_{guard}+Bandwidth*(Extended+0.5)$$

where $F_{edge}$, $F_{guard}$, and Bandwidth are given in Table 2, which shows PCS block parameters for SE 600 frequency translators.

TABLE 2

| PCS Block | $F_{edge}$ (MHz) | $F_{mid}$ (MHz) | $F_{guard}$ (MHz) | Bandwidth (MHz) |
|---|---|---|---|---|
| A | 1850 | 1857.5 | 0.012500 | 0.825000 |
| B | 1870 | 1877.5 | | |
| C | 1895 | 1902.5 | | |
| D | 1865 | 1867.5 | 0.037500 | 0.275000 |
| E | 1885 | 1887.5 | | |
| F | 1890 | 1892.5 | | |

Table 3 shows the values of extended and local microcell type parameters for SE 600 frequency translators used for the determination of center frequencies.

TABLE 3

| Microcell Type | Extended | Local |
|---|---|---|
| A1 | 0 | 1 |
| B1 | 1 | 2 |
| C1 | 2 | 0 |
| A2 | 3 | 4 |
| B2 | 4 | 5 |
| C2 | 5 | 3 |
| A3 | 6 | 7 |
| B3 | 7 | 8 |
| C3 | 8 | 6 |

The downlink translator 620 translates a block of signals from a NE 800 to the handsets 300, ComDocs 900 or X-DatComs 400. The programmable up-conversion offset is 77.5 MHz for 5-MHz PCS block types (DEF) or 72.5 MHz for 15-MHz PCS block types (ABC). The programmable input center frequency is determined according to the following expression:

$$F_{mid}+F_{guard}+Bandwidth*(Extended+0.5)$$

where $F_{mid}$, $F_{guard}$, and Bandwidth are given in Table 2, and values for Extended are given in Table 3. The local translator 630 translates a block of handset 300, ComDoc 900 or X-DatCom 400 signals to other handsets 300, ComDocs 900 or X-DatComs 400. The up-conversion offset is fixed to 80 MHz. The programmable input center frequency is determined according to the following expression:

$$F_{edge}+F_{guard}+Bandwidth*(Local+0.5)$$

where $F_{edge}$, $F_{guard}$, and Bandwidth are given in Table 2, and the value for Local is given in Table 3. The omni antenna 640 is used for omni-directional SE communication with handsets 300 in a microcell. The antenna gain is between 2 dBi and 6 dBi. The directional antenna 650 is used for directional SE communication with the fixed NE site. The antenna gain is 15 dBi, with a front-to-back ratio greater than 25 dB. Duplexers 645, 655 are used to achieve isolation of the antenna signals between the transmit and receive frequency bands. This is required to allow full duplex, i.e., simultaneous transmit and receive, operation of the SE 600. The duplexers 645, 655 provide transmit-receive (and receive-transmit) isolation of at least 80 dB. An uplink low noise amplifier (LNA) 660 is used to receive the handset 300, ComDoc 900 or X-DatCom 400 signals for the uplink translator 610 and local translator 630. The uplink LNA 660 provides a received signal strength indicator (RSSI) 661 output to the SE controller 670, indicating a measure of the aggregate handset 300, ComDoc 900 or X-DatCom 400 transmission activity in the microcell. An uplink power amplifier (PA) 662 is used to transmit the up-converted handset 300, ComDoc 900 or X-DatCom 400 signals to the NE 800. The uplink PA 662 provides an output level of at least 26 dBm across the entire PCS High band (1930 to 1990 MHz). The uplink PA 662 is able to transmit 66 signals at +4 dBm each simultaneously without damage. The uplink PA 662 also provides means for enabling and disabling the output. A downlink low noise amplifier (LNA) 666 is used to receive NE signals for the Downlink Translator 620. A downlink power amplifier (PA) 664 is used to transmit the up-converted handset 300, ComDoc 900 or X-DatCom 400 signals to a NE 800. The downlink PA 664 provides an output level of at least 48 dBm across the entire PCS High band (1930 to 1990 MHz). The downlink PA 664 is able to transmit 99 signals at +25 dBm each simultaneously without damage. The downlink PA 664 also provides means for enabling and disabling the output.

SE power amplifier gains of the three RF paths (uplink, downlink, local) are independently adjustable in 3 dB steps over a 60 dB range from 37 to 97 dB. The gain adjustments are usually made manually during installation based on the microcell size.

A control transceiver 680 is used to receive commands from the NE 800 on the reference channel (RC) downlink, and to transmit acknowledgments and status reports on the RC uplink. The controller 670 is used to program the SE configuration and monitor status for reporting. The controller 670 programs the SE configuration, which consists of the Uplink, Downlink, and Local Translator frequencies, and the Uplink/Downlink PA output on/off state. The following information must be provided to the Controller:

Microcell Type (A1–3, B1–3, C1–3)
PCS Block (A–F)
Desired PA Output State (enabled or disabled)

The SE Translator frequencies are configured based on the microcell type and PCS band as described above. The controller 670 accepts remote commands from the NE 800 via the control transceiver 680 for programming the SE configuration. The controller acknowledges the NE commands. The controller also provides a local port 672 such as an RS-232 for local programming of the configuration in the field from an external laptop computer and for all communications with the resident Artificial Intelligence Distributive Routing Network computer. Upon power-up, the controller 670 sets the SE configuration to the last configuration programmed. The controller periodically transmits status reports to the NE 800 via the control transceiver 680. The following information is included in the status report:

Microcell type (A1–3, B1–3, C1–3)
PCS band (A–F)
PA output state (on or off)
Uplink LNA RSSI reading
Power draw reading
Power source state (external or battery backup)

An uninterruptible power supply (UPS) 690 is used to power the SE equipment and buffer it from the external power grid. In the event of an external power grid outage, the UPS battery backup capability is able to operate the SE 600 for an extended period of time.

Figure 14A:
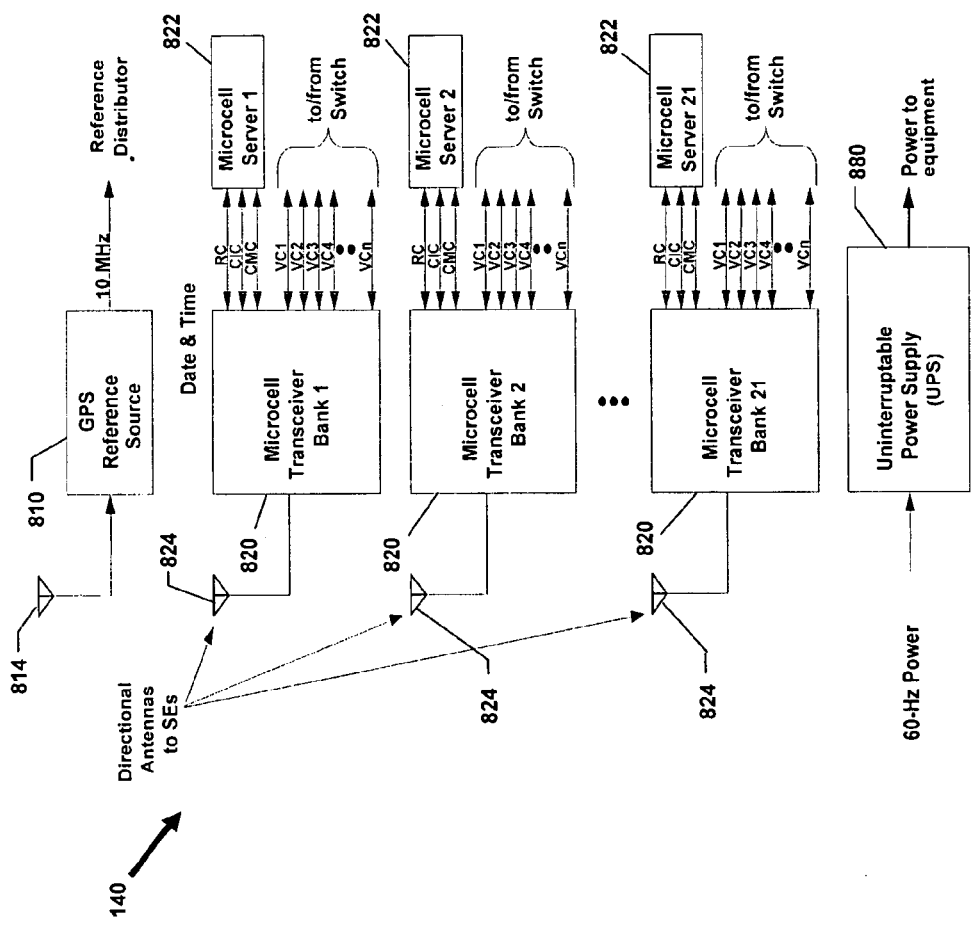
FIGS. 14a and 14b show a block diagram of a network extender.
Figure 14B:
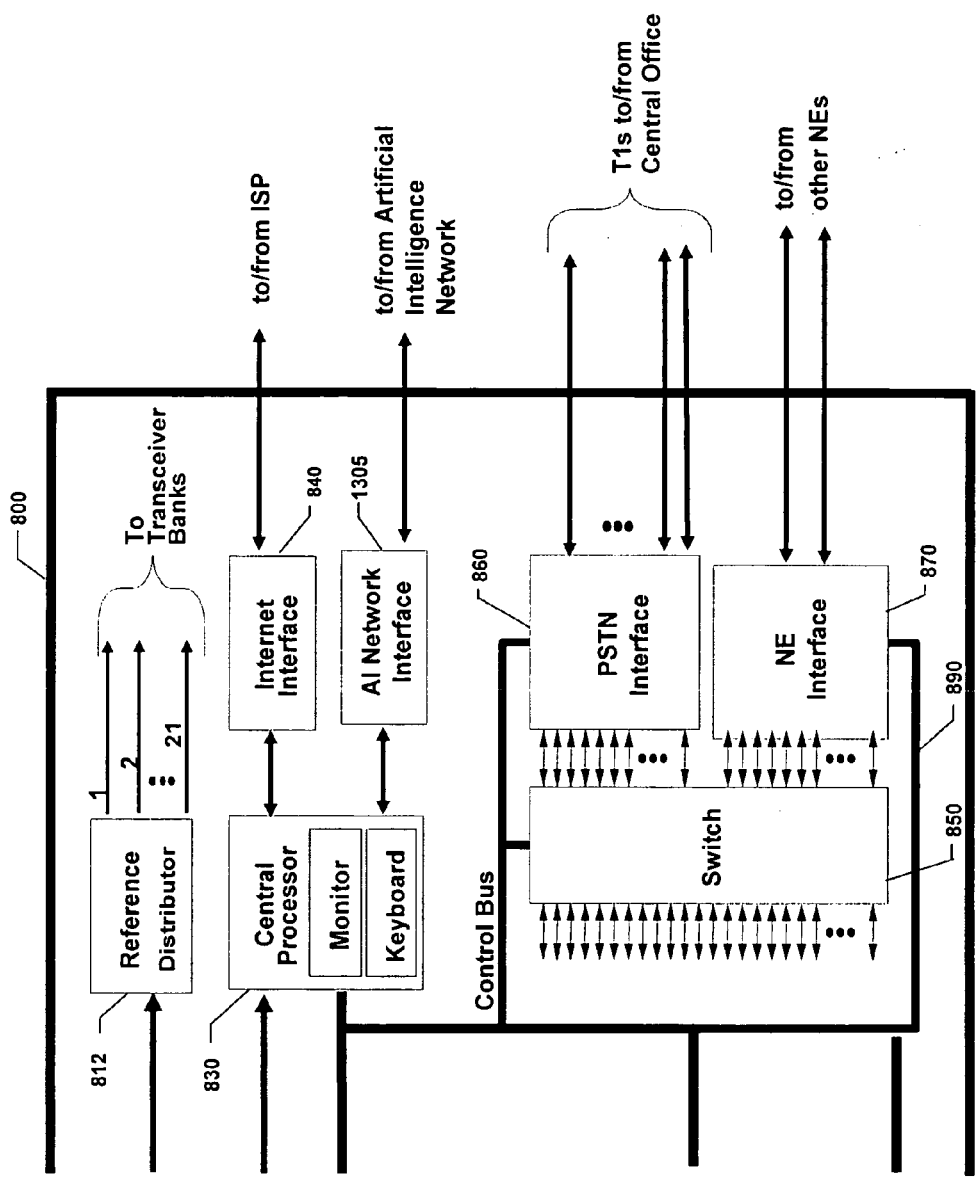

Turning now to FIG. 14a and FIG. 14b, FIG. 14a and FIG. 14b show a block diagram 140 of a network extender (NE) 800. The NE 800 is the central switching point for a macrocell, and the external interface to other macrocells, a PSTN and the Internet. The NE 800 incorporates a Global Positioning System (GPS)-based reference source 810 for use in stabilizing the local oscillators in wireless communication system transceivers. The reference output frequency is 10 MHz at the nominal accuracy available from the GPS. The GPS reference source 810 provides a reference frequency used by the NE transceivers and transmitted to the SEs 600 and to handset 300, ComDocs 900 or X-DatComs 400 via the Reference Channel downlink. In addition, the GPS reference source 810 provides date and time information for the macrocell, which is broadcast on the RC downlink. The GPS reference source 810 includes the GPS antenna 814 and a backup reference source suitable to maintain frequency tolerance of RF communication channels. The backup source is automatically selected in the event of GPS signal loss or receiver failure. The reference distributor 812 provides amplification and fan-out, as necessary, to feed the GPS reference signal to the microcell transceiver banks 820. The NE 800 uses directional antennas 824 for communication with the fixed SE sites. The antenna gain is at least 15 dBi with a front-to-back ratio greater than 25 dB. There is one dedicated antenna 824 for each SE 600 supported by the NE 800. Each directional antenna 824 for a microcell is connected to a microcell transceiver bank 820. Each microcell transceiver bank 820 contains a configurable number of transceivers for processing the extended path and signaling channels for the associated microcell. A microcell radio processor is contained within each macrocell receiver bank 820. Microcell servers 822 connect to radios within the microcell transceiver banks 820 to perform control functions associated within a single microcell. The microcell servers 822 communicate with the NE central processor 830 to route and manage calls that connect outside of the microcell. The NE central processor 830 is able to direct the microcell servers 822 to promote a call from local mode to assisted mode, change frequency, or perform a handoff. The microcell servers 822 coordinate control of calls on its microcell, including performing control operations of radios within its microcell transceiver banks 820. The microcell servers 822 accumulate the data for the reference channel and feed it to the radio generating the RC. They also process requests on the CIC and CMC and coordinate the required actions with the radios in its bank and the NE central processor 830. A microcell server 822 may handle multiple transceiver banks. Each microcell server includes an Ethernet interface to connect it to the local area network (LAN) of the NE 800. This LAN connection permits the microcell server 822 to communicate with the NE central processor 830 and the radios to perform its control functions. The microcell servers coordinate communication between the NE central processor 830 and the microcell transceiver banks 820 in use. They also monitor non-responsive radios and dynamically remove them from the active use. The microcell servers are also able to relay status/diagnostic information and command shut down of radios not in an active configuration and to report these configuration changes to the NE central processor 830. They also monitor CIC and CMC requests and relay them to the NE central processor 830 and accept messages for the CIC and CMC and relay them to the microcell transceiver banks 820. The NE central processor 830 coordinates call activity within the NE 800. It processes call requests, call terminations, handoff requests, etc., and downloads control information to microcell servers 822 and communicates with the PSTN interface 860. The NE central processor 830 performs call setup, call tear down, call routing, and call handoff, and is responsible for performing authorization and billing. It is externally configurable over the Internet using an Internet interface 840. The NE Central Processor 830 coordinates call activities for the macrocell, and performs authorization, billing, set up, and diagnostic functions. It coordinates calls originating or terminating within the macrocell. Calls may arrive from handsets 300 within the macrocell, handsets 300 within a distant macrocell with a dedicated link to this macrocell, or from a PSTN. This last case includes calls from a PSTN connection over a dedicated NE-NE link, since not every NE may have a PSTN interface. Signaling from these various sources are evaluated and disposition of the call is determined. Calls may be routed in the following ways: The central process 830 is also connected to a Artificial Intelligence (AI) Network interface 1305 to communicate with the AI network computers 1300 in the Artificial Intelligence-based Distributive Routing System resident in the wireless system.

Within a microcell using the local call mode (no NE handling of voice data)

Within the macrocell (routed through NE switch w/o decompression)

To a linked NE 800 (routed through the NE switch to the linked NE w/o decompression)

To a local PSTN connection (routed through the NE switch to the PSTN gateway with decompression)

To a PSTN connection on a remote NE 800 (routed between NEs without decompression and then to PTSN with decompression)

To a PSTN connection via a dedicated ComDoc associated exclusively with a SE. Multiple line access is possible with more desiccated ComDocs at each SE.

Incoming calls are handled in a similar manner. The signaling is routed separately from the voice data. The NE central processor provides source/destination information to the call terminating devices in the system (microcell servers/radios, PSTN gateway, and remote NE central processor/PSTN gateway). It does not perform the routing function per se. For example, if there are two paths between two linked NEs, the NE central processor 830 depends on the switch to route the call appropriately. The software within the NE central processor 830 maintains a database of subscribers. Authorized users are able to add, delete, check status, and modify records associated with handsets, ComDocs or X-DatComs using the web page. Specifically, the NE central processor 830 shall perform the functions usually associated with the Authorization Center (AC), Home Location Register (HLR), and Visitor Location Register (VLR) of traditional cellular systems. The NE 800 supports storage and programming of activation data using a secure web interface, which provides a way to program the information needed by the NE 800 to activate handsets 300, ComDocs 900 or X-DatComs 400. The NE central processor monitors outgoing calls, and accumulates a billing record of calls that are outside the calling region (i.e., toll calls). The billing record includes the handset placing the call (i.e., account number), the number called, time of call, duration of call, and total charge for the call. This data is uploadable to a central billing system that is external to the NE 800 over a secure communication link. The NE central processor 830 handles set up information that is in addition to the subscriber records described above. The programmable information includes a unique identifier for the NE 800, numbering information for PSTN links, configuration values for the NE switch 850, PSTN interface 860, and NE-NE links 870. It also includes configuration information for the microcells, including frequency block assignments, SE identifiers, encryption keys, and radio bank configuration (e.g., the number of radios in use for a particular bank). The NE central processor supports diagnostic activities of the NE 800.

The Internet interface 840 is the physical hardware that interconnects the NE central processor 830 to an Internet service provider (ISP). The NE 800 contains a mechanism to move (switch) voice/data between different radios, the PSTN, and external NEs. The switch 850 is dynamically reconfigurable to permit calls to be routed automatically to the correct destination. The switch 850 is fast enough to permit calls within a local wireless communication system to operate without perceptible delay. The PSTN interface 860 performs the protocol conversion between the typical PSTN interfaces (T1 or E1) and the internal method used by the NE switch 850. The PSTN interface 860 performs out-of-band signaling using Signaling System 7 (SS7) signaling protocol, such that the NE 800 can act as a central office (CO). The PSTN interface 860 coordinates with the NE central processor 830 to place and receive calls involving the PSTN. The NE interface 870 provides a fixed voice/data communication link for call routing to other NEs in the wireless network. The wireless communication system is configurable to support zero, one, or two external NEs. The NE interface supports three technology types: direct copper connections using DS-1 connections, direct fiber connections using OC-3 links, and radio links with the DS-1 bandwidth. The NE 800 includes a control bus 890 for routing data and control between the central processor 830 and the microcell servers 822, switch 850, NE interface 870, and PSTN interface 860. The control bus may be a {fraction (10/100)} Mbps Ethernet LAN (local area network). An uninterruptible power supply (UPS) 880 is used to power the NE equipment and buffer it from the external power grid. In the event of an external power grid outage, the UPS battery backup capability is able to operate the NE for an extended period of time.

Figure 15:
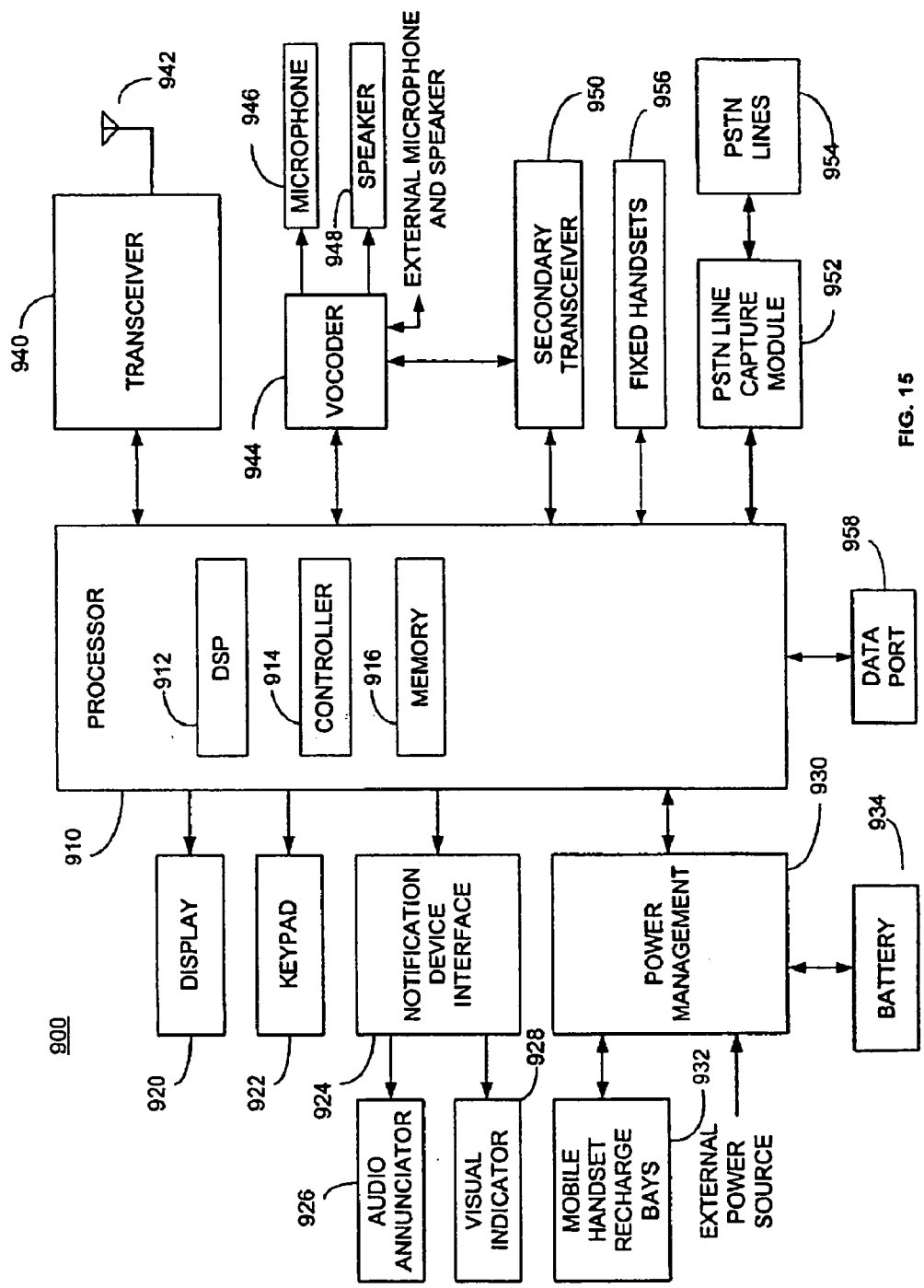
FIG. 15 shows a block diagram of a ComDoc (communications docking bay)

Turning now to FIG. 15, FIG. 15 shows a block diagram of a Communication Docking Bay (ComDoc) 900. The ComDoc 900 includes all the features and functions of a mobile handset, as described above in relation to FIG. 12. The ComDoc 900 includes a transceiver 940 and antenna 942. The transceiver 940 consists of two receivers, one transmitter, and two programmable frequency synthesizers. The antenna 942 may be integrated into the transceiver, or may be a modular type that plugs into the unit. The transceiver transmit power is adjustable in 3 dB steps over a 50 dB range relative to the maximum transmit power. The gain of the transceiver antenna 942 is in the range of 0 to 2.5 dBi under controlled conditions. The transceiver 940 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 910 provides centralized control to the ComDoc 900 and includes a digital signal processing (DSP) 912 for demodulating signals, a controller 914 for display/keypad servicing, and permanent, non-volatile and volatile memory 916. Firmware is embedded in the processor memory to implement protocols, control the user interfaces for the display, keypad, menus, etc., and control the application program interface (API) for the secondary mode protocol. The firmware includes a bootstrap loader that is stored in permanent memory 916 to enable download of the main code. The main code is stored in non-volatile memory 916 so that it is not lost in the absence of power, but can be overwritten by subsequent downloads, e.g., firmware updates. In addition to the main code, there also exist a number of configuration variables that are downloaded to activate the ComDoc 900. These configuration variables set the user's phone number and services subscribed, and are also stored in non-volatile memory. The handset firmware also manages non-volatile user memory for storage of phone book names and numbers, received text messages, and the current operating mode selections (ringer volume/type, beep volume, etc.). The Processor 910 shall have peripheral interfaces to the following elements:

Vocoder 944
Transceiver 940
Keypad 920
Display 922
Power Manager 930
Secondary Transceiver 950
Notification Device Interface 924

Permanent memory 916 is utilized for the processor bootstrap firmware and electronic serial number. Each Com-Doc 900 contains a unique electronic serial number in permanent memory 916. The serial number permits a minimum of 1 billion unique serial numbers. Bootstrap software is also contained in permanent memory 916 to enable download of the operational software through an external data port 958. The nonvolatile read/write memory 916 is used for storing initialization parameters and phone book data so that battery removal or replacement does not require re-initialization. Each handset contains its phone number in non-volatile memory. The operational software is downloadable to change features or otherwise update the code. The operational software is stored in non-volatile memory 916. The operational software is downloadable using capabilities of the bootstrap software, an external data port, and external software. The handset is capable of maintaining user data in non-volatile memory 916, such as phone book entries. The handset includes a vocoder (voice coder/decoder) 944 for processing the digitized voice signals. The vocoder 944 compresses and channel code the digitized voice data in order to meet the voice quality requirement and to enable implementation of the RF and communication protocols. The ComDoc 900 includes a microphone 946 and speaker 948. The ComDoc 900 may accept an external microphone input signal and shall provide an external speaker output signal. The ComDoc 900 includes a power manager 930 to assist in extending battery life. The ComDoc 900 includes a rechargeable battery 934, but is also capable of connection to an external power source through an external power interface. The ComDoc 900 includes a secondary transceiver 950 to serve as a secondary or alternate mode to the wireless communication system described. The secondary transceiver implements one or more of the following standard wireless protocols:

PCS CDMA (IS-95)
PCS TDMA (IS-136)
GSM 1900
AMPS

The secondary transceiver 950 includes functions for an antenna, RF transceiver, protocol processing, and vocoder processing. The ComDoc 900 also includes provisions for a position locator function to support the enhanced 911 (E911) requirements if needed. The ComDoc 900 includes a PSTN line capture module 952 for connection to one or more PSTN lines. This enables multiple telephone jacks to be provided on the ComDoc 900 for connecting fixed telephone handsets 956 and computer modems to the PSTN lines 954. In addition to an audio annunciator 926 and a visual indicator 928, the ComDoc 900 provides handset recharge bays 932.

Figure 16:
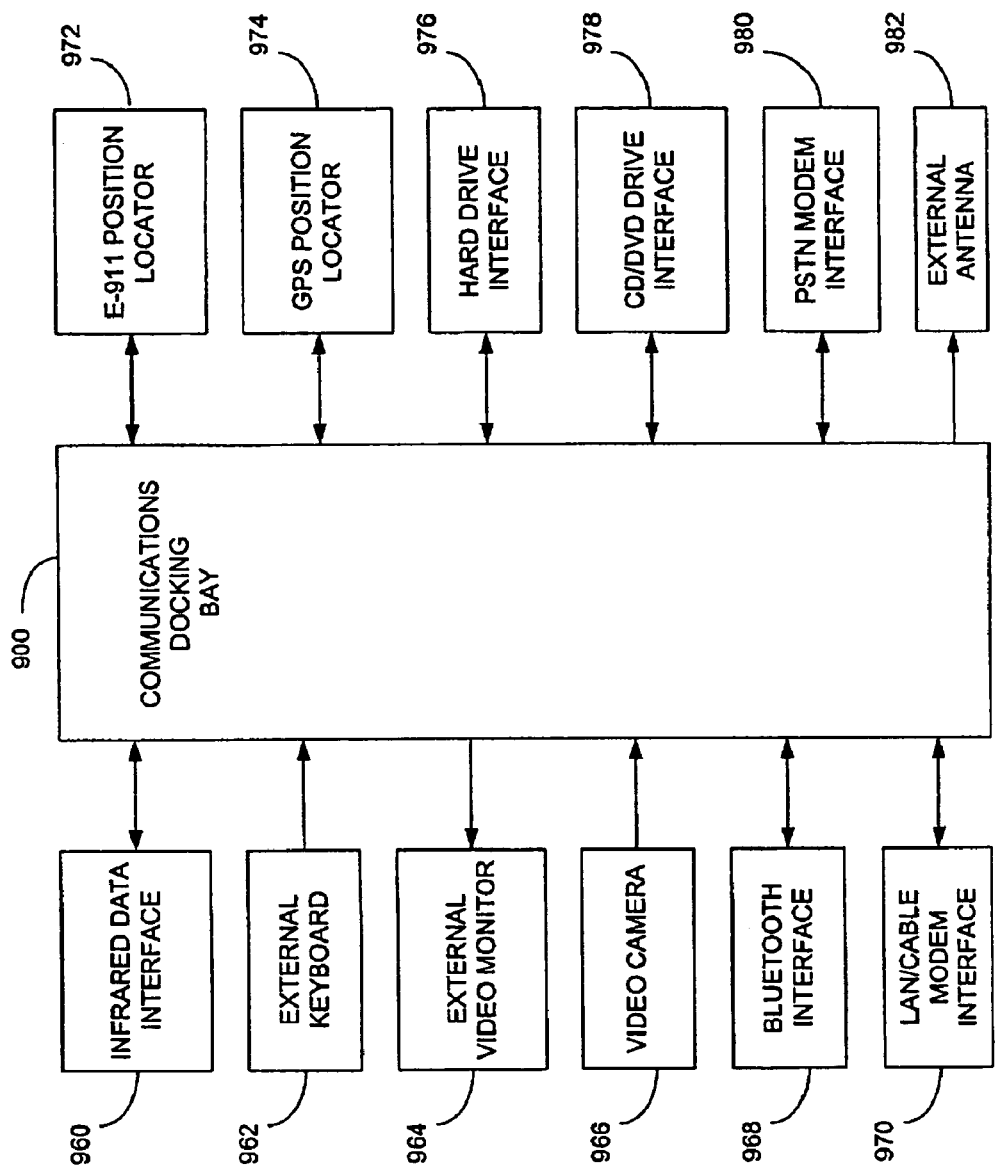
FIG. 16 shows optional features that may be added to the ComDoc to expand its capability.

Turning now to FIG. 16, FIG. 16 shows optional features that may be added to the ComDoc 900 to expand its capability. Communication interfaces include an infrared data interface 960, a Bluetooth interface 968, a LAN/cable modem interface 970, a PSTN modem interface 980, and an external antenna interface 982 for the wireless communications network. User interfaces include an external keyboard interface 962, an external video monitor interface 964, and a video camera interface 966. Interfaces to locator equipment include an E-911 position locator interface 972 and a GPS position locator interface 974. Storage device interfaces include a hard drive interface 976 and a CD/DVD drive interface 978.

Figure 18:
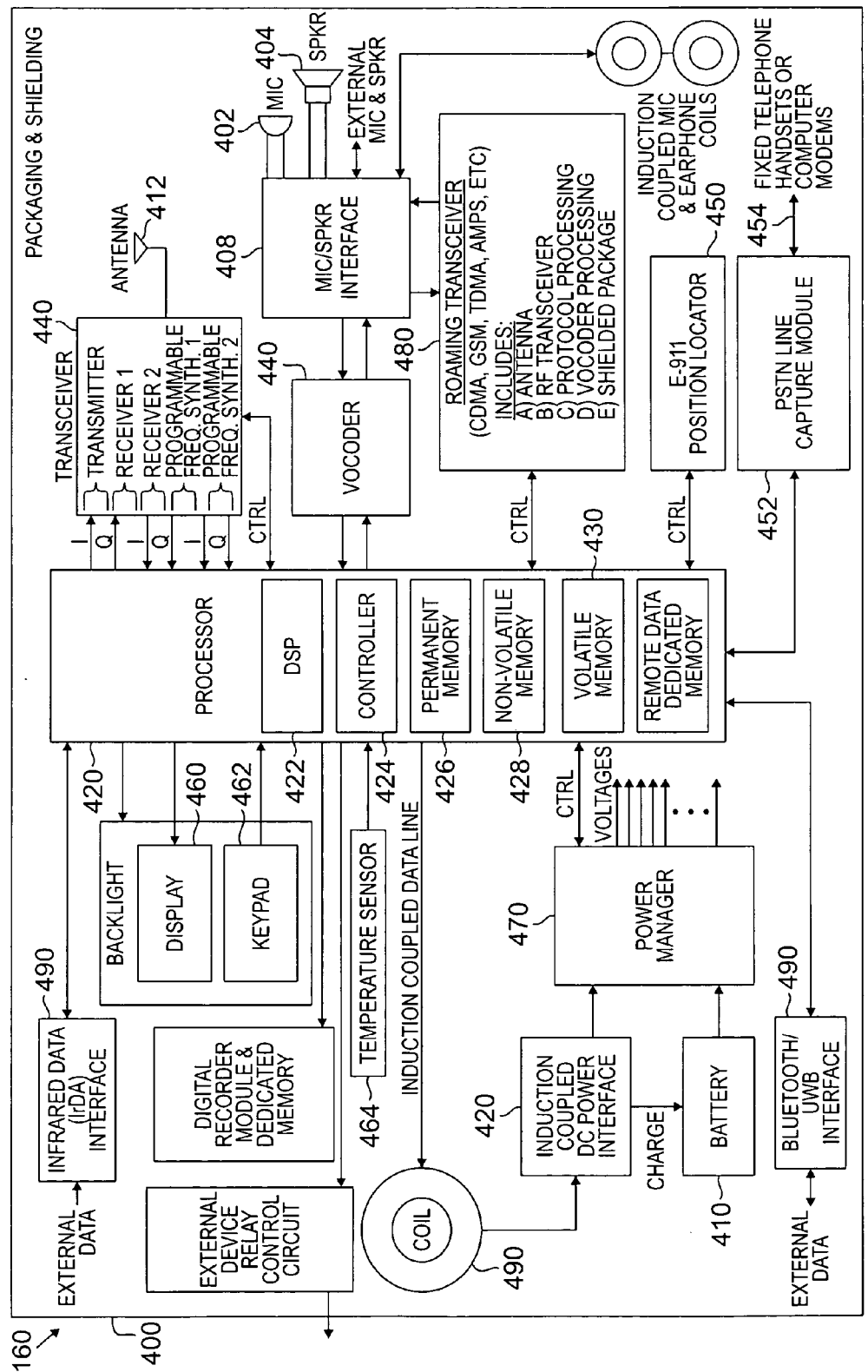
FIG. 18 shows a block diagram of an X-DatCom (external data communications module).

The ComDoc 900 may have additional features similar to those in the X-DatCom shown in FIG. 18 which are not shown in FIG. 15 or FIG. 16. For example, the ComDoc 900 may include the connection of the power manager 470 to an external power source through an external power interface or through an inductive coupled recharge coil. The ComDoc environmental package of integrity can be preserved when entering data via the induction coupling coil which is also used for the recharging of the internal batteries. The integrity of the environmental package can be maintained via the induction coil through the case of the environmental package without any external metal contact.

Turning now to FIG. 17, FIG. 17 shows examples of prefix codes 1700 that may be used to access ComDoc functions. To access a function 1710, one of these four-digit prefix codes 1720 must be entered prior to entering a handset access number, as explained in the description 1730. The access codes 1720 are meant to be examples of means for accessing available functions 1710 in the ComDoc through a handset keyboard.

The present ComDoc invention is a unique external networks interface may be deployed in a home or business as a fixed-base device. It is primarily composed of a fully functional DWCS handset circuitry and numerous internal peripheral devices dedicated to providing multiple external interface paths for a wireless network. The device can stand alone as a fixed-base wireless set having its own wireless telephone number, can function as a handset-to-external networks relay system, can serve as a home-based high-speed access device to wireless broadband Internet service for home computers, and can serve as a remote access interface device for high-speed wireless broadband Internet service between handset-laptop computer combinations and home installed broadband Internet connection. It has several other unique capabilities such as serving as a home intercom system for extension phones, a speakerphone, security system wireless PSTN connection in the event of PSTN line failure, and interface with Bluetooth/IR devices in the home for wireless remote control of "Smart House" technology. A novel feature of the ComDoc is to be a backup communications path to the PSTN for any wireless handset subscriber who also has permanent access to a PSTN landline in their home or business within the greater wireless system service area. It is most effective however, within the range of a Signal Extender that is also within range of the business or home. By using a ComDoc connection to a PSTN, the calling load on the Network Extender for access to the PSTN could be greatly reduced thus saving the wireless system operator monthly line charges for maintaining switch access to the PSTN.

Although the present invention has been described in detail with reference to certain preferred embodiments, it should be apparent that modifications and adaptations to those embodiments may occur to persons skilled in the art without departing from the spirit and scope of the present invention as set forth in the following claims.

Turning now to FIG. 18, FIG. 18 shows a block diagram 160 of an external data communications module (X-DatCom) 400. The X-DatCom 400 includes all the features and functions of a mobile handset as described above in relation to FIG. 12, and many of those found in a ComDoc in FIG. 15. The X-DatCom 400 includes a transceiver 410 and antenna 412. The transceiver 410 consists of two receivers, one transmitter, and two programmable frequency synthesizers. The antenna 412 may be integrated into the transceiver, or may be a modular type that plugs into the unit. The transceiver transmit power is adjustable in 3 dB steps over a 50 dB range relative to the maximum transmit power. The gain of the transceiver antenna 412 is in the range of 0 to 2.5 dBi under controlled conditions. The transceiver 410 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 420 provides centralized control to the X-DatCom 400 and includes a digital signal processing (DSP) 422 for demodulating signals, a controller 424 for display/keypad servicing, and permanent, non-volatile and volatile memory 426. Firmware is embedded in the processor memory to implement protocols, control the user interfaces for the display, keypad, menus, etc., and control the application program interface (API) for the secondary mode protocol. The firmware includes a bootstrap loader that is stored in permanent memory 426 to enable download of the main code. The main code is stored in non-volatile memory 428 so that it is not lost in the absence of power, but can be overwritten by subsequent downloads, e.g., firmware updates. In addition to the main code, there also exist a number of configuration variables that are downloaded to activate the X-DatCom 400. These configuration variables set the user's phone number and services subscribed, and are also stored in non-volatile memory. The X-DatCom 400 firmware also manages non-volatile user memory for storage of phone book names and numbers. The Processor 420 shall have peripheral interfaces to the following elements:

Vocoder 440
Transceiver 410
Keypad 462
Display 460
Power Manager 470
Secondary Transceiver 480

Permanent memory 426 is utilized for the processor bootstrap firmware and electronic serial number. Each X-DatCom 400 contains a unique electronic serial number in permanent memory 426. The serial number permits a minimum of 1 billion unique serial numbers. Bootstrap software is also contained in permanent memory 426 to enable download of the operational software through an external data port 490 The nonvolatile read/write memory 428 is used for storing initialization parameters and phone book data so that battery removal or replacement does not require re-initialization. Each X-DatCom 400 contains its phone number in non-volatile memory. The operational software is downloadable to change features or otherwise update the code. The operational software is stored in non-volatile memory 428. The operational software is downloadable using capabilities of the bootstrap software, an external data port, and external software. The X-DatCom 400 is capable of maintaining user data in non-volatile memory 428, such as phone book entries. The X-DatCom 400 includes a vocoder (voice coder/decoder) 440 for processing the digitized voice signals. The vocoder 440 compresses and channel code the digitized voice data in order to meet the voice quality requirement and to enable implementation of the RF and communication protocols. The X-DatCom 400 includes a microphone 402, speaker 4404, and an interface 408 for the microphone 402 and the speaker 404. The X-DatCom 400 may accept an external microphone input signal and shall provide an external speaker output signal. The X-DatCom 400 includes a power manager 470 to assist in extending battery life or facilitating input of fluctuating alternative power voltages. The X-DatCom 400 includes a rechargeable battery 410, but is also capable of connection to an external power source through an external power interface or through the inductive coupled recharge coil 490 in its case. The X-DatCom 400 includes a secondary transceiver 480 to serve as a secondary or alternate mode to the wireless communication system described. The secondary transceiver implements one or more of the following standard wireless protocols:

PCS CDMA (IS-95)
PCS TDMA (IS-136)
GSM 1400
AMPS

The secondary transceiver 480 includes functions for an antenna, RF transceiver, protocol processing, and vocoder processing. The X-DatCom 400 also includes provisions for a position locator function to support the enhanced 911 (E911) requirements if needed. The X-DatCom 400 includes a PSTN line capture module 452 for connection to one or more PSTN lines. This enables multiple telephone jacks to be provided on the X-DatCom 400 for connecting fixed telephone handsets 456 and computer modems to the PSTN lines 454.

The X-DatCom environmental package integrity can be preserved when entering data via the induction coil 490 which is also used for the recharging of the internal batteries. The integrity of the environmental package can be maintained via the induction coil 490 through the case of the environmental package without any external metal contact.

The present X-DatCom invention is a unique external networks interface may be deployed in a home or business as a fixed-base device. It may also be remotely placed for the collection of data through attached sensors or devices or the X-DatCom 400 may be employed to remotely control the limited or total operational state of an external device attached to the X-DatCom 400. It is primarily composed of a fully functional DW Protocol handset circuitry and numerous internal peripheral devices dedicated to providing multiple external interface paths for a wireless network or for the collection of data or the remote control of external devices. The device can stand alone as a fixed-base wireless set having its own wireless telephone number, can function as a handset-to-external networks relay system, can serve as a home-based high-speed access device to wireless broadband Internet service for home computers, and can serve as a remote access interface device for high-speed wireless broadband Internet service between handset-laptop computer combinations and home installed broadband Internet connection. It has several other unique capabilities such as serving as a speakerphone, security system wireless PSTN connection in the event of PSTN line failure, and interface with Bluetooth/IR devices in the home or office for wireless remote control of "Smart House" technology. A novel feature of the X-DatCom is to be a backup communications path to the PSTN for any wireless handset subscriber who also has permanent access to a PSTN landline in their home or business within the greater wireless system service area. It is most effective however, within the range of a Signal Extender that is also within range of the business or home. By using a X-DatCom connection to a PSTN, the vast quantities of data could be remotely collected, numerous and varied devices could be remotely controlled and access to otherwise inaccessible external networks could be achieved by DW Protocol instruments associated with particular X-DatCom devices.

Although the present invention has been described in detail with reference to certain preferred embodiments, it should be apparent that modifications and adaptations to those embodiments may occur to persons skilled in the art without departing from the spirit and scope of the present invention as set forth in the following claims.

While specific embodiments have been illustrated and described, numerous modifications come to mind without departing from the spirit of the invention and the scope of protection is only limited by the scope of the accompanying claims.

What is claimed is:

1. A method of operating a wireless communication system for voice and data signals, the system comprising one or more macrocells and each macrocell comprising a plurality of microcells, the method comprising:
    establishing a local communication path for remotely transmitting and receiving signals between a local external data communications module and a local communication docking bay within a same microcell via a signal extender;
    establishing an extended communication path for remotely transmitting and receiving signals between an external data communications module and an extended communication docking bay located within different microcells positioned within a same macrocell via signal extenders and a network extender;
    establishing a distant communication path for remotely transmitting and receiving signals between a distant external data communications module and a distant communication docking bay located within different microcells positioned within different macrocells via signal extenders and network extenders;
    asynchronously transmitting and receiving half-duplex signals over the communication paths using pairs of assigned communication path frequencies stabilized by a GPS-based frequency reference source;
    monitoring and analyzing the communication paths by a system-resident and decentralized Artificial Intelligence-based Distributive Routing System; and
    re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system.

2. The method of claim 1, wherein the establishing the local communication path comprises:
    remotely transmitting signals from the local external data communications module and the local communication docking bay to the signal extender;
    receiving and re-transmitting signals by the signal extender to the local external data communications module and the local communication docking bay; and
    receiving signals from the signal extender by the local external data communications module and the local communication docking bay.

3. The method of claim 1, wherein establishing the extended communication path comprises:
    remotely transmitting signals from the extended external data communications module and the extended communication docking bay to the signal extenders;
    receiving and re-transmitting signals from the extended external data communications module and the extended communication docking bay by the signal extenders to the network extender;
    receiving and re-transmitting signals from the signal extenders by the network extender to the signal extenders; receiving and retransmitting signals from the network extender by the signal extender to the extended external data communications module and the extended communication docking bay; and
    receiving signals from the signal extenders by the extended external data communications module and the extended communication docking bay.

4. The method of claim 1, wherein establishing the distant communication path comprises:
    remotely transmitting signals from the distant external data communications module and the distant communication docking bay to the signal extenders;
    receiving and re-transmitting signals from the distant external data communications module and the distant communication docking bay by the signal extenders to the network extenders;
    receiving and re-transmitting signals from the signal extenders by a network extender to another network extender;
    receiving and re-transmitting signals from a network extender by another network extender to signal extenders;
    receiving and re-transmitting signals from network extenders by signal extenders to the distant external data communications module and the distant communication docking bay; and
    receiving signals from signal extenders by the distant external data communications module and the distant communication docking bay.

5. The method of claim 4, wherein receiving and re-transmitting signals by a network extender to another network extender is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

6. The method of claim 1, wherein half of the signals received by a signal extender in a microcell are transmitted by handsets, communication docking bays and external data communications modules in the microcell in a low radio frequency band and half of the signals received by the signal extender in a macrocell are transmitted by a network extender in the macrocell in a low radio frequency band.

7. The method of claim 1, wherein half of the signals transmitted by a signal extender in a microcell are received by handsets, communications docking bays and external data communications modules in the microcell in a high radio frequency band and half of the signals transmitted by the signal extender in a macrocell are received a network extender in the macrocell in a high radio frequency band.

8. The method of claim 1, wherein transmitting and receiving signals between an external data communications module and a communication docking bay is conducted asynchronously with transmitting signals between other handsets, communications docking bays and external data communications modules.

9. The method of claim 1, wherein the local communication path between the local external data communications module and the local communication docking bay is a voice communication path comprising using two fixed frequencies in a sub-band spectrum for establishing a local voice channel.

10. The method of claim 1, wherein the local communication path between the local external data communications module and the local communication docking bay is a data communication path under a four channel Contiguous Channel Acquisition protocol comprising using two fixed frequencies having a bandwidth of four times a bandwidth of a local voice channel by combining four contiguous voice channels.

11. The method of claim 1, wherein the local communication path under a twelve channel Contiguous Channel Acquisition Protocol Plus between the local external data communications module and the local communication docking bay is a data communication path under a twelve channel Contiguous Channel Acquisition Protocol established by using two fixed frequencies having a bandwidth of twelve times a bandwidth of a local voice channel by combining twelve contiguous voice channels.

12. The method of claim 1, wherein the extended communication path is a voice communication path comprising using four fixed frequencies in a sub-band spectrum for establishing an extended voice channel.

13. The method of claim 1, wherein the extended communication path between the external data communications module and the communication docking bay is a data communication path under a four channel Contiguous Channel Acquisition Protocol comprising using four fixed frequencies having a bandwidth of four times a bandwidth of an extended voice channel by combining four contiguous voice channels.

14. The method of claim 1, wherein the extended communication path between the external data communications module and the communication docking bay is a data communication path under a twelve channel Contiguous Channel Acquisition Protocol Plus comprising using four fixed frequencies having a bandwidth of twelve times a bandwidth of an extended voice channel by combining twelve contiguous voice channels.

15. The method of claim 1, further comprising establishing a communication path for transmitting and receiving signals between an external data communications module and an external network via a signal extender and a network extender connected to the external network.

16. The method of claim 15, wherein the external network is selected from the group consisting of a Public Switch Telephone Network, a fiber optic communication link, a coaxial cable, a public TCP/IP network, and a satellite communication link.

17. The method of claim 1, further comprising establishing a communication path for transmitting and receiving signals between an external data communications module and an external network via a communication docking bay connected to the external network.

18. The method of claim 17, wherein the external network is selected from the group consisting of a Public Switch Telephone Network, a fiber optic communication link, a coaxial cable, a public TCP/IP network, and a satellite communication link.

19. The method of claim 1, further comprising establishing a communication path for transmitting and receiving signals between a communication docking bay and a local communication network.

20. The method of claim 19, wherein the local communication network is selected from the group consisting of external data communications modules associated with the communication docking bay, local extension telephones connected to a Public Switch Telephone Network via the communication docking bay, an infrared link, a Bluetooth link, a wired computer local area network, a wireless local area computer network, a security system and another communication docking bay link.

21. The method of claim 1, wherein the external data communications modules are communication docking bays.

22. A method of operating a wireless communication system for voice and data signals, the system comprising one or more macrocells and each macrocells comprising a plurality of microcells, the method comprising:
  establishing a local communication path for transmitting and receiving signals between a local external data communications module and a local communication docking bay within a same microcell comprising:
    receiving and transmitting signals between the local external data communications module and a signal extender;
    receiving and transmitting signals between the signal extender, the external data communications module and the local communication docking bay; and
    receiving and transmitting signals between the local communication docking bay and the signal extender;
  establishing an extended communication path for transmitting and receiving signals between an extended handset and an extended communication docking bay within different microcells positioned within a same macrocell comprising:
    transmitting and receiving signals between the extended external data communications module and a first signal extender; transmitting and receiving signals between the first signal extender and a network extender;
    transmitting and receiving signals between the network extender and a second signal extender;
    transmitting and receiving signals between the second signal extender and the extended communication docking bay; and
    transmitting and receiving signals between the extended communication docking bay and the second signal extender;
  establishing a distant communication path for transmitting and receiving signals between a distant external data communications module and a distant communication docking bay within different microcells positioned within different macrocells comprising:
    transmitting and receiving signals between the distant external data communications module and a first signal extender; transmitting and receiving signals between the first signal extender and a first network extender;
    transmitting and receiving signals between the first network extender and a second network extender;
    transmitting and receiving signals between the second network extender and a second signal extenders;
    transmitting and receiving signals between the second signal extender and the distant communication docking bay; and
    transmitting and receiving signals between the distant communication docking bay and the second signal extender; and
  asynchronously transmitting and receiving half-duplex signals over the communication paths using pairs of assigned communication path frequencies stabilized by a GPS-based frequency reference source;

monitoring and analyzing the communication paths by a system-resident and decentralized Artificial Intelligence-based Distributive Routing System; and re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system.

23. The method of claim 22, wherein transmitting signals between the first network extender and the second network extender is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

24. The method of claim 22, wherein transmitting signals from the external data communications module and the communication docking bay to the signal extenders is in a low radio frequency band; transmitting signals from the signal extenders to the handset and the communication docking bay is in a high radio frequency band; transmitting signals from the signal extenders to the network extenders is in a high radio frequency band; transmitting signals from the network extenders to the signal extenders is in the low radio frequency band; and transmitting signals between the network extenders is on a high data rate system backbone.

25. The method of claim 22, wherein half of the signals received by a signal extender in a microcell are transmitted by handsets, communication docking bays and external data communications modules in the microcell in a low radio frequency band and half of the signals received by the signal extender in a microcell are transmitted by a network extender in the macrocell in a low radio frequency band.

26. The method of claim 22, wherein half of the signals transmitted by a signal extender in a microcell are received by the handsets, communication docking bays and external data communications modules in the microcell in a high radio frequency band and half of the signals transmitted by the signal extender in a microcell are received by a network extender in the macrocell in a high radio frequency band.

27. The method of claim 22, wherein transmitting and receiving signals between an external data communications module and a communication docking bay are conducted asynchronously with transmitting signals between other external data communications modules and communication docking bays.

28. The method of claim 22, wherein transmitting and receiving signals comprises using Frequency Division Multiple Access techniques for determining sub-bands in the high and low radio frequency bands.

29. The method of claim 22, wherein transmitting and receiving signals comprise using Gaussian Minimum Shift Keying modulation for producing a radio frequency waveform.

30. The method of claim 22, wherein transmitting and receiving signals from external data communications modules and communication docking bays comprise a primary mode and a secondary mode of operation.

31. The method of claim 30, wherein the primary mode of operation comprises a DW wireless frequency protocol.

32. The method of claim 30, wherein the secondary mode of operation is selected from the group of wireless protocols consisting of AMPS, D-AMPS, IS-95, IS-136, and GSM1900.

33. The method of claim 22, further comprising controlling an operational state of the wireless communication system by transmitting an operational state command to a network extender.

34. The method of claim 22, wherein the local communication path between an external data communications module and a communication docking bay is a voice communication path comprising using two fixed frequencies in a sub-band spectrum for establishing a local voice channel.

35. The method of claim 22, wherein the local communication path between an external data communications module and a communication docking bay is a data communication path under a four channel Contiguous Channel Acquisition Protocol comprising using two fixed frequencies having a bandwidth of four times a bandwidth of a local voice channel by combining four contiguous voice channels.

36. The method of claim 22, wherein the local communication between an external data communications module and a communication docking bay is a data communication path under a twelve channel Contiguous Channel Protocol Plus comprising using two fixed frequencies having a bandwidth of twelve times a bandwidth of a local voice channel by combining twelve contiguous voice channels.

37. The method of claim 22, wherein the extended communication path is a voice communication path comprising using four fixed frequencies in a sub-band spectrum for establishing an extended voice channel.

38. The method of claim 22, wherein the extended communication path between an external data communications module and a communication docking bay is a data communication path under a four channel Contiguous Channel Acquisition Protocol comprising using four fixed frequencies having a bandwidth of four times a bandwidth of an extended voice channel by combining four contiguous voice channels.

39. The method of claim 22, wherein the extended communication path between an external data communications module and a communication docking bay is a data communication path under a twelve channel Contiguous Channel Acquisition Protocol Plus comprising using four fixed frequencies having a bandwidth of twelve times a bandwidth of an extended voice channel by combining twelve contiguous voice channels.

40. The method of claim 22, further comprising establishing a communication path for transmitting and receiving signals between a external data communications module and an external network via a communication docking bay connected to the external network.

41. The method of claim 40, wherein the external network is selected from the group consisting of a Public Switch Telephone Network, a fiber optic communication link, a coaxial cable, a public TCP/IP network, and a satellite communication link.

42. The method of claim 22, wherein the external data communications modules are communication docking bays.

43. The method of claim 22, wherein: transmitting signals comprises digitizing, buffering and encoding voice frames and transmitting the voice frames in packets at a date rate that is at least twice that required for real-time decoding, whereby transmitting time requires less than half of real time; and receiving signals comprise receiving and decoding the voice frame packets at a data rate that is equal to that required for real-time decoding, whereby receiving time requires less than half of real-time.

44. The method of claim 22, further comprising transmitting and receiving information over a reference channel for providing handsets, communication docking bays and external data communications modules with time and date information, microcell and macrocell identification code, attention codes, and broadcast text messages.

45. The method of claim 22, further comprising transmitting and receiving information over a call initiation channel for handling handset, communication docking bay and external data communications module initial registration, periodic registration, authorization and short id assignment, call requests, call frequency assignment, call progress prior to voice and data channel use, and acknowledgement.

46. The method of claim 22, further comprising transmitting and receiving information over a call maintenance channel for call completion, call request, 911 position report, call handoff frequency, call waiting notification, voice message notification, text message notification, and acknowledgement.

47. A wireless communication system for voice and data signals comprising:
  one or more macrocells, each macrocell comprising a plurality of microcells;
  a wireless set comprising one or more wireless devices selected from handsets, external data communications modules or communication docking bays;
  a signal extender located in the microcell;
  a network extender located in the macrocell;
  means for establishing a local communication path for transmitting and receiving signals between a local external data communications module and a local communication docking bay within a same microcell via a signal extender;
  means for establishing an extended communication path for transmitting and receiving signals between an extended external data communications module and an extended communication docking bay located within different microcells positioned within a same macrocell via signal extenders and a network extender;
  means for establishing a distant communication path for transmitting and receiving signals between a distant external data communications module and a distant communication docking bay located within different microcells positioned within different macrocells via signal extenders and network extenders;
  means for asynchronously transmitting and receiving half-duplex signals over the communication paths using pairs of assigned communication path frequencies stabilized by a GPS-based frequency reference source; and
  a system-resident and decentralized Artificial Intelligence-based Distributive Routing System for monitoring the transmitted and received signals over the communication paths.

48. The system of claim 47, wherein the means for establishing a local communication path for transmitting and receiving signals between a local external data communications module and a local communication docking bay within a same microcell via a signal extender comprises:
  a local external data communications module;
  a signal extender external data communications module; and
  a local communication docking bay
  wherein the local external data communications module encodes voice and data frame packets and transmits these packets as radio frequency signals in a low frequency band; the signal extender receives, amplifies, and shifts a frequency of the local external data communications module and communication docking bay signals in the low radio frequency band to a high radio frequency band and transmits the high radio frequency band signals; the local communication docking bay encodes voice and data frame packets and transmits these packets as radio frequency signals in a low radio frequency band; and the local external data communications module receives signals in a high radio frequency band from the signal extender and decodes the received signals into a voice and data frame packet.

49. The system of claim 47, wherein the means for establishing the extended communication path for transmitting and receiving signals between the extended external data communications module and the extended communication docking bay within different microcells positioned within a same macrocell via signal extenders and a network extender comprises:
  an extended handset;
  a first signal extender;
  a network extender;
  a second signal extender;
  an extended communication docking bay; and
  an extended external data communications module
  wherein the extended handset encodes voice and data frame packets and transmits these packets as radio frequency signals in a low frequency band; the first signal extender receives, amplifies, and shifts a frequency of the extended external data communications module signals in the low radio frequency band to a high radio frequency band and transmits the high radio frequency band signals from the first signal extender to the network extender; the network extender receives, amplifies, and shifts a frequency of signal extender signals in the high radio frequency band to a low radio frequency band and transmits the low radio frequency band signals from the network extender to selected signal extenders; the second signal extender receives, amplifies, and shifts a frequency of the network extender signals in the low frequency band to a high radio frequency band and transmits the high radio frequency band signals; the extended communication docking bay receives the second signal extender signals in the high radio frequency band and decodes the received signals into a voice and data frame packet; the extended communication docking bay encodes voice and data frame packets and transmits these packets as radio frequency signals in a low frequency band; the second signal extender receives, amplifies, and shifts a frequency of the extended communication docking bay signals in the low radio frequency band to a high radio frequency band and transmits the high radio frequency band signals from the second signal extender to the network extender; the first signal extender receives, amplifies, and shifts a frequency of the network extender signals in the low frequency band to a high radio frequency band and transmits the high radio frequency band signals; and the extended external data communications module receives the first signal extender signals in the high radio frequency band and decodes the received signals into a voice and data frame packet.

50. The system of claim 47, wherein the means for establishing the distant communication path for transmitting and receiving signals between a distant external data communications module and a distant communication docking bay within different microcells positioned within different macrocells via signal extenders and network extenders further comprises:
  a first signal extender;
  a first network extender;
  a second signal extender; and
  a second network extender wherein the first network extender receives, and amplifies the first signal extender signals and transmits the first signal extender signals to the second network extender over a dedicated communication link; and the second network extender for receives and shifts a frequency of first signal extender signals in the high radio frequency band to a low radio frequency band and transmits the low radio frequency band signals from the second network extender to the second signal extender.

51. The system of claim 47, wherein:
the microcell comprises a geographical area containing one or more handsets carried by mobile users, communication docking bays, external data communications modules and a signal extender; and
a macrocell comprises a geographical area containing between one and twenty one microcells, and a network extender.

52. The system of claim 47, wherein the communication docking bay comprises external communication paths for transmitting and receiving signals between the communication docking bays and an external communication network to enable handsets, external data communications modules and devices associated with the docking bays to connect to the external network through the docking bays.

53. The system of claim 52, wherein the external network is selected form the group consisting of a Public Switch Telephone Network, a fiber optic communication link, a coaxial cable, a public TCP/IP network, and a satellite communication link.

54. The system of claim 47, wherein the external data communications modules comprise local communication paths for transmitting and receiving signals between external data communications modules and a local communication network.

55. The system of claim 54, wherein the local communication network is selected from the group consisting of wireless handsets and external data communications modules associated with the communication docking bay, local extension telephones connected to a Public Switch Telephone Network via the communication docking bay, an infrared link, a Bluetooth link, a wired computer local area network, a wireless local area computer network, a security system and another communication docking bay link.

56. The system of claim 47, wherein the external data communications modules comprise:
a processor for controlling External Data Communication Module operation comprising a digital signal processor, a controller, and memory;
a user interface comprising a display, a keypad, visual indicator, audio annunciator, microphone and speaker;
a vocoder connected to a microphone and speaker interface;
a power manager comprising a battery and a power source;
an external data interface; connections for fixed telephone handset extensions; connections to a Public Switch Telephone Network;
a primary mode transceiver having a transmitter and two receivers connected to an omni-directional antenna for use with a DW protocol; and
a secondary multi-mode transceiver for providing service using a variety of standard wireless protocols.

57. The system of claim 47, wherein the external data communications module includes optional interface connections selected from the group consisting of an infrared data interface, an external keyboard interface, an external monitor interface, a video camera interface, a Bluetooth interface, a LAN/cable modem interface, an E-911 position locator interface, a GPS position locator interface, a hard drive interface, a CD/DVD drive interface, a Public Switch Telephone Network modem interface, and an external antenna interface.

58. The system of claim 47, wherein the handsets, communication docking bays and external data communications module transmit voice and data packets half of the time and receive voice and data packets half of the time when in use.

59. The system of claim 47, wherein each signal extender is selected from the group consisting of four Public Switch Telephone Network lines accessed via dedicated communications docking bays, a fiber optic communication link, a coaxial cable, a public TCP/IP network, a directional emergency tower to tower microwave link and a satellite communication link.

60. The system of claim 47, wherein the Artificial Intelligence-based Distributive Routing System comprises a network of computers having a computer residing in each signal extender and each computer having an Artificial Intelligence software program to gather information regarding timely calling data, routing and wireless device use histories and to analyze the information for recommending or executing alternative communication paths within the entire system of the signal extenders and the network extender during excessive peak hours loading of the network extender or during a catastrophic failure of any signal extender or the network extender.

61. The system of claim 60, wherein the Artificial Intelligence System further reports the day's gathered information to each of the other signal extenders for comparative analysis and making logical suggestions to the handsets, communications docking bays and External Data Communications Modules operating within the system.

62. The system of claim 60, wherein the Artificial Intelligence System is further programmed to gather relevant data from remotely placed external data communications modules by means of a wireless protocol established for operations of the system.

63. The system of claim 62, wherein the data gathered by the Artificial Intelligence System from the external data communications modules by means of a wireless protocol established for operations of the system interfaced with a network selected from the group consisting of four Public Switch Telephone Network lines, a fiber optic communication link, a coaxial cable, a public TCP/IP network, a directional emergency tower to tower microwave link, a satellite communication link, a communication docking bay routed to other destinations and data collection devices selected by the Artificial Intelligence System.

64. The system of claim 47, wherein the wireless devices in the wireless set within the system have the capability to detect and monitor human biological functions to monitor the functions, and further store, relay or cause immediate alarm action within the wireless set, and provide remote notification for other wireless devices or instruments located external to the system and predetermined for alerting of the alarm action.

65. The system of claim 47, wherein the wireless devices in the wireless set within the system have the capability to detect and monitor human biological functions and further store, relay or cause immediate alarm action within the wireless set, and place a call outside the system to other external networks including but not limited to any one of a group consisting of public switch telephone networks, high speed-broadband cable, Internet, satellites and radio emergency networks.

66. The system of claim 65, wherein the other external network is selected from the group consisting of Public Switch Telephone Network lines, a fiber optic communication link, a coaxial cable, a public TCP/IP network, a directional emergency tower to tower microwave link, a satellite communication link, a remotely placed communication docking bay and a remotely placed external data communications module.

67. A method of operating a wireless communication system for voice and data signals, the system comprising one or more macrocells and each macrocells having a plurality of microcells, the method comprising:
 establishing a local communication path for transmitting and receiving signals between a local handset and a local external data communications modules within a same microcell via a signal extender;
 establishing an extended communication path for transmitting and receiving signals between an extended handset and an extended external data communications modules located within different microcells positioned within a same macrocell via signal extenders and a network extender;
 establishing a distant communication path for transmitting and receiving signals between a distant handset and a distant external data communications modules located within different microcells positioned within different macrocells via signal extenders and network extenders; and
 asynchronously transmitting and receiving half-duplex signals over the communication paths using pairs of assigned communication path frequencies stabilized by a GPS-based frequency reference source;
 monitoring and analyzing the communication paths by a system-resident and decentralized Artificial Intelligence-based Distributive Routing System; and
 re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system.

68. The method of claim 67, wherein establishing the local communication path comprises:
 transmitting signals from the local handset and the external data communications modules to the signal extender;
 receiving and re-transmitting signals by the signal extender to the local handset and the external data communications modules; and
 receiving signals from the signal extender by the local handset and the external data communications modules.

69. The method of claim 67, wherein establishing the extended communication path comprises:
 transmitting signals from the extended handset and the extended external data communications modules to the signal extenders;
 receiving and re-transmitting signals from the extended handset and the extended external data communications modules by the signal extenders to the network extender;
 receiving and re-transmitting signals from the signal extenders by the network extender to the signal extenders;
 receiving and retransmitting signals from the network extender by the signal extender to the extended handset and extended external data communications modules; and
 receiving signals from the signal extenders by the extended handset and the external data communications modules.

70. The method of claim 67, wherein establishing the distant communication path comprises:
 transmitting signals from the distant handset and the distant external data communications modules to the signal extenders;
 receiving and re-transmitting signals from the distant handset and the distant external data communications modules by the signal extenders to the network extenders;
 receiving and re-transmitting signals from the signal extenders by a network extender to another network extender;
 receiving and re-transmitting signals from a network extender by another network extender to signal extenders;
 receiving and re-transmitting signals from network extenders by signal extenders to the distant handset and the distant external data communications modules; and
 receiving signals from signal extenders by the distant handset and the distant external data communications modules.

71. The method of claim 70, wherein receiving and re-transmitting signals by a network extender to another network extender is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

72. The method of claim 67, wherein half of the signals received by a signal extender in a microcell are transmitted by handsets and external data communications modules in the microcell in a low radio frequency band and half of the signals received by the signal extender in a macrocell are transmitted by a network extender in the macrocell in a low radio frequency band.

73. The method of claim 67, wherein half of the signals transmitted by a signal extender in a microcell are received by the handsets and external data communications modules in the microcell in a high radio frequency band and half of the signals transmitted by the signal extender in a macrocell are received a network extender in the macrocell in a high radio frequency band.

74. The method of claim 67, wherein transmitting and receiving signals between a handset and a external data communications modules is conducted asynchronously with transmitting signals between other handsets and external data communications modules.

75. The method of claim 67, wherein the local communication path between the local handset and the local external data communications module is a voice communication path comprising using two fixed frequencies in a sub-band spectrum for establishing a local voice channel.

76. The method of claim 67, wherein the local communication path between the local handset and the local external data communications module is a data communication path under a four channel Contiguous Channel Acquisition Protocol comprising using two fixed frequencies having a bandwidth of four times a bandwidth of a local voice channel by combining four contiguous voice channels.

77. The method of claim 67, wherein the local communication path between the local handset and the local external data communications module is a data communication path under a twelve channel Contiguous Channel Acquisition Protocol Plus comprising using two fixed frequencies having a bandwidth of twelve times a bandwidth of a local voice channel by combining twelve contiguous voice channels.

78. The method of claim 67, wherein the extended communication path is a voice communication path comprising using four fixed frequencies in a sub-band spectrum for establishing an extended voice channel.

79. The method of claim 67, wherein the extended communication path between the extended handset and the extended external data communications module is a data communication path under a four channel Contiguous Channel Acquisition Protocol comprising using four fixed frequencies having a bandwidth of four times a bandwidth of an extended voice channel by combining four contiguous voice channels.

80. The method of claim 67, wherein the extended communication path between the extended handset and the extended external data communications modules is a data communication path under a twelve channel Contiguous Channel Acquisition Protocol Plus comprising using four fixed frequencies having a bandwidth of twelve times a bandwidth of an extended voice channel by combining twelve contiguous voice channels.

81. The method of claim 67, further comprising establishing a communication path for transmitting and receiving signals between a handset and an external network via a signal extender and a network extender connected to the external network.

82. The method of claim 81, wherein the external network is selected from the group consisting of a Public Switch Telephone Network, a fiber optic communication link, a coaxial cable, a public TCP/IP network, and a satellite communication link.

83. The method of claim 67, further comprising establishing a communication path for transmitting and receiving signals between a handset and an external network via an external data communications module connected to the external network.

84. The method of claim 83, wherein the external network is selected from the group consisting of a Public Switch Telephone Network, a fiber optic communication link, a coaxial cable, a public TCP/IP network, and a satellite communication link.

85. The method of claim 67, further comprising establishing a communication path for transmitting and receiving signals between an external data communications module and a local communication network.

86. The method of claim 85, wherein the local communication network is selected from the group consisting of wireless handsets associated with the external data communications modules, local extension telephones connected to a Public Switch Telephone Network via the communication docking bay, an infrared link, a Bluetooth link, a wired computer local area network, a wireless local area computer network, a security system and another external data communications module link.

87. The method of claim 67, wherein the handsets are external data communications modules.

88. A method of operating a wireless communication system for voice and data signals, the system comprising one or more macrocells and each macrocells having a plurality of microcells, the method comprising:

establishing a local communication path for transmitting and receiving signals between a local handset and a local external data communications module within a same microcell comprising:
  receiving and transmitting signals between the local handset and a signal extender;
  receiving and transmitting signals between the signal extender, the local handsets and the local external data communications modules; and
  receiving and transmitting signals between the local external data communications module and the signal extender;

establishing an extended communication path for transmitting and receiving signals between an extended handset and an extended external data communications module within different microcells positioned within a same macrocell comprising:
  transmitting and receiving signals between the extended handset and a first signal extender;
  transmitting and receiving signals between the first signal extender and a network extender;
  transmitting and receiving signals between the network extender and a second signal extender;
  transmitting and receiving signals between the second signal extender and the extended external data communications module; and
  transmitting and receiving signals between the extended external data communications module and the second signal extender;

establishing a distant communication path for transmitting and receiving signals between distant a handset and a distant external data communications module within different microcells positioned within different macrocells comprising:
  transmitting and receiving signals between the distant handset and a first signal extender;
  transmitting and receiving signals between the first signal extender and a first network extender;
  transmitting and receiving signals between the first network extender and a second network extender;
  transmitting and receiving signals between the second network extender and a second signal extenders;
  transmitting and receiving signals between the second signal extender and the distant external data communications module; and
  transmitting and receiving signals between the distant external data communications module and the second signal extender; and asynchronously transmitting and receiving half-duplex signals over the communication paths using pairs of assigned communication path frequencies stabilized by a GPS-based frequency reference source;

monitoring and analyzing the communication paths by a system-resident and decentralized Artificial Intelligence-based Distributive Routing System; and re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system.

89. The method of claim 88, wherein transmitting signals between the first network extender and the second network extender is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

90. The method of claim 88, wherein: transmitting signals from the handset and external data communications modules to the signal extenders is in a low radio frequency band and transmitting signals from the signal extenders to the handset and external data communications modules is in a high radio frequency band; transmitting signals from the signal extenders to the network extenders is in a high radio frequency band and transmitting signals from the network extenders to the signal extenders is in the low radio frequency band; and transmitting signals between the network extenders is on a high data rate system backbone.

91. The method of claim 88, wherein half of the signals received by a signal extender in a microcell are transmitted by handsets and external data communications modules in the microcell in a low radio frequency band and half of the signals received by the signal extender in a microcell are transmitted by a network extender in the macrocell in a low radio frequency band.

92. The method of claim 88, wherein half of the signals transmitted by a signal extender in a microcell are received by the handsets and external data communications modules in the microcell in a high radio frequency band and half of the signals transmitted by the signal extender in a microcell are received by a network extender in the macrocell in a high radio frequency band.

93. The method of claim 88, wherein transmitting and receiving signals between a handset and an external data communications module are conducted asynchronously with transmitting signals between other handsets and external data communications modules.

94. The method of claim 88, wherein transmitting and receiving signals comprise using Frequency Division Multiple Access techniques for determining sub-bands in the high and low radio frequency bands.

95. The method of claim 88, wherein transmitting and receiving signals comprise using Gaussian Minimum Shift Keying modulation for producing a radio frequency waveform.

96. The method of claim 88, wherein transmitting and receiving signals from handsets and external data communications modules comprise a primary mode and a secondary mode of operation.

97. The method of claim 96, wherein the primary mode of operation comprises a DW wireless frequency protocol.

98. The method of claim 96, wherein the secondary mode of operation is selected from the group of wireless protocols consisting of AMPS, D-AMPS, IS-95, IS-136, and GSM1900.

99. The method of claim 88, further comprising controlling an operational state of the wireless communication system by transmitting an operational state command to a network extender.

100. The method of claim 88, wherein the local communication path between the handset and the external data communications module is a voice communication path comprises using two fixed frequencies in a sub-band spectrum for establishing a local voice channel.

101. The method of claim 88, wherein the local communication path between a handset and a external data communications module is a data communication path under a four channel Contiguous Channel Acquisition Protocol comprising using two fixed frequencies having a bandwidth of four times a bandwidth of a local voice channel by combining four contiguous voice channels.

102. The method of claim 88, wherein the local communication path between the handset and the external data communications module is a data communication path under a twelve channel Contiguous Channel Acquisition Protocol Plus comprising using two fixed frequencies having a bandwidth of twelve times a bandwidth of a local voice channel by combining twelve contiguous voice channels.

103. The method of claim 88, wherein establishing the extended voice communication path comprises using four fixed frequencies in a sub-band spectrum for establishing an extended voice channel.

104. The method of claim 88, wherein the extended communication path between the handset and the external data communications module is a data communication path under a four channel Contiguous Channel Acquisition Protocol comprising using four fixed frequencies having a bandwidth of four times a bandwidth of an extended voice channel by combining four contiguous voice channels.

105. The method of claim 88, wherein the extended communication path between the handset and the external data communications module is a data communication path under a twelve channel Contiguous Channel Acquisition Protocol Plus comprising using four fixed frequencies having a bandwidth of twelve times a bandwidth of an extended voice channel by combining twelve contiguous voice channels.

106. The method of claim 88, further comprising establishing a communication path for transmitting and receiving signals between a handset and an external network via external data communications module connected to the external network.

107. The method of claim 106, wherein the external network is selected from the group consisting of a Public Switch Telephone Network, a fiber optic communication link, a coaxial cable, a public TCP/IP network, and a satellite communication link.

108. The method of claim 88, wherein the handsets are external data communications modules.

109. The method of claim 88, wherein: transmitting signals comprises: digitizing, buffering and encoding voice frames and transmitting the voice frames in packets at a date rate that is at least twice that required for real-time decoding, whereby transmitting time requires less than half of real time; and receiving signals comprise receiving and decoding the voice frame packets at a data rate that is equal to that required for real-time decoding, whereby receiving time requires less than half of real-time.

110. The method of claim 88, further comprising transmitting and receiving information over a reference channel for providing handsets and an external data communications module with time and date information, microcell and macrocell identification code, attention codes, and broadcast text messages.

111. The method of claim 88, further comprising transmitting and receiving information over a call initiation channel for handling handset and external data communications module initial registration, periodic registration, authorization and short id assignment, call requests, call frequency assignment, call progress prior to voice and data channel use, and acknowledgement.

112. The method of claim 88, further comprising transmitting and receiving information over a call maintenance channel for call completion, call request, 911 position report, call handoff frequency, call waiting notification, voice message notification, text message notification, and acknowledgement.

113. A wireless communication system for voice and data signals, comprising:
- one or more macrocells, each macrocell having a plurality of microcells;
- a wireless set comprising wireless devices comprising one or more wireless devices selected from handsets, external data communications modules or communication docking bays;
- a signal extender located in the microcell;
- a network extender located in the macrocell;
- means for establishing a local communication path for transmitting and receiving signals between a local handset and an external data communications module within a same microcell via a signal extender;
- means for establishing an extended communication path for transmitting and receiving signals between an extended handset and an extended external data communications module located within different microcells positioned within a same macrocell via signal extenders and a network extender;
- means for establishing a distant communication path for transmitting and receiving signals between a distant handset and a distant external data communications module located within different microcells positioned within different macrocells via signal extenders and network extenders;
- means for asynchronously transmitting and receiving half-duplex signals over the communication paths using pairs of assigned communication path frequencies stabilized by a GPS-based frequency reference source, and
- a system-resident and decentralized Artificial Intelligence-based Distributive Routing System for monitoring the transmitted and received signals over the communication paths.

114. The system of claim 113, wherein the means for establishing a local communication path for transmitting and receiving signals between a local handset and a local external data communications module within a same microcell via a signal extender comprises:
- a local handset;
- a signal extender;
- a local external data communications;
- wherein the local handset encodes voice and data frame packets and transmits these packets as radio frequency signals in a low radio frequency band; the signal extender receives, amplifies, and shifts a frequency of the local handset and external data communications module signals in the low radio frequency band to a high radio frequency band and transmits the high radio frequency band signals; the local external data communications module receives signals in the high radio frequency band from the signal extender and decodes the received signals into a voice and data frame packet; the local external data communications module encodes voice and data frame packets and transmits these packets as radio frequency signals in a low radio frequency band; and the local handset receives signals in the high radio frequency band from the signal extender and decodes the received signals into a voice and data frame packet.

115. The system of claim 113, wherein the means for establishing an extended communication path for transmitting and receiving signals between an extended handset and an extended external data communications module within different microcells positioned within a same macrocell via signal extenders and a network extender comprises:
- an extended handset;
- a first signal extender;
- a network extender;
- a second signal extender; and
- an extended external data communications module;
- wherein the extended handset encodes voice and data frame packets and transmits these packets as radio frequency signals in a low frequency band; the first signal extender receives, amplifies, and shifts a frequency of the extended handset signals in the low radio frequency band to a high radio frequency band and transmits the high radio frequency band signals from the first signal extender to the network extender; the network extender receives, amplifies, and shifts a frequency of signal extender signals in the high radio frequency band to a low radio frequency band and transmits the low radio frequency band signals from the network extender to the second signal extender; the second signal extender receives, amplifies, and shifts a frequency of the network extender signals in the low frequency band to a high radio frequency band and transmits the high radio frequency band signals; the extended external data communications module receives the second signal extender signals in the high radio frequency band and decodes the received signals into a voice and data frame packet; the extended external data communications module encodes voice and data frame packets and transmitting these packets as radio frequency signals in a low frequency band; the second signal extender receives, amplifies, and shifts a frequency of the extended external data communications module signals in the low radio frequency band to a high radio frequency band and transmitting the high radio frequency band signals from the second signal extender to the network extender; the first signal extender for receives, amplifies, and shifts a frequency of the network extender signals in the low frequency band to a high radio frequency band and transmits the high radio frequency band signals; and the extended handset receives the first signal extender signals in the high radio frequency band and decodes the received signals into a voice and data frame packet.

116. The system of claim 115, wherein the means for establishing a distant communication path for transmitting and receiving signals between a distant handset and a distant external data communications module within different microcells positioned within different macrocells via signal extenders and network extenders further comprises a second network extender; wherein the first network extender for receives, amplifies the first signal extender signals and transmits the first signal extender signals to the second network extender over a dedicated communication link; and the second network extender receives and shifts a frequency of first signal extender signals in the high radio frequency band to a low radio frequency band and transmits the low radio frequency band signals from the second network extender to the second signal extender.

117. The system of claim 113, wherein:
- a microcell comprises a geographical area containing one or more handsets carried by mobile users, communication docking bays, external data communications modules and a signal extender; and
- a macrocell comprises a geographical area containing between one and twenty one microcells, and a network extender.

118. The system of claim 113, wherein the external data communications modules comprise external communication paths for transmitting and receiving signals between the external data communications modules and an external communication network to enable handsets and devices associated with the external data communications modules to connect to the external network through the external data communications modules.

119. The system of claim 118, wherein the external network is selected form the group consisting of a Public Switch Telephone Network, a fiber optic communication link, a coaxial cable, a public TCP/IP network, and a satellite communication link.

120. The system of claim 113, wherein the external data communications modules comprise local communication paths for transmitting and receiving signals between the external data communications modules and a local communication network.

121. The system of claim 120, wherein the local communication network is selected from the group consisting of wireless handsets associated with the external data communications modules, local extension telephones connected to a Public Switch Telephone Network via the external data communications module, an infrared link, a Bluetooth link, a wired computer local area network, a wireless local area computer network, a security system and another external data communications module link.

122. The system of claim 113, wherein the external data communications module comprise:
 a processor for controlling external data communications modules operation comprising a digital signal processor, a controller, and memory;
 a user interface comprising a display, a keypad, visual indicator, audio annunciator, microphone and speaker;
 a vocoder connected to a microphone and speaker interface;
 a power manager comprising a battery and a power source;
 an external data interface;
 connections for fixed telephone handset extensions;
 connections to a Public Switch Telephone Network;
 a primary mode transceiver having a transmitter and two receivers connected to an omni-directional antenna for use with a DW protocol; and
 a secondary mode transceiver for providing service using other varied standard wireless protocols.

123. The system of claim 113, wherein the external data communications modules include optional interface connections selected from the group consisting of an infrared data interface, an external keyboard interface, an external monitor interface, a video camera interface, a Bluetooth interface, a LAN/cable modem interface, an E-911 position locator interface, a GPS position locator interface, a hard drive interface, a CD/DVD drive interface, a Public Switch Telephone Network modem interface, and an external antenna interface.

124. The system of claim 113, wherein the handsets and external data communications modules transmit voice and data packets half of the time and receive voice and data packets half of the time when in use.

125. The system of claim 113, wherein the Artificial Intelligence-based Distributive Routing System comprises a network of computers having a computer residing in each signal extender and each computer having an Artificial Intelligence software program to gather information regarding timely calling data, routing and wireless device use histories and to analyze the information for recommending or executing alternative communication paths within the entire system of the signal extenders and the network extender during excessive peak hours loading of the network extender or during a catastrophic failure of any signal extender or the network extender.

126. The system of claim 125, wherein the Artificial Intelligence System further reports the day's gathered information to each of the other signal extenders for comparative analysis and making logical suggestions to the handsets, communications docking bays and External Data Communications Modules operating within the system.

127. The system of claim 125, wherein the Artificial Intelligence System is further programmed to gather relevant data from remotely placed external data communications modules by means of a wireless protocol established for operations of the system.

128. The system of claim 127, wherein the data gathered by the Artificial Intelligence System from the external data communications modules by means of a wireless protocol established for operations of the system are interfaced with a network selected from the group consisting of four Public Switch Telephone Network lines, a fiber optic communication link, a coaxial cable, a public TCP/IP network, a directional emergency tower to tower microwave link, a satellite communication link, a communication docking bay routed to other destinations and data collection devices selected by the Artificial Intelligence System.

129. A method of operating a wireless communication system for voice and data signals, the system comprising one or more macrocells and each macrocell comprising a plurality of microcells, the method comprising:
 establishing a local communication path for remotely transmitting and receiving signals between a first local wireless device and a second local wireless device within a same microcell via a signal extender;
 establishing an extended communication path for remotely transmitting and receiving signals between a first external wireless device and a second extended wireless device located within different microcells positioned within a same macrocell via signal extenders and a network extender;
 establishing a distant communication path for remotely transmitting and receiving signals between a first distant wireless device and a second distant wireless device located within different microcells positioned within different macrocells via signal extenders and network extenders; and
 asynchronously transmitting and receiving half-duplex signals over the communication paths using pairs of assigned communication path frequencies stabilized by a GPS-based frequency reference source;
 monitoring and analyzing the communication paths by a system-resident and decentralized Artificial Intelligence-based Distributive Routing System;
 re-directing the communication paths to ensure call loads of the signal extenders and network extenders in the system do not exceed a predetermined limit for each signal extender or network extender, to optimize call loads of the signal extenders and network extenders in the system, or to bypass any failed signal extenders or network extenders in the system.

130. The method of claim 129, wherein the wireless devices are selected from the group consisting of: handsets, external communications module, and communication docking bays.

131. The method of claim 129, wherein the wireless devices have wireless fidelity (WiFi) options to provide connectivity to other devices within or outside the system.

132. The method of claim 129, wherein the first local wireless device, the first extended wireless device and the first distant wireless device are external communications modules, and the second local wireless device, the second extended wireless device, and the second distant wireless device are communication docking bays.

133. The method of claim 129, wherein the first local wireless device, the first extended wireless device and the first distant wireless device are handsets, and the second local wireless device, the second extended wireless device, and the second distant wireless device are external communications modules.

134. The method of claim 129, wherein the first local wireless device, the first extended wireless device and the first distant wireless device are handsets, and the second local wireless device, the second extended wireless device, and the second distant wireless device are communication docking bays.

* * * * *